(12) United States Patent
Schiffmann et al.

(10) Patent No.: US 8,012,301 B2
(45) Date of Patent: Sep. 6, 2011

(54) METHODS OF MANUFACTURING BUILDING PANELS

(75) Inventors: Glenn P. Schiffmann, St. Germain, WI (US); Gerhard P. Schiffmann, St. Germain, WI (US)

(73) Assignee: Composite Panel Systems, LLC, Eagle River, WI (US)

( * ) Notice: Subject to any disclaimer, the term of this patent is extended or adjusted under 35 U.S.C. 154(b) by 184 days.

(21) Appl. No.: 11/901,173

(22) Filed: Sep. 13, 2007

(65) Prior Publication Data

US 2008/0127604 A1    Jun. 5, 2008

Related U.S. Application Data

(60) Provisional application No. 60/923,822, filed on Apr. 16, 2007, provisional application No. 60/876,403, filed on Dec. 21, 2006, provisional application No. 60/872,929, filed on Dec. 4, 2006.

(51) Int. Cl.
*B32B 37/02* (2006.01)
*E04C 1/40* (2006.01)

(52) U.S. Cl. .................. 156/307.1; 156/307.7; 156/205; 264/257; 264/258; 52/309.2; 52/309.4

(58) Field of Classification Search ............... 156/307.7, 156/297, 298, 324, 212, 213, 214, 197, 204, 156/205; 428/71, 178; 52/309.9, 309.16
See application file for complete search history.

(56) References Cited

U.S. PATENT DOCUMENTS

| | | | |
|---|---|---|---|
| 1,156,753 A | 10/1915 | Carey | |
| 2,737,227 A * | 3/1956 | Brummel | ........................ 428/55 |
| 2,915,150 A | 12/1959 | Weidler | |
| 2,934,180 A | 4/1960 | Hammitt et al. | |
| 3,107,755 A | 10/1963 | Thibert | |
| 3,258,889 A | 7/1966 | Butcher | |
| 3,339,326 A * | 9/1967 | Derr et al. | .................. 52/309.11 |
| 3,386,218 A | 6/1968 | Scott | |
| 3,479,784 A | 11/1969 | Massagli | |

(Continued)

FOREIGN PATENT DOCUMENTS

FR        2719065        10/1995

(Continued)

OTHER PUBLICATIONS

Unknown Author, Superior Walls Xi Foundation System, www.superiorwalls.com/images/XiWall_Ig.jpg, Printed May 2, 2005, 1 page, Unknown Publisher, date published unknown.

(Continued)

*Primary Examiner* — Philip Tucker
*Assistant Examiner* — William Bell
(74) *Attorney, Agent, or Firm* — Thomas D. Wilhelm; Wilhelm Law, S.C.

(57) ABSTRACT

A method of making tough, water-proof building panels depositing a first fiber-rich layer onto a support, the first fiber-rich layer having a width defined by first and second side edges, a length direction, and a top surface; placing foam blocks on the first layer, lengths of the foam blocks extending generally between the first and second side edges of the first fiber-rich layer; depositing a second fiber-rich layer onto the combination of the first fiber-rich layer and the foam blocks, thereby to develop an uncured precursor to the building panel; and curing the uncured precursor to the building panel thereby to make a generally rigid structural building panel.

21 Claims, 25 Drawing Sheets

U.S. PATENT DOCUMENTS

| | | | | |
|---|---|---|---|---|
| 3,480,497 | A | * | 11/1969 | Morse et al. ............... 156/155 |
| 3,544,417 | A | | 12/1970 | Corzine |
| 3,545,214 | A | | 12/1970 | Grazel |
| 3,573,144 | A | * | 3/1971 | Andersen ................. 428/48 |
| 3,579,937 | A | | 5/1971 | Lukens |
| 3,601,942 | A | | 8/1971 | Wilson |
| 3,662,507 | A | | 5/1972 | Espeland |
| 3,685,241 | A | | 8/1972 | Cooper |
| 3,719,016 | A | | 3/1973 | Randolph |
| 3,888,716 | A | * | 6/1975 | Morse ...................... 156/276 |
| 3,898,115 | A | * | 8/1975 | Watkins et al. ............ 156/93 |
| 4,028,477 | A | | 6/1977 | Goppel et al. |
| 4,038,796 | A | | 8/1977 | Eckel |
| D246,573 | S | | 12/1977 | White |
| 4,078,348 | A | | 3/1978 | Rothman |
| 4,083,159 | A | | 4/1978 | Hatch et al. |
| 4,125,980 | A | | 11/1978 | Miraldi |
| 4,205,408 | A | * | 6/1980 | Glass et al. ............... 114/357 |
| 4,263,759 | A | | 4/1981 | Miller |
| 4,339,490 | A | | 7/1982 | Yoshioka et al. |
| 4,343,669 | A | * | 8/1982 | Prior ........................ 156/212 |
| 4,463,043 | A | * | 7/1984 | Reeves et al. ............. 428/68 |
| 4,463,531 | A | | 8/1984 | Iorio Peretto |
| 4,557,091 | A | | 12/1985 | Auer |
| 4,580,487 | A | | 4/1986 | Sosnowski |
| 4,653,239 | A | | 3/1987 | Randa |
| 4,660,799 | A | | 4/1987 | Butland |
| 4,726,707 | A | * | 2/1988 | Newton ..................... 404/25 |
| 4,730,428 | A | | 3/1988 | Head et al. |
| 4,777,774 | A | | 10/1988 | Smalley, III |
| 4,783,935 | A | | 11/1988 | Creager |
| 4,833,855 | A | | 5/1989 | Winter, IV |
| 4,860,508 | A | | 8/1989 | Jackson et al. |
| 4,909,009 | A | | 3/1990 | Ogawa et al. |
| 4,917,933 | A | | 4/1990 | Schluter |
| 4,984,406 | A | | 1/1991 | Friesen |
| 5,037,498 | A | | 8/1991 | Umeda |
| 5,052,164 | A | | 10/1991 | Sandow |
| 5,059,377 | A | * | 10/1991 | Ashton et al. ............. 264/257 |
| 5,061,542 | A | * | 10/1991 | Brace ........................ 428/121 |
| 5,069,737 | A | * | 12/1991 | Guiton ...................... 156/210 |
| 5,242,652 | A | | 9/1993 | Savigny |
| 5,286,320 | A | | 2/1994 | McGrath et al. |
| 5,382,148 | A | * | 1/1995 | Buckley .................... 425/174.4 |
| 5,403,062 | A | | 4/1995 | Sjostedt et al. |
| 5,403,063 | A | | 4/1995 | Sjostedt et al. |
| 5,526,625 | A | | 6/1996 | Emblin et al. |
| 5,589,243 | A | * | 12/1996 | Day ........................... 428/56 |
| 5,615,525 | A | | 4/1997 | Kenworthy |
| 5,653,075 | A | | 8/1997 | Williamson |
| 5,657,597 | A | | 8/1997 | Loftus |
| 5,664,518 | A | * | 9/1997 | Lewit et al. ............... 114/357 |
| 5,706,620 | A | | 1/1998 | De Zen |
| 5,707,576 | A | * | 1/1998 | Asher ........................ 264/258 |
| 5,735,090 | A | | 4/1998 | Papke |
| 5,826,389 | A | | 10/1998 | Siler |
| 5,857,297 | A | | 1/1999 | Sawyer |
| 5,870,866 | A | | 2/1999 | Herndon |
| 5,875,596 | A | | 3/1999 | Muller |
| 5,881,519 | A | | 3/1999 | Newkirk |
| 5,890,334 | A | | 4/1999 | Hughes, Jr. |
| 5,899,037 | A | | 5/1999 | Josey |
| 5,927,032 | A | | 7/1999 | Record |
| 5,953,883 | A | | 9/1999 | Ojala |
| 5,979,684 | A | | 11/1999 | Ohnishi et al. |
| 6,041,562 | A | | 3/2000 | Martella et al. |
| 6,092,340 | A | | 7/2000 | Simmons |
| 6,131,365 | A | | 10/2000 | Crockett |
| 6,164,035 | A | | 12/2000 | Roberts |
| 6,176,055 | B1 | | 1/2001 | Fu |
| 6,178,709 | B1 | | 1/2001 | Hertz |
| 6,205,729 | B1 | | 3/2001 | Porter |
| 6,308,491 | B1 | * | 10/2001 | Porter ........................ 52/794.1 |
| 6,314,704 | B1 | | 11/2001 | Bryant |
| 6,381,793 | B2 | | 5/2002 | Doyle et al. |
| 6,408,594 | B1 | | 6/2002 | Porter |
| 6,418,686 | B1 | | 7/2002 | Record |
| 6,427,403 | B1 | | 8/2002 | Tambakis |
| 6,467,118 | B2 | | 10/2002 | Dumlao et al. |
| 6,481,172 | B1 | | 11/2002 | Porter |
| 6,591,567 | B2 | | 7/2003 | Hota et al. |
| 6,615,559 | B2 | | 9/2003 | McGrath et al. |
| 6,638,355 | B2 | | 10/2003 | Shulman |
| 6,670,291 | B1 | | 12/2003 | Tompkins et al. |
| 6,740,381 | B2 | | 5/2004 | Day |
| 6,755,003 | B1 | | 6/2004 | McGrath et al. |
| 6,755,633 | B2 | | 6/2004 | Miller |
| 6,799,403 | B2 | | 10/2004 | Winter |
| 6,848,228 | B1 | | 2/2005 | Williams |
| 6,854,499 | B2 | | 2/2005 | Miller |
| 6,871,600 | B2 | | 3/2005 | Norton et al. |
| 6,901,710 | B1 | | 6/2005 | Cooper |
| 6,942,915 | B1 | | 9/2005 | Kondo et al. |
| 7,052,563 | B2 | | 5/2006 | Dong et al. |
| 7,127,865 | B2 | | 10/2006 | Douglas |
| 7,138,023 | B2 | | 11/2006 | Haque et al. |
| 7,343,715 | B2 | * | 3/2008 | Ito et al. .................... 52/309.16 |
| 7,393,577 | B2 | | 7/2008 | Day et al. |
| 2002/0014302 | A1 | | 2/2002 | Fanucci et al. |
| 2002/0062607 | A1 | * | 5/2002 | Hota et al. ................. 52/180 |
| 2002/0069600 | A1 | | 6/2002 | Bryant |
| 2003/0136079 | A1 | | 7/2003 | Ruggie et al. |
| 2003/0190455 | A1 | * | 10/2003 | Burgess et al. ............ 428/119 |
| 2004/0050001 | A1 | | 3/2004 | Williams |
| 2004/0134162 | A1 | | 7/2004 | Douglas |
| 2005/0138891 | A1 | * | 6/2005 | Wool et al. ................. 52/782.1 |
| 2005/0262791 | A1 | | 12/2005 | Pringle et al. |
| 2006/0096204 | A1 | | 5/2006 | Martens et al. |
| 2006/0123725 | A1 | | 6/2006 | Godwin |
| 2006/0150550 | A1 | | 7/2006 | Summers |
| 2006/0236653 | A1 | | 10/2006 | Showers |
| 2006/0254167 | A1 | | 11/2006 | Antonic |
| 2006/0260267 | A1 | | 11/2006 | Hagen, Jr. et al. |
| 2007/0094992 | A1 | | 5/2007 | Antonic |
| 2007/0107370 | A1 | | 5/2007 | Douglas |
| 2007/0125042 | A1 | | 6/2007 | Hughes et al. |
| 2007/0209305 | A1 | | 9/2007 | Douglas |
| 2007/0251183 | A1 | | 11/2007 | Thiagarajan et al. |
| 2007/0256379 | A1 | | 11/2007 | Edwards |
| 2008/0047217 | A1 | | 2/2008 | Browning et al. |
| 2008/0078038 | A1 | | 4/2008 | Borazghi |
| 2008/0104909 | A1 | | 5/2008 | Wallin |
| 2008/0104911 | A1 | | 5/2008 | Jarvie et al. |
| 2008/0110111 | A1 | | 5/2008 | Bleibler |
| 2008/0307747 | A1 | | 12/2008 | Douglas |

FOREIGN PATENT DOCUMENTS

WO    2008070026    6/2008

OTHER PUBLICATIONS

Unknown Author, Superior Walls R-5 System, www.superiorwalls.com/images/R5_Ig.jpg, Printed May 2, 2005, 1 page, unknown Publisher, date published unknown.

Owens Corning, Fold-Form Insulating Concrete Forms, brochure, Dated 2004, Six pages, Publisher Unknown.

ICF Direct Incorporated, Performance, Quanlity Unmatched Value Insulated Concrete Forms, brochure, unknown date, 4 pages, unknown Publisher, date published unknown.

Portland Cement Association (PCA), Insulating Concrete Form Association (ICFA) and Concrete Homes, Beautiful Homes Built to Last, brochure, unknown date, 14 pages, Published by ICFA and PCA, unknown published date.

Lite-Form Technologies, The Beautiful Difference in Concrete begins with Lite-Form, brochure, Copyrighted 2004, 8 pages, published by Lite-Form Technologies, South Sioux City, NE.

Lite-Form Technologies, Make Your Own ICFs (Insulated Concrete Forms) and Get Everything You Need From One Company, brochure, date unkown, 3 pages, unkown Publisher, date published unkown.

Reward Wall Systems, No One Build Benefits Like Reward, mailed brochure, Copyrighted 2005, 8 pages, Published by Reward Systems, Inc., Printed in the USA.

Home Energy, Choosing a Basement Wall System, hem.dis.anl.gov/eehem/99/990311.html, Online Magazine, dated Mar./Apr. 1999, 7 pages, Published by Home Energy, published date unknown.

Bigfoot Systems, Build it with Bigfoot, advertisement, unknown date, 1 page, unknown Publisher, unknown published date.

Clear Corporation, The SIP System with a Concrete Difference, www.buildingsystems.com, magazine, dated Jan./Feb. 2005, 6 pages, unknown Publisher, unknown published date.

National Research Council Canada, As Composite Inc., brochure, date unknown, 2 pages, unknown Publisher, unknown published date.

National Research Counsil Canada, As Composite Building Sandwich Panels, dated Oct. 2006, 3 pages, unknown Publisher, unknown published date.

Unknown Author, Why Tecton Pultrusions?, part of brochure, unknown date, 1 page, unknown Publisher, unknown published date.

Joseph E. Sumerak and Jeffrey D. Martin, Pultrusion, XP-002539483, Numbered 550-564, 15 pages.

ENGINEERSHANDBOOK.COM, Manufacturing Processes—Vacuum Bag Molding, Composite Molding Processes, Engineer's Handbook, Copyright 2004-2006, printed Apr. 21, 2010, www.web.archive.org/web/20060516141840/http://engineershandbook.com/MfgMethods/vacuumbagmolding.htm.

* cited by examiner

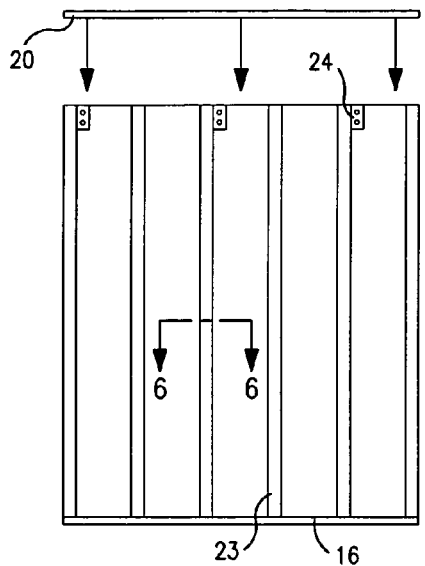
FIG. 2
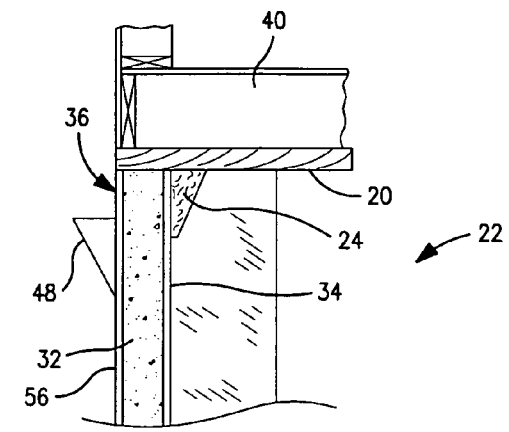
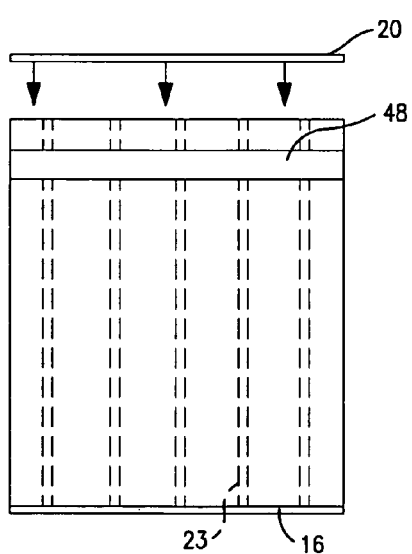
FIG. 4
FIG. 3

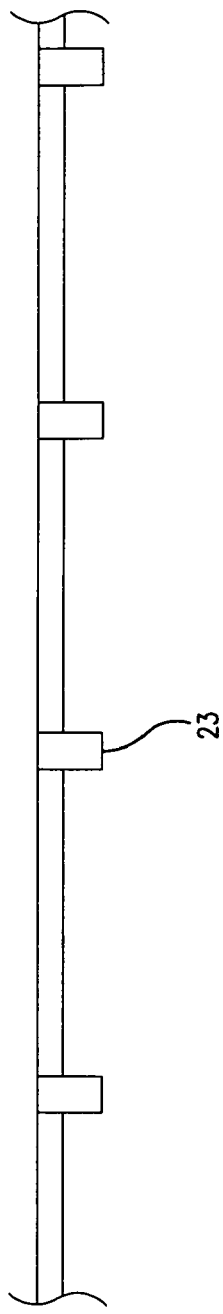
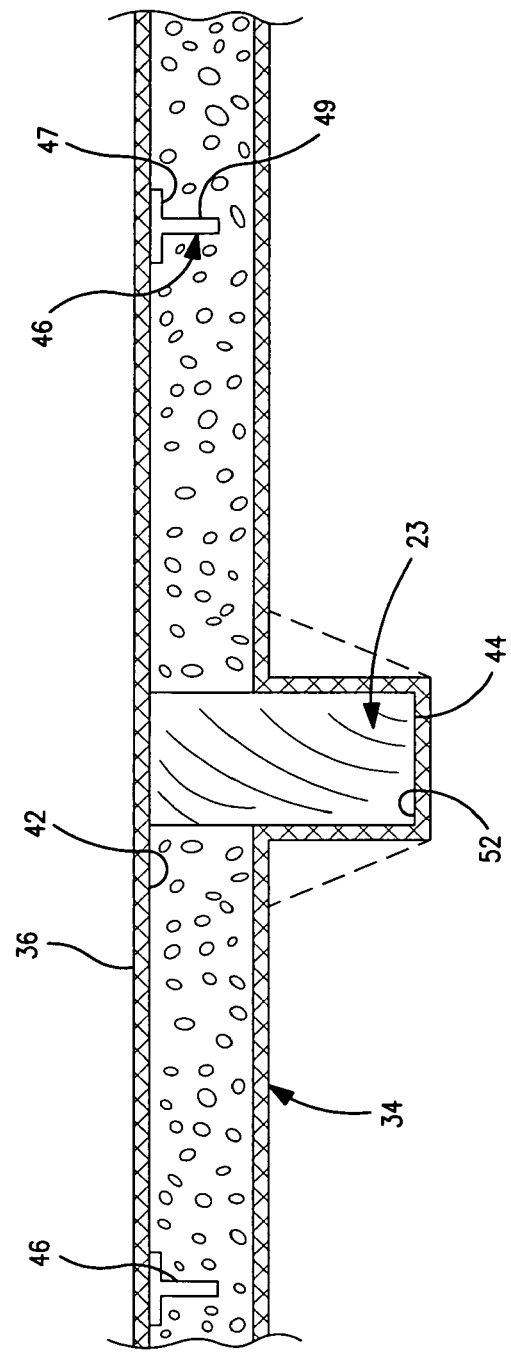
FIG. 5
FIG. 6

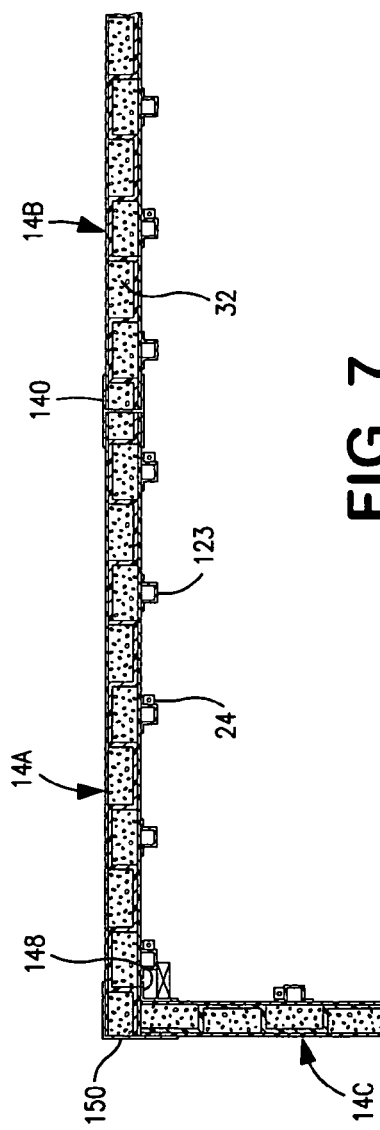
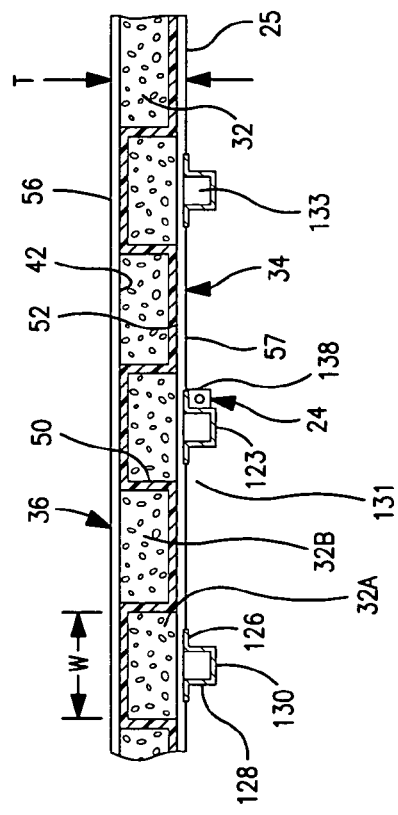
FIG. 7
FIG. 8

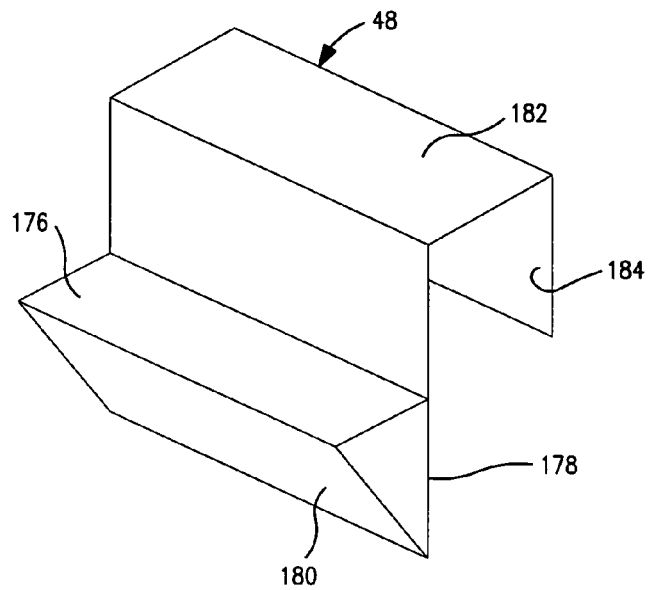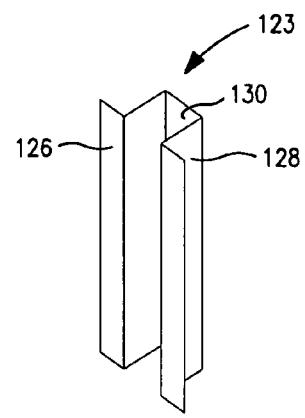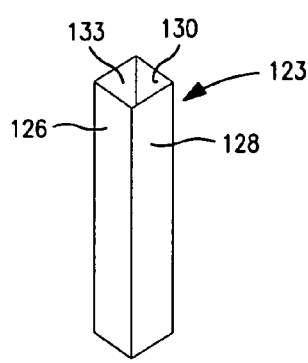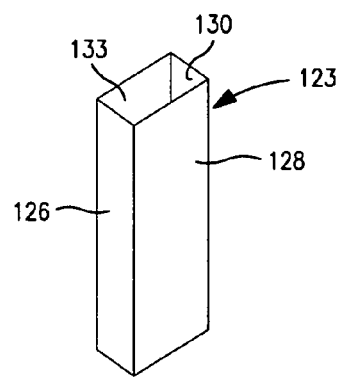
FIG. 15
FIG. 16
FIG. 16A
FIG. 16B

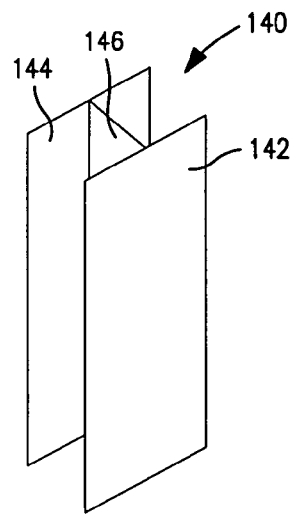 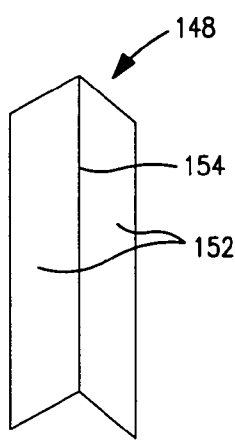 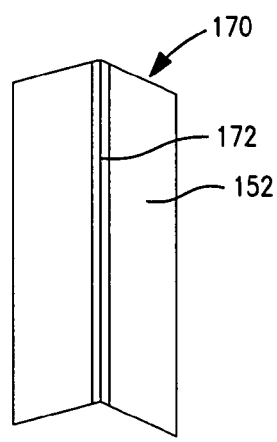
FIG. 17   FIG. 18   FIG. 19
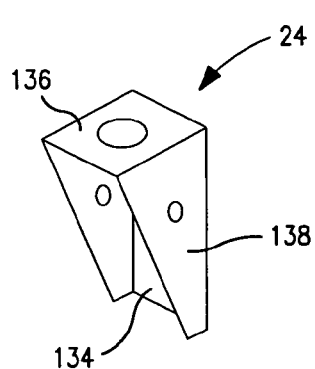 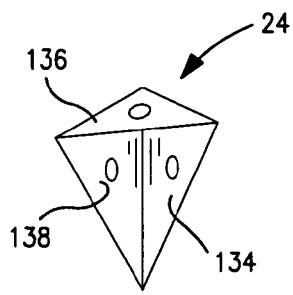
FIG. 20   FIG. 20A

METHODS OF MANUFACTURING BUILDING PANELS

BACKGROUND OF THE INVENTION

This invention relates to building systems which largely replace concrete, whether ready-mix concrete or pre-fabricated concrete blocks, or other pre-fabricated concrete products, in construction projects. In general, the invention replaces the concrete in below-grade frost walls and foundation walls, in above-grade walls, in concrete footers, and in post pads. Such concrete structures are replaced, in the invention, with structures based on resin-impregnated, fiber-based layers, as composite materials, also known as fiber-reinforced polymer materials (FRP). Such structures optionally include insulating foam, and optionally include regularly-spaced "studs", especially in upright wall sections. Thus, with the exception of concrete flat work such as concrete floors, the conventional ready-mix concrete truck is not needed at the construction site.

In conventional foundation construction, first a concrete footer is formed and poured using ready-mix concrete. After the poured concrete footer has cured to a sufficient degree, such as a few days later, concrete forms, e.g. 4-8 feet high, are brought in, assembled on site, and erected on top of the footer. Ready-mix concrete is then poured, from a ready-mix truck, into the forms and allowed to set up and cure, to thus create the foundation walls, or a frost wall if no basement is planned.

In the alternative, and still addressing conventional foundation construction, the upright portion of the foundation wall can be built using pre-fabricated concrete masonry units (cmu's) and mortar, typically supported by conventional poured concrete footers.

In yet another conventional type construction, the frost walls or foundation walls are built using mortared concrete blocks.

In any event, in such conventional structures, as the concrete is being finished at the tops of the forms, or at the top course of concrete blocks, bolts or other hold-down anchors are partially embedded in the setting-up concrete or mortar such that the anchors extend from the top of the foundation wall and, once the poured concrete, or mortar, has set up, such anchors serve as hold-down anchors, for example to mount a top plate to the top of the foundation wall, thus to anchor the overlying building structure to the foundation or frost wall. Once the concrete in a conventionally-poured foundation wall sets up, the forms are removed, e.g. 1-2 days after the ready-mix concrete is poured into the forms, and a wood, or wood-product, or other top plate is anchored to the top of the concrete foundation wall, using the anchors which are embedded in the concrete at the top of the concrete foundation wall. A similar waiting time is needed with a mortared concrete block wall, before the top plate is anchored to the top of the so fabricated wall.

The above-noted poured concrete wall construction process, and concrete block construction process, both require a substantial quantity of concrete materials, investment in forms, substantial on-site labor and several days of time to fabricate the building foundation on which the ground floor of the building can then be erected. If construction is done in winter in a northern climate, the concrete is typically heated in order to facilitate curing of the concrete.

In addition, a resulting such concrete foundation wall is permeable to water and so must be water-proofed though, even after a conventional water-proofing coating has been applied to make the foundation wall water-proof, water leakage through such concrete foundation wall, whether ready-mix wall or concrete block wall, is rather common. Further, a concrete wall is a good heat conductor, and thus should be insulated to avoid heat loss by conduction through the concrete to the soil or other fill which surrounds the building. However, the affect of such insulation is limited because only relatively thin insulation materials are commonly used with underground concrete wall construction.

Yet further, if the level of the building inside the concrete wall is to be inhabited, whether below grade, e.g. foundation wall, or above grade, then stud furring e.g. 2×4 studs or 2×6 studs are typically attached to the concrete wall as a substrate which facilitates installation of insulation and utilities, and serves as a substrate for installing a finished interior wall surface such as sheet rock or paneling. Such furring takes up interior space inside the building as well as costing additional time and money to install.

The overall time required to construct such building foundation can be reduced by fabricating concrete walls off-site and erecting the fabricated walls in place on site, using a crane. However, each such wall element must be custom-designed, adding to the cost; and mechanical lifting equipment, e.g. the crane, must be brought to the construction site.

Getting foundation walls installed in a timely manner, to accommodate timely delivery of constructed homes and other buildings to buyers, is a significant issue in the construction business. There are many reasons why foundations are not installed in accord with a planned schedule. A substantial such problem is the weather. The weather in northern climates can be below freezing for several months of the year, which makes it difficult to get foundations installed. In addition, installing quality concrete foundation walls requires skilled labor, as well as skilled subcontractors, including the subcontractors' skilled labor.

Another known method of constructing structural walls is the use of Insulated Concrete Form (ICF) walls. In such construction, insulated forms are erected on the footers, and receive ready-mix poured concrete. After curing, the outer portions of the forms are left as a layer of thermal insulation between the concrete and at least one of the inner and outer surfaces of the resulting wall. Although ICF walls do offer a relatively higher level of thermal insulation than a conventional uninsulated concrete wall, an ICF wall is typically more expensive than a plain concrete wall, and is more difficult to finish than a plain concrete wall, whether finishing the insulated interior of the wall or the insulated exterior of the wall.

Yet another alternative conventional foundation wall system is constructed of wood which has been treated to inhibit decay, and corresponding decomposition of the wood. Such treated wood is well known and is conventionally available. Such foundation walls typically include at least a bottom plate, and can be wrapped in plastic and then set on an aggregate stone footer. Wood foundations have a number of advantages, including enabling a manufacturer of such wood foundations to fabricate sections of such wall in the closed and controlled environment of a manufacturing facility, whereby selling and delivering such product is generally insensitive to weather conditions. Further, wood offers beneficial speed in constructing a building.

The primary problem with wood foundations is that wood foundations are not well received by the consuming public, as the public does not perceive quality in a building where wood is used in a below-grade application.

There is a need, in the construction industry, for light weight structural building panels, for example generally continuous wall panels of any desired length up to a maximum length per panel, selectable in length, in height, and in thickness, which structural building panels can be used in applications where concrete is conventionally used in residential, light commercial, and light industrial construction, and which structural building panels are strong enough to bear both the compressive loads and the lateral loads which are typically imposed on such concrete walls in a building structure.

There is also a need for walls which have superior moisture and water barrier properties.

There is yet further a need for walls which can be installed so as to be ready to support overlying building structure in a shorter period of time.

There is still further a need for walls which can be installed at a lower life cycle cost.

These and other needs are alleviated, or at least attenuated, by the novel construction products and methods of the invention.

SUMMARY OF THE INVENTION

This invention pertains to a tough, water-proof building system which provides wall, ceiling, and floor building panels and corresponding walls, ceilings, and floors in structural buildings. The walls have both vertical compression-resistance strength, and horizontal bending-resistance strength, sufficient that the wall system can be used in both above-ground and below-ground building structural applications, including applications where such wall systems are exposed to severe wind and other weather, such as hurricanes, tornadoes, and the like. Such walls can replace concrete, and can meet corresponding required strength specifications of a building panel or wall or roof or floor of similar dimensions.

Similarly, ceilings and floors made with building panels of the invention have vertical and horizontal loading capacities well able to support the loads typically imposed on ceilings and floors in residential, light commercial, and light industrial construction.

Such wall structure has an outer waterproof layer, comprised of reinforcing fibers embedded in polymeric resin, and defining the outwardly-facing surface of the panel. At least one fiber-reinforced polymeric structurally-reinforcing member extends, typically as a layer, the full height of the erected wall panel, and extends from at or proximate the inner surface of the outer layer to a location at or proximate an inner surface of the wall structure, at spaced locations along the length of the wall panel.

The inwardly-facing surface of the wall structure, considered in an orientation where a wall panel is installed as an upright wall in a building, can be formed by a separate structurally-reinforcing inner layer of fiber-reinforced polymeric (FRP) material, whereby the reinforcing layer.

Any or all of the inner layer, the outer layer, and the reinforcing layer can be thought of as fiber-reinforced resin layers or as resin-impregnated fiber layers. Either approach in materials description recognizes the structural contribution of both the fiber and the resin to the desired physical properties of the panels, and the benefit of having both materials in the panel structure.

The spaces between the inner-to-outer runs of the structurally reinforcing member, and between the inner and outer layers, are typically filled with rigid insulating foam material such as polyurethane foam or polystyrene foam, or polyisocyanurate foam.

Any of a wide variety of rigidifying, stiffening materials can be used as the structurally-reinforcing member to provide stiffness, rigidity to the structural building panel. Each such material has its own structural characteristics which direct desired cross-section shapes of the respective materials. Relatively more advantageous materials have insulating "R" values of greater than 0.5, typically greater than 10.

In a first family of embodiments, the invention comprehends a method of manufacturing a structural building panel. The method comprises depositing a first generally endless resin-impregnated fiberglass layer, impregnated with a first curable liquid resin, onto a support, the first resin-impregnated layer having a width defined by first and second side edges of the first resin-impregnated layer, a length direction, and a top surface; placing foam blocks at spaced locations along the length of the first resin-impregnated layer, lengths of the foam blocks extending generally between the first and second side edges of the first resin-impregnated layer, spaces being disposed between respective ones of the foam blocks, whereby top and side surfaces of the foam blocks are exposed; depositing a second generally endless resin-impregnated fiberglass layer, impregnated with a second curable liquid resin, onto the combination of the first resin-impregnated layer and the foam blocks, including weaving the second resin-impregnated layer, as a weaving layer, into and out of the spaces between the foam blocks, boundaries of the spaces then being defined by the weaving layer; placing additional foam blocks in the spaces and over portions of the weaving layer thereby to define a generally consistent thickness of a resulting structure along both a length of the resulting construct and a width of the resulting construct, and a generally flat top surface of the resulting construct; depositing a third resin-impregnated fiberglass layer onto the top surface of the resulting construct, thereby to develop an uncured precursor to the building panel; and curing the uncured precursor to the building panel thereby to make a generally rigid structural building panel.

In some embodiments, the method further comprises fabricating one of the first, second, and third layers by passing a fiberglass layer between a pair of rollers which together define a nip therebetween, and maintaining a pool of the respective liquid resin at the nip such that the fiberglass layer passes into the pool of liquid resin before passing through the nip, thereby to produce the respective resin-impregnated fiberglass layer.

In some embodiments, the third resin-impregnated layer covers substantially an entirety of the width of the resulting construct.

In some embodiments, the method further comprises, after the third resin-impregnated fiberglass layer has been deposited onto the combination of the weaving layer and the additional foam blocks, and before curing the resulting construct, applying pre-fabricated studs to the third resin-impregnated fiberglass layer, with sufficient intimacy of contact between the third layer and the studs that the subsequent curing binds the studs into the construct sufficiently that the studs contribute a significant increment to the bending resistance strength of the resulting structural building panel.

In a second family of embodiments, the invention comprehends a method of manufacturing a structural building panel. The method comprises depositing a first fiber-reinforced polymeric layer onto a support, the first resin-impregnated layer having a first side edge, a second side edge, a length direction, and a top surface; placing foam along the length of the first resin-impregnated layer thereby to develop a foam layer on the first layer, the foam layer having a top surface opposite the first layer; depositing pre-fabricated structurally reinforcing studs on the top surface of a resulting construct, at spaced locations along the length of the resulting construct, lengths of the structurally reinforcing studs extending generally between the first and second side edges of the resulting construct; depositing a second fiber-reinforced polymeric layer onto the top surface of the construct, including over the structurally reinforcing studs, thereby to develop a precursor to the building panel; and consolidating and curing the precursor to the building panel thereby to make a generally rigid such structural building panel.

In some embodiments, the method further comprises transporting the developing construct from a first work station to a second work station while continuing to building the developing construct.

In some embodiments, the method further comprises placing resin-impregnated fiberglass structurally reinforcing members at spaced locations along the length direction of the first fiber-reinforced layer and extending between the first layer and the top surface of the foam layer, before depositing the second fiber -reinforced layer onto the top surface of the construct.

In some embodiments, the foam layer extends generally between the first and second side edges of the first resin-impregnated fiberglass layer.

In a third family of embodiments, the invention comprehends a method of manufacturing a structural building panel. The method comprises filling a mold, comprising (i) placing structurally reinforcing members in spaced female recesses of a female mold element, (ii) drawing an inner layer of fabric of reinforcing fibers over the female mold element and consequently over the reinforcing members, so as to cover the structurally-reinforcing members, (iii) placing foam blocks, pre-wrapped with layers of reinforcing fibers, in edge-to-edge relationship to each other, on top of the layer of fabric so as to cover the layer in the female mold element, and (iv) drawing an outer layer fabric of reinforcing fibers over the pre-wrapped foam blocks so as to cover the foam blocks; closing the mold; and drawing a vacuum in the mold so as to evacuate air from the mold and fill spaces evacuated by the air with a curing-type liquid resin.

In some embodiments, the method includes infusing the resin into the mold while drawing the vacuum.

In some embodiments, the method includes applying resin to the structurally reinforcing members and the foam blocks before closing the mold.

In some embodiments, the method includes applying resin to the outer layer fabric before closing the mold.

In a fourth family of embodiments, the invention generally comprehends a method of making a building panel. The method comprises depositing a first fiber-rich layer onto a support, the first fiber-rich layer having a width defined by first and second side edges, a length direction, and a top surface; placing foam blocks on the first layer, lengths of the foam blocks extending generally between the first and second side edges of the first fiber-rich layer; depositing a second fiber-rich layer onto the combination of the first fiber-rich layer and the foam blocks, thereby to develop an uncured precursor to the building panel; and curing the uncured precursor to the building panel thereby to make a generally rigid structural building panel.

BRIEF DESCRIPTION OF THE DRAWINGS

FIG. 2 is a fragmented interior view of a section of one of the upstanding wall structures shown in FIG. 1.

FIG. 3 is an elevation-view cross-section of the upstanding wall structure taken at 3-3 of FIG. 1.

FIG. 4 is an outside elevation representation of the upstanding wall structure of FIG. 3.

FIG. 5 is a plan view of an upstanding wall section of FIG. 1.

FIG. 6 is a plan-view cross-section of a portion of the wall structure taken at 5-5 of FIG. 2.

FIG. 7 is a plan-view cross-section of a portion of a foundation wall according to a second embodiment of the invention.

FIG. 8 is an enlarged plan-view cross-section of a portion of the foundation wall structure of FIG. 7.

FIG. 15 is a pictorial line rendering of a resin-fiber composite support bracket of the invention, which may be mounted to the top of a foundation wall of the invention as illustrated in FIG. 9.

FIG. 16 is a pictorial line rendering of one embodiment of a resin-fiber composite channel stud of the invention, which stud can be incorporated into a wall panel of the invention as illustrated in FIGS. 7-9.

FIGS. 16A and 16B are pictorial line rendering of second and third embodiments of resin-fiber composite channel studs which can be incorporated into wall panels of the invention.

FIG. 17 is a pictorial line rendering of a resin-fiber composite "H" connector of the invention, which is used to connect first and second wall sections in a straight line.

FIG. 18 is a pictorial line rendering of a resin-fiber composite fixed-angle bracket of the invention which can be used on inner and/or outer surfaces of a wall section, connecting first and second wall sections at a perpendicular angle.

FIG. 19 is a pictorial line rendering of a resin-fiber composite adjustable-angle bracket of the invention, for inner and outer wall surface connections, and which is adjustable regarding the angle at which the respective panels of the bracket meet at a line of joinder.

FIGS. 20 and 20A are pictorial views of resin-fiber composite plate anchor brackets useful proximate the tops and bottoms of wall panels of the invention e.g. for anchoring a top plate and/or a bottom plate to the wall panel.

Figure 1:
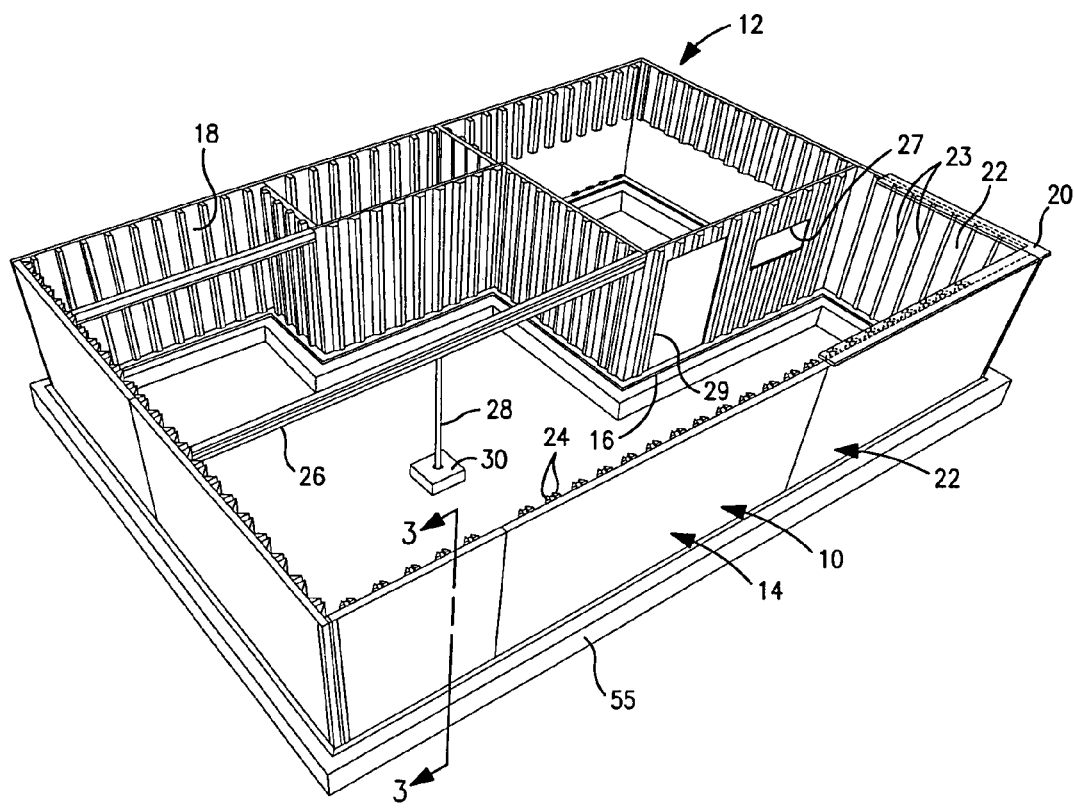
FIG. 1 shows a representative pictorial view, with parts removed, of a building foundation wall fabricated using building system structures of the invention.

The invention is not limited in its application to the details of construction, or to the arrangement of the components set forth in the following description or illustrated in the drawings. The invention is capable of other embodiments or of being practiced or carried out in various other ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Referring to FIG. 1, a plurality of interior and exterior foundation walls 10 collectively define the foundation 12 of a building. Each foundation wall 10 is defined by one or more foundation wall panels 14. In the illustration, each foundation wall panel 14 includes a bottom plate 16, an upstanding wall section 18, and a top plate 20. Each upstanding wall section 18 includes a main-run wall section 22, and uprightly-oriented reinforcing studs 23 affixed to, or integral with, the main-run wall section, regularly spaced along the length of the wall section, and extending inwardly of the inner surface of the main run wall section. In the embodiment illustrated in FIG. 1, anchoring wedge-shaped brackets 24 are mounted to the studs at the tops and bottoms of the wall section, thus to assist in anchoring the bottom plate and the top plate, and/or any other attachment, to the main run portion of the upstanding wall section.

As illustrated in FIG. 1, conventional e.g. steel I-beams 26 are mounted to the wall sections, as needed, to support spans of overlying floors. Such steel I-beam can be supported at one or more locations along the span of the I-beam, as needed, by either conventional e.g. steel posts, or by resin-fiber composite posts 28 of the invention (FIGS. 1 and 10) and/or resin-fiber composite pads 30 (FIGS. 1 and 10) of the invention. Additional support posts can be employed at or adjacent the ends of the I-beams as needed to satisfy specific, individual load-bearing requirements of the building design. Fiberglass-reinforced brackets, or solid reinforcing studs 23 (FIGS. 5-6) or hollow channel studs 123 (FIGS. 7-9 and 16) or conventional e.g. steel brackets, can be used to attach the I-beams to respective panels of the foundation wall using e.g. conventional steel bolts. Studs 23, are cut off, as needed, to support the I-beam at the desired height. Multiple studs can be used side-by-side, as needed, to provide the desired load-bearing capacity.

Referring now to FIGS. 3, 5, and 6, the main run wall section 22 is generally defined between the inner surface and the outer surface of the wall panel, without considering the thickness at stud 23. The main run wall section thus generally includes a foam core, and the inner 34 and outer 36 layers of fiberglass-reinforced polymer (FRP), otherwise known as fiberglass sheets or fiberglass layers. The foam core can be foamed in place thermally insulating material between pre-fabricated inner and outer layers, or can be made from pre-fabricated blocks 32 of thermally insulating foam material, which blocks are assembled, e.g. by using adhesive or curable resin, with the remaining elements of the respective wall panel as described in further detail hereinafter. Bottom plate 16 and top plate 20 can be secured to the main run section with the support of wedge-shaped brackets 24 (FIG. 2), or other supporting bracket structure, optionally in combination with adhesive or additional curable polymeric resin. The selection of adhesive depends on the selection of the material from which the top plate is made, as well as the specific material which forms the respective face of the wall panel, and the material from which bracket 24 is made. An exemplary adhesive is Pro-Series QB-300 Multi-Purpose Adhesive, available from OSI Sealant Company, Mentor, Ohio. Such adhesive can be used as desired to secure various elements of the building panel assembly to each other.

The foam core layer is of sufficient density, rigidity, and polymer selection to fix the positions of the fiber-reinforced polymer layers in their respective positions as illustrated. Thus, in the embodiments illustrated in FIGS. 3, 5, and 6, the rigidity of the foam contributes significantly to the dimensional stability of building panel 14. In addition, the foam provides substantial thermal insulation between the inwardly-facing surface of the wall and the outwardly-facing surface of the wall.

Bottom plate 16 can be a fiber-reinforced, e.g. fiberglass-reinforced, polymeric structural member, of such dimensions as to be sufficiently rigid, and with sufficient strength, to support both the foundation wall and the overlying building superstructure, from an underlying fabricated base defined by e.g. a settled bed 53 (FIG. 9) of stone aggregate, from an underlying fabricated base comprising a concrete footer 55 (FIG. 3), or from other suitable underlying fabricated supporting base. The specific structural requirements of bottom plate 16 depend on the loads to be applied.

A pultruded fiber-reinforced product e.g. 0.075 inch (1.9 mm) to about 0.5 inch (13 mm) thick has been found to be satisfactory as the bottom plate for general-purpose and typical single-family residential, light commercial, and light industrial construction.

The bottom plate can be attached to the upstanding wall section, and optional support brackets 24, by adhesive, by curable resin such as that used in the wall panel, by steel bolts which extend through an upright leg of the bottom plate e.g. adjacent the outer surface of the upstanding wall section and through the adjacent portion of the upstanding wall section, or by a combination of metal anchors and adhesive and/or resin or by other attachment mechanism. In any event, the bottom plate, when attached to the upstanding wall section, is sufficiently wide, thick, dense, and rigid, to provide effective compression and bending support, thus to support the foundation wall from the underlying soil and/or rock and/or stone, or other natural base albeit typically through a fabricated footing.

The bottom plate typically extends laterally inwardly into the building beyond the primary surface of the inner layer by a distance corresponding to at least the maximum thickness of the building panel which includes stud 23, thus to present a suitably-sized bearing surface to the underlying support base whereby the overlying load can be borne by the underlying support base without causing substantial movement in the underlying support base of soil, stone, or rock. In the alternative, the bottom plate can extend outwardly from the building panel, away from the building, to provide the recited suitably-sized bearing surface, or can extend both inwardly and outwardly from the building panel.

The top plate can be made of wrapped layers of fiberglass, can be a pultruded resin-fiber composite, can be conventional wood, or a manufactured wood product, or other conventional construction material, each such structure being sufficiently wide and thick to provide a support surface, interfacing with the underlying upstanding wall section, and from which the overlying superstructure of the building can be supported. The top plate can conveniently be made from conventional wood building materials whereby overlying building structures can be conventionally attached to the underlying foundation wall structure at the building site by use of conventional fasteners, conventionally attached to the top plate.

The combination of the inner and outer fiberglass layers 34, 36, and the reinforcing studs 23, for example wood 2×4's, 2×6's, as illustrated in FIG. 6, is sufficiently strong to withstand the inwardly-directed lateral, e.g. bending, forces which are imposed on a foundation wall by the ground, or on above-ground walls by wind loads, both imposed from outside the building.

Figure 9:
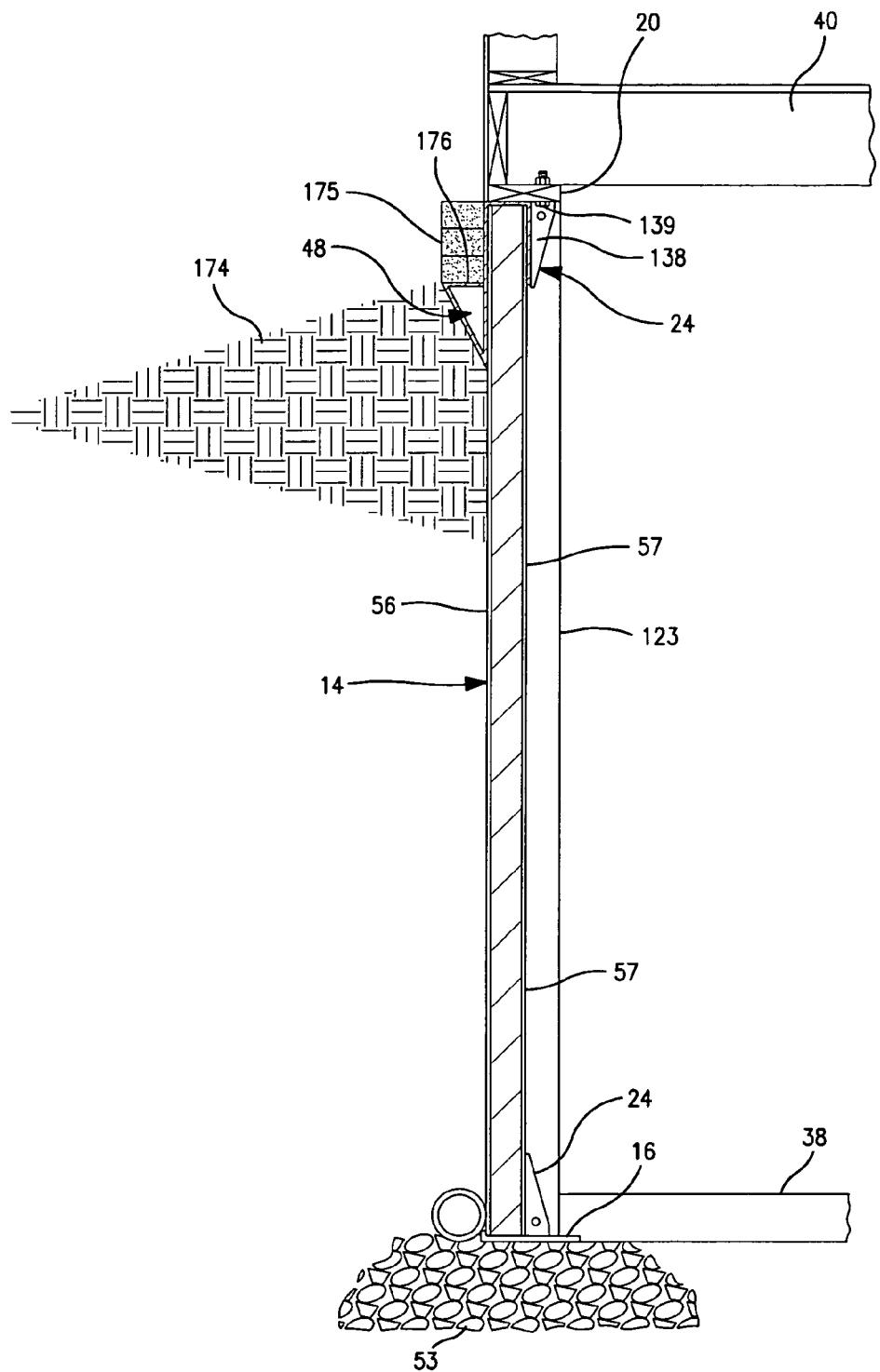
FIG. 9 is an elevation view cross-section of the foundation wall structure illustrated in FIGS. 7 and 8.

A suitable illustrative footer can be fabricated from aggregate stone, illustrated as 53 in FIG. 9 or concrete as illustrated at 55 in FIG. 3. A suitable aggregate stone has a size which passes through a 1 inch mesh and does not pass through a ¾ inch mesh.

Referring to FIGS. 1, 3, and 9, once the foundation wall 10 is in place as illustrated in FIG. 1, on a suitable footer (53, 55), a conventional ready-mix concrete slab floor 38 is poured. The concrete slab floor extends over, and thus overlies, that portion of the bottom plate 16 which extends inwardly from any of the inner surfaces of the wall panels, including both the main run wall section and studs 23. Namely, the concrete slab floor extends to, and abuts against, the inner surfaces of the respective upstanding wall sections 18. Accordingly, once the concrete slab floor is cured, inwardly-directed lateral forces, imposed by the ground outside the building, at the bottom of the wall, and taken in a direction aligned with the width of bottom plate 16, are resisted, opposed, nullified, by the structural e.g. lateral/side-to-side compressive strength of the concrete floor slab 38 in support of foundation wall 10, as the edge of the slab abuts the inner surface of the foundation wall. Thus, inwardly-directed lateral forces which are imposed on the foundation wall adjacent bottom plate 16 are ultimately resisted, and absorbed, by slab 38.

Inwardly-directed lateral forces which are imposed on the foundation wall at or adjacent top plate 20 are transferred to main floor 40 of the building (FIGS. 3, 9, and 9A) e.g. by conventional mechanical fasteners and standard construction techniques which mechanically attach the main floor 40 and the foundation wall 10 to each other, or otherwise cause the main floor and the foundation to act together cooperatively.

Still referring to the main run wall section 22 (FIGS. 1, 3, and 6), and considering the structural environment of typical 1-story and 2-story residential construction, and where foam blocks 32 provide substantial contributions to dimensional stability of the panel, the inner 34 and outer 36 fiberglass-reinforced layers are e.g. between about 0.75 mm and about 3.8 mm (between about 0.03 inch and about 0.15 inch) thick. Thicknesses of the inner 34 and outer 36 layers are generally constant between respective ones of the reinforcing studs 23. The outer layer 36 can be e.g. ribbed to enhance the ability of the wall to withstand the imposition of laterally-directed loads on the wall.

In the embodiments illustrated in FIGS. 1-6, studs 23 run the full height of the main wall section, and extend from inner surface 42 of outer fiberglass layer 36, or the inner surface 52 of the inner fiberglass layer 34, inwardly and/or outwardly, a desired distance so as to provide the desired level of structural strength to wall panel 14. In the embodiments illustrated in FIGS. 1-6, the inner fiberglass layer 34 is wrapped around the inwardly-facing surface 44 of the stud. The wrapping of the fiberglass layer over the stud as illustrated in e.g. FIG. 6 provides a waterproof coating to a wood stud, e.g., without limitation, a 2×4 stud, a 2×6 stud, a 2×8 stud or other dimension stud, so as to make the stud waterproof and insect proof. At the same time, the fiberglass layer wrap incorporates the stud into the unity of the structure of the main wall section, whereby the bending resistance strength of the stud contributes significantly to the overall bending resistance strength of the assembly which defines the main run wall section. Thus, studs 23 function as reinforcing members in wall panel 14.

Compared to e.g. a 2.0 inch thick wall section, 8 feet in height, having no reinforcing member, a corresponding wall which incorporates 2×4 studs on 24 inch centers, wrapped on 3 sides by the inner layer as illustrated, exhibits about 25% increased bending resistance. Such bending resistance is measured by applying a linear load which runs the length of the wall panel at mid-height of the wall panel, and which load is opposed by linear opposing blocking of corresponding lengths at the top and bottom of the wall panel.

Referring to FIG. 6, in designing the main run wall section, both the lateral strength of an upstanding such wall section, and the compressive strength of such wall section, can be reinforced as desired with e.g. "T" section reinforcements 46, or the like, which typically extend the full height of the main run wall section. A given "T" section reinforcement has a flange 47 which extends generally parallel to outer layer 36 and a web 49 which extends transverse to, generally perpendicular to, outer layer 36. Web 49 typically extends across at least half of the distance between the inner layer and the outer layer. "T" section reinforcements 46 can be made of any desired material which can contribute significantly to the structural strength of the wall section. Typical such "T" section reinforcements can be steel, structural fiber reinforced polymer compositions such as resin-impregnated fiberglass structures or fiberglass-reinforced pultrusions, or the like.

Flange 47 of the "T" section can be positioned against either outer layer 36 as shown, or against inner layer 34. In either case, web 49 extends inwardly across the thickness of the wall panel from the inner surface of the respective inner or outer layer. The surface of flange 47, which faces the inner surface of the respective inner or outer layer, is bonded, e.g. adhesively bonded, to the respective inner surface of the inner or outer layer. As adhesive, there can be mentioned respective known construction adhesives. In some instances, the curable resin which is used in making the respective inner or outer layer is also effective to secure the "T" section flange 47 to the respective inner or outer layer. Where the "T" section is placed against outer layer 36, the "T" section can receive fasteners which attach additional layers, such as siding, to the building outwardly of the outer surface of the wall panel.

In place of "T" section reinforcements, a wide variety of other elongate structural constructs 46 can be embedded in the interior of the wall panel. As other cross-section constructs, there can be mentioned, for example and without limitation, cross-section profiles which represent elongate perpendicular-angle 2-leg constructs e.g. eliminating half of the flange 47 shown in FIG. 6, elongate square tubes, elongate round tubes, "H" section structures, "U"-section structures, "I" section structures, and the like. Such construct can comprise multiple webs 49 spaced along the length of the panel, and connected to one or more flanges 47.

Typically, the number of such structural constructs 46 is no greater than the number of reinforcing studs 23, or the like which run the full thickness of the main run wall section.

As desired, the "T" section or other structural constructs 46 can be omitted, whereby the resistance to e.g. gravitational compressive forces and lateral forces, on the wall panel are derived largely from inner and outer layers 34, 36, and reinforcing members/studs 23 and wherein attachment fasteners are directed to stud 23.

FIG. 6 illustrates in dashed outline a wedge-shaped stud reinforcement made of e.g. a resin-fiber composite. Such wedge-shaped reinforcements can be added to the structure to further bolster lateral strength of the wall panel, at studs 23.

Studs 23 can be conventional wood studs as illustrated in FIG. 6, or can be made by wrapping e.g. concentric layers of e.g. resin-impregnated fiberglass sheet on itself until the desired cross-sectional shape is obtained. In the alternative, studs can be fiber-reinforced pultruded structures, either hollow structures or solid structures, namely any elongate structural profile which provides desired structural and spacial properties.

Still referring to FIGS. 1-6, in general, the inner and outer layers of the wall section are fiberglass-reinforced resin sheets, full height and full length of the wall section. The inner and outer layers 34, 36 are e.g. about 0.075 mm to about 3.8 mm thick, optionally about 0.75 mm to about 2.5 mm thick. The blocks 32 of foam fill the entirety of the space between the inner and outer layers 34, 36, except at the studs, where the studs typically fill the entire space, e.g. the full thickness of the wall section between the inner and outer layers, with the foam filling all other space between layers 34 and 36.

Wall section thickness "T" (FIG. 8), in the main-run wall section is defined without respect to the dimensions of studs 23 or 123, and generally stops at the surface 25 of what is later defined herein as space 131. Thickness "T" can be as little as about 2 inches between the inner and outer surfaces of the wall, to as much as about 8 inches or more, as measured between the outer surface of layer 34 and the outer surface of layer 36, and ignoring studs 23 for purposes of defining thickness "T". Typical wall thickness is about 3 inches to about 6 inches.

The top plate and bottom plate can be conventional e.g. wood materials, with suitable waterproofing as appropriate for the intended use. In order to avoid issues of moisture contact with wood, typically the bottom plate is a fiberglass-reinforced resinous composite, of sufficient thickness and rigidity to provide the level of weight bearing capacity anticipated as being necessary, for supporting the structure to be supported.

As used herein, all fiberglass/resin composite structures, such as bottom plate 16, top plate 20, studs 23, and the like, can be fabricated using known techniques of dry or pre-impregnated fiberglass blanket manipulation and construction, and resin impregnation of such materials, chop spray processes, vacuum infusion processes, pultrusion, or other known processes for making fiber-reinforced composites, in order to make the desired 3-dimensional shapes. Such techniques can be used, for example, to make bottom plate 16, to make studs 23, the wedge-shaped stud extensions illustrated in dashed outline FIG. 6, or wedge-shaped brackets 24, and the like.

Structural building panels of the invention can be manufactured in any of the standard dimensional sizes, as well as in a variety of other size combinations desired for a particular building project. Thus, for example and without limitation, such panels can have heights of about 4 feet, which accommodates use of the panels in 4-foot frost walls. Height of about 9 feet accommodates use of the panels in standard-height basement walls and standard-height above-grade walls.

Thickness of the panels typically ranges from about 3 inches nominal thickness to about 8 inches nominal thickness. Studs described elsewhere herein can extend inwardly from such nominal dimensions. At least 3 inches is typically desired in order to obtain necessary bending resistance, as well as desired thermal insulation properties. However, additional bending resistance can be obtained through the use of studs which extend inwardly from the nominal thickness. Further, additional thermal insulation properties can be obtained by adding conventional insulation material between studs at the inner surface of the panel.

Typically, thickness greater than 8 inches is not needed in order to satisfy structural demands of thermal insulation demands. However, in some instances, where extraordinary thermal or structural demands are to be imposed on the building panels, then thickness greater than 8 inches is contemplated.

Lengths of the panels is limited only by transportation limitations. For example, such panels can be as long as the length of the truck bed which will transport the panels to the construction site. Thus, length is generally limited to about 40 feet, but can be longer as desired where suitable transport is available. However, since an advantage of the panels is limited weight such that the panels can be installed below grade and at grade level without use of a crane, length is in some embodiments limited to lengths which can readily be handled by manual lifting. Thus, lengths are typically no more than about 40 feet based on weight which can be accepted for manual lifting of the panels.

On the other hand, where a crane is to be used, and where suitable transportation is available, the panels can be as long as desired for the purpose intended.

Structural building panels of the invention provide a number of advantages. For example, the structural building panels can be manufactured in a continuous length, and but for shipping, to any desired length, which may be a generic length, for example 10 feet, or 20 feet, or 40 feet, or whatever length or lengths is or are desired. The length needed for a particular portion of a building wall can be cut from a generic-length building panel, at the construction site, to meet specific needs, or can be cut to specific length at the panel manufacturing site. Thus if a shorter length is needed for a particular portion of the wall run, the needed length can be cut e.g. from a 20-foot section or from a continuous section. If a longer length piece is needed, either a longer length panel can be fabricated as a unitary product at the panel-manufacturing site, or 2 pieces can be joined together using suitable straight-run connectors, or corner connectors, as suitable for the particular assembly to be made. The respective building panels can be cut to length, using e.g. a circular saw, a ring saw, or a reciprocating saw, employing e.g. a masonry blade, and assembled on site.

Because the wall assembly is made primarily from fiberglass, resin, and foam, the pounds per cubic foot density, and thus the unit weight per foot of length is relatively small compared to a concrete wall of corresponding dimensions. For example, a building panel 20 feet in length, 8 feet in height, and nominally 3 inches thick, weighs about 230 pounds, including studs 23, and anchor brackets discussed elsewhere herein.

Similarly, a wall 9 feet high weighs about 10 pounds to about 15 pounds per lineal foot. Accordingly, no crane is needed on site for wall erection at or near ground level, or below ground level such as for a foundation wall. Rather, such wall panels can readily be moved by manual labor only. Indeed, 2-4 workers can lift by hand, and emplace, a typical wall section which is 20 feet long, 8 feet high, and 3-5 inches thickness "T". Rough openings for windows 27 and/or doors 29, illustrated in FIG. 1, can be cut on site using the above-noted masonry blade. Accessories, and other connections between elements of the wall and between the wall and other building elements, can be mounted by drilling and bolting conventional building construction elements to the building panel, or by use of self-tapping fasteners driven into the building panel, or by adhesive.

FIGS. 7-9 represent a second embodiment of wall structures, and walls, of the invention, which have a second structural expression of extending the reinforcing structure across the thickness of the wall panel. FIG. 7 represents a top view of a portion of a foundation wall, including a 90 degree corner in the foundation wall. FIG. 8 is an enlarged cross-section, in plan view, of a portion of the foundation wall shown in FIG. 7. FIG. 9 is a cross-section, in elevation view, of a portion of the foundation wall shown in FIGS. 7 and 8.

FIG. 7 shows that a substantial portion of the volume of the foundation wall is occupied by the series of blocks 32 of low-density insulating foam. As in the embodiments of FIGS. 1-6, inner 34 and outer 36 layers of fiberglass-reinforced resin form the generic inner and outer layers of the wall panels 14.

As best seen in FIG. 8, studs 23 are omitted, and at least part of the reinforcing function of studs 23 is provided by a continuous, reinforcing, weaving layer 50. Weaving layer 50 weaves back and forth from one of the inner 34 and outer 36 layers to the other of the inner and outer layers, between each of the foam blocks 32, namely at spaced crossing locations, spaced along the length of the building panel. Such crossings are typically spaced from each other, along the length of the building panel, by about 4 inches to about 24 inches, typically by about 6 inches to about 12 inches. More typically, the foam blocks are about 8 inches wide such that the crossings are spaced about 8 inches from each other. As with the inner and outer layers, for conventional residential single-family construction, the weaving layer, at the crossing locations, has a nominal thickness of about 0.03 inch thick to about 0.14 inch thick.

Thus, referring to FIG. 8, weaving layer 50 extends from left to right along the inner surface 42 of outer fiberglass layer 36, between layer 36 and a foam block 32A to the edge of the width "W" of foam block 32A. Still referring to FIG. 8, at the right edge of foam block 32A, weaving layer 50 turns a 90 degree angle and extends to the inner surface 52 of inner fiberglass layer 34. At the inner surface 52 of inner fiberglass layer 34, the weaving layer makes another 90 degree turn, and extends to the right along inner surface 52 of the inner fiberglass layer along the full width of foam block 32B, then turns and again goes back to the inner surface of outer fiberglass layer 36. Weaving layer 50 thus follows a back and forth path between the inner 42, 52 surfaces of inner and outer layers 34, 36, along the entire length of the respective wall panel 14. Layer 50 is in generally complete surface-to-surface contact with the respective layers 34 and 36, and with the respective foam blocks 32, along the entirety, or substantially the entirety of its path and along substantially all portions of the respective facing surfaces of layers 34 and 36, and foam blocks 32.

The respective layers 34, 36, 50, and foam blocks 32, are all integrally bonded to each other to make a unitary composite structural product. Thus, the weaving layer is attached to respective elements of both the inner and outer layers, whereby the thicknesses of the inner and outer layers, as combined with the weaving layer, vary between relatively substantially thicker portions and relatively substantially thinner portions. Typically, the relatively thicker portions of the combined layers 34, 50 and 36, 50 are at least 50 percent thicker than the relatively thinner portions of the layers 34 and 36. The resultant composite product functions much like an I-beam where layers 34 and 36, and combined elements of layer 50, serve as flange elements of the I-beam-like structure, and the crossing portions of weaving layer 50, function as web elements of such I-beam-like structures.

The foam blocks provide a thermally insulating function. In addition, foam blocks 32, along with the bonding of the respective elements to each other, and the absence of substantial voids in the wall structure, serve to fix each layer 34, 36, and 50 in position along its intended path of traverse, relative to remaining elements of the structural building panel, thereby unifying layers 34, 36, 50 and blocks 32 into a single structural product where the respective elements cooperatively respond together, in support of each other, sharing, with each other, respective portions of the load when outside forces are imposed on the structural building panel.

In general, all the space between the inner surface 57 of the panel and the outer surface 56 of the panel is occupied by one of layers 34, 36, and 50, or by the foam blocks, whereby little, if any, of the space between layers 34 and 36 is not occupied by one of the above-recited panel materials. Typically, substantially all of the inner space is occupied. By so generally filling the space between layers 34, 36, all of the panel members are fixed in their positions relative to each other, and the panel is dimensionally quite stable under designed loading, whereby especially laterally-directed loads imposed on the panel, from outside the building, whether subterranean ground loads or above-grade e.g. wind loads, are efficiently transferred from outer layer 36 to the other members of the panel, and respective portions of layers 34, 36, and 50, and multiple ones of the foam blocks, share in the support of any one load. The resulting panel is stiff, rigid, and sufficiently strong to support all loads, including severe weather loads, to which the building is expected to be typically subjected under normal use environments, including normal seasonal environmental extremes in the given geographical location.

FIGS. 7, 8, 9, and 16 also show a plurality of resin-impregnated hollow fiberglass reinforcing channel studs 123. A respective hollow channel stud 123, as illustrated, is a unitary structure which has first and second flanges 126 interfacing with the outer surface of inner layer 34. Flanges 126 are bonded to inner layer 34 either through the resin which forms part of layer 34, or through a separate adhesive or resin layer which bonds the flanges to layer 34. Upstanding legs 128 extend from flanges 126 to an end panel 130. End panel 130 forms the surface of the channel stud which extends to the greatest extent into the interior of the building, and away from the outer surface 56 of the building panel. In the panel assembly, a hollow space 133 is defined inside a respective stud 123. Hollow space 133 is enclosed by the combination of end panel 130, legs 128, and either inner layer 34 as in FIGS. 8 and 28 or a foam block 32 as in FIGS. 26 and 29.

Flanges 126, legs 128, and end panel 130 generally form a unitary structure. The structure of channel stud 123 can be relatively thin, for example end panel 130 and legs 128 can be about 0.75 mm to about 3.8 mm thick. Typically, the end panel is displaced from the flanges by about 1 inch to about 5.5 inches, optionally about 2 inches to about 3.5 inches. Even in the recited such thin cross-section, in light of the distance between the end panel and the flanges, stud 123 makes a meaningful contribution to the ability of the panel to resist lateral, e.g. bending, forces imposed by ground forces, or wind forces, from outside the building.

Additional contributions to lateral-resistance strength can be developed by making studs according to a more robust structural specification or by placing a rigidifying insert inside the cavities in the studs. For example, studs 123 can be fiber-reinforced pultruded rectangular cross-section studs about e.g. 0.07 inch (1.8 mm) to about 0.5 inch (13 mm) wall thickness.

Figure 26:
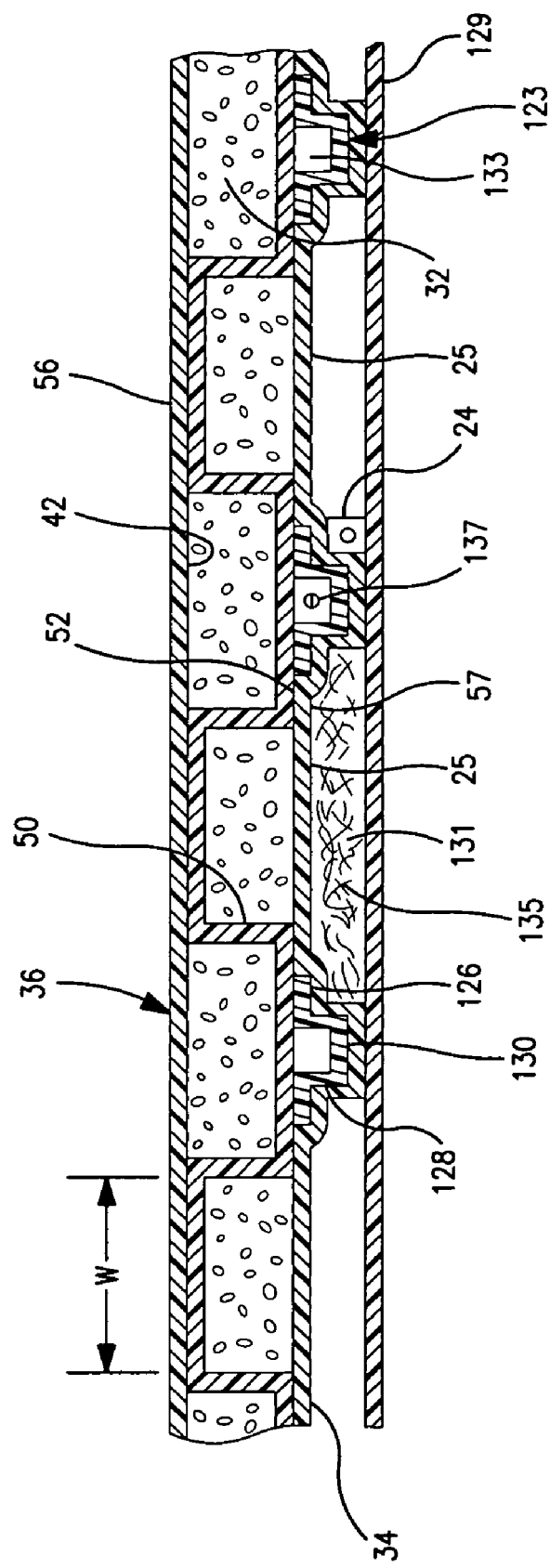
FIG. 26 shows a plan view cross-section of an embodiment of building panels of the invention wherein channel studs are between the inner layer and the foam blocks.

Studs 123 serve multiple functions. As a first function, studs 123 serve as mounting locations, for mounting surface materials such as sheet rock, paneling, or other interior sheet material 129, as illustrated in FIG. 26, to form the interior finished surface of the wall as occupied living space. Still referring to FIG. 26, the space 131 between the studs provides channels for running e.g. additional insulation 135, and/or utilities 137 such as electricity, plumbing, and/or air ducting. Such utilities can also be run internally inside the hollow space 133 defined between an end panel 130 of a stud 123, and layer 34. Another primary function of the stud is that the stud enhances both the vertical compressive strength and the horizontal point loading bending moment resistance strength of the wall. Thus, in the embodiments of FIG. 26, studs 123 and the crossing portions of weaving layer 50 can be collectively designed to provide the strength attributed to structurally-reinforcing stud 23 of FIG. 6.

FIG. 16A shows a second embodiment of studs 123. In the embodiments of FIG. 16A, the two outwardly-disposed flanges 126 are replaced with a single bridging flange 126 which connects the legs 128, whereby a stud 123 of FIG. 16A represents an elongated enclosed rectangular body, encompassing hollow space 133, and open at opposing ends of the stud. The studs 123 of FIG. 16A can be used generally any place the studs of FIG. 16 can be used. For example, such studs can be joined to the panel assembly at the top of inner layer 34 as illustrated the FIGS. 8 and 28. For example, the studs of FIG. 16A can be joined to the foam blocks, and the inner layer 34 applied over the studs as illustrated in FIGS. 26 and 29.

Figure 35:
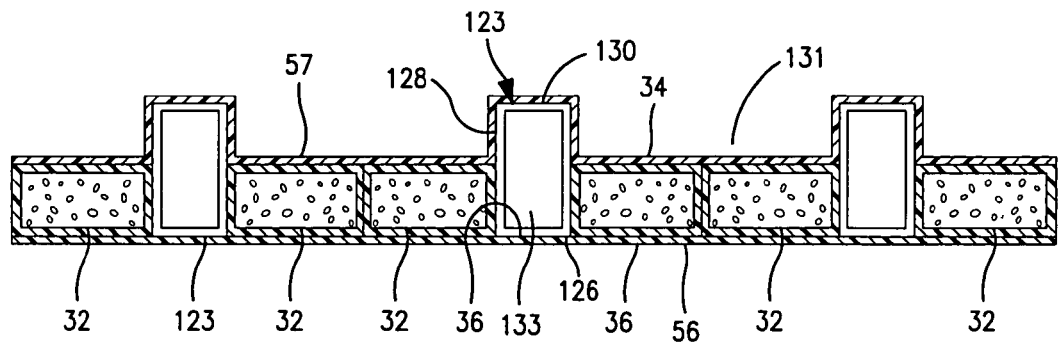
FIG. 35 shows a cross-section of a building panel of the invention incorporating the hollow studs of FIG. 16B.

FIG. 16B shows a third embodiment of studs 123. As in the embodiments of FIGS. 16 and 16A, studs 123 of FIG. 16B are made by impregnating a fiberglass matt with resin in a non-pultruded process, and curing the resin. In the embodiments of FIG. 16B, the two outwardly-disposed flanges 126 are replaced with a single bridging flange 126 as in the embodiments of FIGS. 16A, and the depths of legs 128 are extended, compared to the legs shown in FIGS. 16 and 16A. Namely, legs 128 in the embodiments of FIG. 16B are long enough that the stud can be mounted in the panel assembly at or adjacent outer layer 36. Thus, the studs 123 of FIG. 16B can be mounted in the panel assembly in a configuration wherein the studs 123 replace studs 23 illustrated in FIG. 6. However, studs 123 are typically hollow, whereby the hollow space 133 extends from the outer side of the building panel at layer 36 to end panel 130. FIG. 35 illustrates hollow fiber-reinforced polymeric studs 123 of FIG. 16B assembled into a building panel of the invention.

FIGS. 7-9, 20, and 20A illustrate a plate anchor brackets 24 and 24A. A bracket 24 or 24A is mounted to the interior surface of inner layer 34 at the top of the wall panel, and is optionally also bonded to stud 123 through a side panel 138. Line representations of brackets 24 and 24A are illustrated in FIGS. 20 and 20A. Referring to FIG. 20, top panel 136 of bracket 24 extends transversely from, and is joined to, the top of base panel 134. First and second side panels 138 extend transversely from, and are joined to, both base panel 134 and top panel 136, thus supporting top panel 136 from base panel 134, and supporting base panel 134 from top panel 136.

Base panel 134 of bracket 24 is positioned against inner layer 34 of the wall panel 14 and is mounted to inner layer 34 and optionally is mounted to stud 123 at side panel 138. Panels 134 and 138 can be mounted to inner layer 34 and stud 123 adhesively, or can be pressed into inner layer 34 and/or stud 123 before the inner layer resin, or the stud resin, is cured, whereby the curing of the resin in the inner layer or stud serves to bond panel 134 to inner layer 34 and/or stud 123. Top panel 136 interfaces with and supports top plate 20, and typically is bolted to the top plate as illustrated in FIG. 9, whereby bracket 24 serves to transfer loads between top plate 20 and the main portion of the wall panel, thereby making the top plate an integral part of the foundation wall.

As suggested in FIG. 8, one of side panels 138 is used to attach bracket 24 to stud 123, while base panel 134 is used to attach the bracket to inner layer 34. Accordingly, the second side panel has no attachment function, and can thus be omitted in some embodiments. Bracket 24A of FIG. 20A illustrates such embodiment where bracket 24A is the same as bracket 24 of FIG. 20, with the exception of providing only a single side panel 138.

FIG. 9 illustrates, in side elevation view, the interface of top plate anchor bracket 24 with top plate 20. In the illustrated embodiment, the top plate is a conventional wood board, and is secured to bracket 24 by a bolt 139 through top panel 136. FIG. 9 also illustrates a second anchor bracket 24 used in supporting the interface between the wall panel and bottom plate 16.

Figure 22:
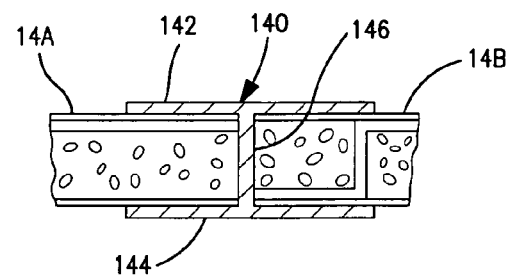
FIG. 22 is a plan view cross-section of a joint in a wall of the invention, joining first and second building panels of the invention using an "H" connector of FIG. 17.

FIGS. 7 and 22 illustrate joining together of two wall panels 14A and 14B using an "H" connector bracket 140. A line representation of "H" connector bracket 140, alone, is illustrated in FIG. 17. In "H" connector bracket 140, first and second parallel flanges 142, 144 are connected, at perpendicular angles, to opposing edges of an intermediate web 146. In some instances, a single flange 142 or 144 can be used on either of the inner surfaces or the outer surfaces of the wall panels which are being joined to each other. The surfaces of the wall panels 14A, 14B, and the "H" connector bracket, where the "H" connector bracket is in surface-to-surface relationship with wall panels 14A and 14B are bonded to each other. Such bonding can be achieved with known adhesives. In the alternative, the surfaces of the "H" connector bracket and/or the wall panels can be coated with uncured portions of the curable resin, which is subsequently cured after the wall panels are joined with the "H" connector bracket at the construction site. Such curing can be done with heat guns or the like if and as heat is a necessary element of the curing of the selected polymeric resin composition.

Figure 23:
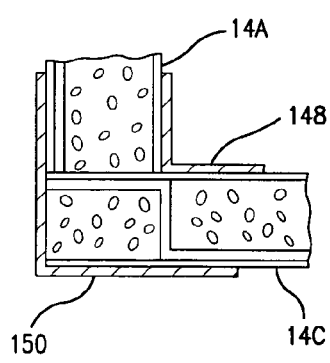
FIG. 23 is a plan view cross-section of a joint on a wall of the invention, joining first and second building panels of the invention at a 90 degree corner, using first and second fixed-angle bracket connectors of FIG. 18.

FIGS. 7 and 23 illustrate joining together of two wall panels 14A and 14C using first and second corner brackets 148 and 150. Each corner bracket has first and second panels 152 which meet at a 90 degree angle at a respective corner 154. A line representation of an angle bracket 148, alone, is illustrated in FIG. 18. Since the only difference between brackets 148 and 150 is the relative widths of the panels 152, only bracket 148 is shown alone as at FIG. 18.

The interfacing surfaces 152 of corner brackets 148, 150 and wall panels 14A and 14C, at panels 152 of the brackets, are bonded to each other. Such bonding can be achieved with known adhesives. Brackets 148, 150 can be held in place with e.g. self-tapping mechanical fasteners while bonding is being achieved. In the alternative, the surfaces of the angle brackets and/or the panels can be coated with uncured portions of curable resin, which is subsequently cured after the panels are joined with the angle brackets at the construction site. Such curing can be done with e.g. heat guns or the like if and as heat is a necessary element of such curing.

Figure 24:
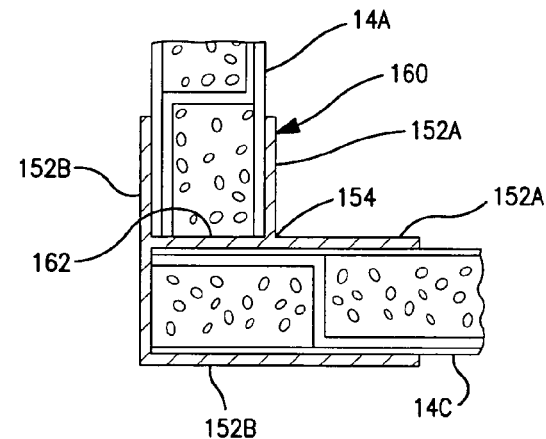
FIG. 24 is a plan view cross-section of a joint on a wall of the invention, joining first and second building panels of the invention at a 90 degree corner, using a single fixed-angle corner bracket to provide control both on the inner surface of the wall and on the outer surface of the wall.

FIG. 24 illustrates a bracket 160 which can be used as a single-bracket corner construct. Bracket 160 has inner panels 152A, outer panels 152B as in brackets 148 and 150, and also has a connecting panel 162 which connects the inner panels to the outer panels at corner 154 where the inner panels 152A meet.

FIG. 19 illustrates a variable-angle bracket 170 which has rigid panels 152, and a flexible hinge area 172 which can be flexed to any included angle of from about 0 degrees to about 180 degrees. Bracket 170 is used to join together wall panels at joints where the panels 14 are neither perpendicular to each other nor aligned with each other. Once rigid panels 152 have been bonded to surfaces of the building panels 14 which are being joined, and the building panels have been set at the desired included angle to each other, the flexible hinge area can be made rigid by applying, to the hinge area 172, a coating of the hardening curable 2-part resin such as is used to make building panels 14 and bracket panels 152. The same bonding, and making rigid, can also be done using well known and conventional, curing, hardening construction adhesives.

FIG. 9 illustrates, in edge view, the addition of a fiberglass/resin support bracket 48 (FIG. 15) against the outer surface 56 of the wall. FIG. 4 illustrates, from a side elevation view of the outer surface of the wall, the extension of support bracket 48 as a brick ledge, along the full length of the main-run wall section. Bracket 48 transfers the weight of overlying bricks 175 to the underlying wall 10.

Still referring to FIG. 9, support bracket 48 extends outwardly from the outer surface 56 of the wall panel a sufficient distance, such as about 4 inches to about 5 inches, to support conventional brick or stone facing on the outside of the building. As indicated in FIG. 9, after completion of the construction work, earth or other backfill 174 typically fills up the excavated cavity around the foundation wall, to a level at or above brick support panel 176, thus concealing bracket 48.

Support bracket 48 can be installed facing inwardly at the top of an e.g. garage wall, thereby providing vertical edge support to a subsequently-poured concrete garage floor. Similarly, bracket 48 can be installed facing outwardly at the top of an e.g. garage or other wall, thereby providing vertical edge support to subsequently-installed brick or stone. First and second complementary brackets 48 can be mounted, one on top of the other, with brick support panel 176 of the first bracket 48 facing away from the building and the brick support panel 176 of the second bracket facing into the building. Such use of 2 brackets provides for wall support of both an adjoining edge of the garage floor and brick or stone exterior fascia, both of which are adjacent the foundation wall.

A line representation of support bracket 48 is illustrated in FIG. 15. In the upright use orientation illustrated in FIGS. 3, 9, and 15, a base panel 178 of bracket 48 is oriented vertically along the outer surface 56 of building panel 14, and can optionally be bonded to panel 14. The brick support panel 176 extends outwardly from the base panel, above the bottom edge of the base panel. A bracing panel 180 extends upwardly from the bottom edge of the base panel to the outer edge of the brick support panel, transferring upwardly-directed structural support from the base panel to the outer edge of the brick support panel. An upper panel 182 extends horizontally from the top edge of the base panel and terminates at a downwardly-directed keeper panel 184. Upper panel 182 and keeper panel 184 collectively mount/hang the support bracket 48 from the top surface of the wall panel 14.

Figure 21:
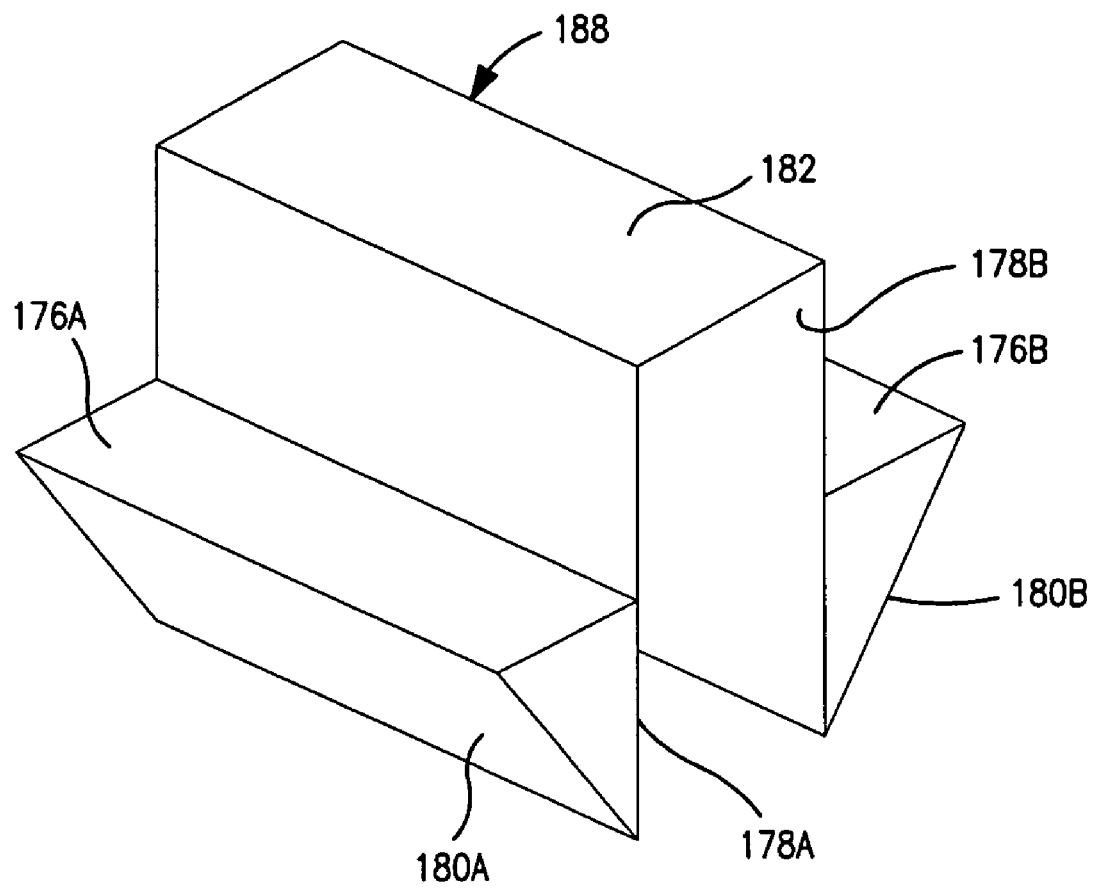
FIG. 21 is a pictorial line rendering of a resin-fiber composite floor and garage apron ledge bracket of the invention.

FIG. 21 illustrates a second embodiment of the support bracket, namely a two-sided support bracket which is designated as 188. Bracket 188 is designed and configured to support both (i) an edge of a garage floor which generally abuts the inwardly-facing surface of the foundation wall and (ii) a brick or stone fascia which generally faces the outwardly-facing surface of an upper portion of the foundation wall, as well as an upstanding e.g. above-grade wall which overlies the foundation wall. The edge of the garage floor overlies a first support panel of the support bracket and thus loads the support bracket on the inward side of the foundation wall. The brick or stone fascia overlies a second support panel of the support bracket and thus loads the support bracket on the outward side of the foundation wall. The loads imposed on the support panels are passed from the support bracket through the foundation wall to the footer, and thence to the underlying soil or other natural base which supports the respective wall.

As with support bracket 48, the two-sided support bracket 188 is installed at the top of the wall panel such that upper panel 182 bears upon the top surface of the wall panel. Base panel 178A extends downwardly from upper panel 182. Support panel 176A extends outwardly from base panel 178A, and is supported by bracing panel 180A. A second base panel 178B extends downwardly from upper panel 182, typically but not necessarily, a similar distance as base panel 178A so as to terminate at a lower edge having generally the same installed elevation as base panel 178A. Support panel 176B extends outwardly from base panel 178B, and is supported by bracing panel 180B.

A single support bracket 188 can thus be used in place of the above-recited first and second support brackets 48 where a concrete grade-level garage floor abuts the top of the foundation wall and a brick or stone fascia is mounted to the other side of the foundation wall.

Figure 9A:
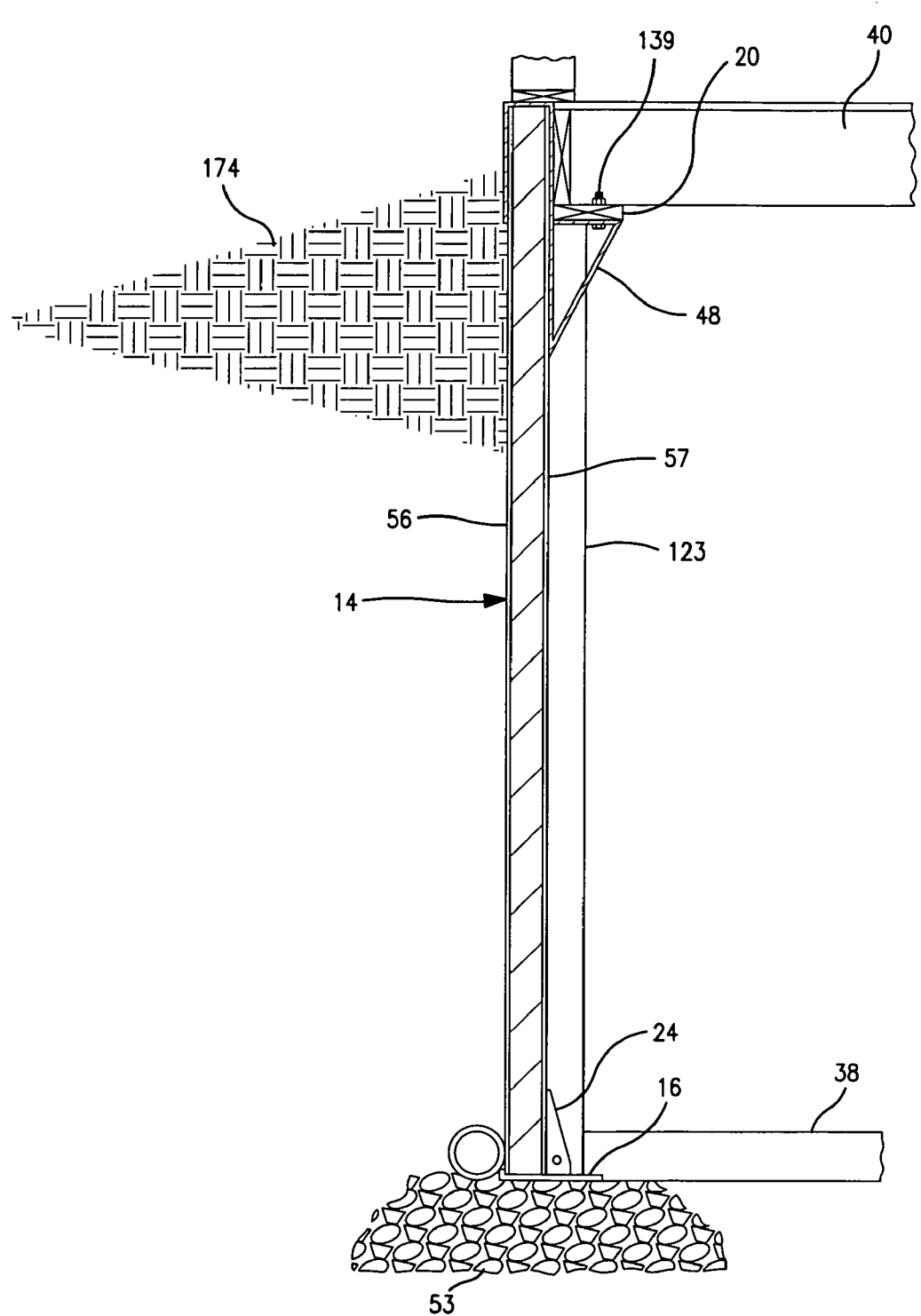
FIG. 9A is an elevation view cross-section as in FIG. 9, illustrating a different arrangement for supporting an overlying floor.
Figure 9B:
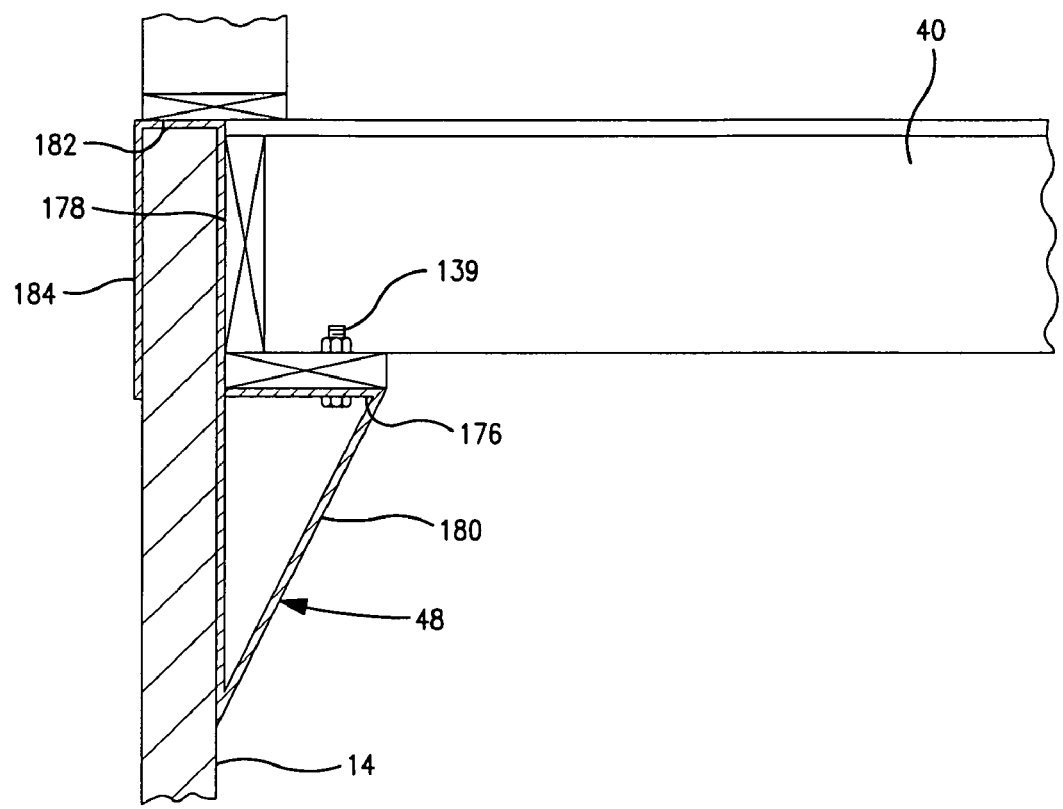
FIG. 9B is an enlarged view of a top portion of the structure shown in FIG. 9A.

Similar to the operation of bracket 48, support panels 176A, 176B transfer the weight of the overlying e.g. loads of the brick or stone fascia, and the edge of the garage floor, to the wall, thence through the footer, and to the underlying natural base of e.g. soil or rock which supports the building. As illustrated in FIGS. 9A, 9B, brackets 48, and correspondingly brackets 188, can be used to support the bottoms of the floor joists or other floor support members below the top of the wall such that the top of the floor 40 is at an elevation no higher than a height which is defined above the foundation wall a distance less than one time the height of the floor structure. In the embodiment shown, the top of the floor structure is at approximately the same elevation as the top of the foundation wall. The ends of the floor support members are disposed inwardly of the outer surface of the foundation wall and inwardly of inwardly-facing surface 25 of the foundation wall. The sub-floor and finished flooring, which overlie the floor support members, can extend beyond the floor support members as desired. Such lowering of the height of e.g. a ground floor can facilitate construction for handicapped entry to the building.

Similarly, brackets 48 can be configured to support the bottoms of the floor joists at any desired elevation below the top of the wall such that the top of the floor is at any corresponding elevation, relative to the top of the foundation wall, up to a maximum height which is about the same as the elevation shown in FIG. 9. Such configuring of brackets 48, 188 can thus be used to support floor joists corresponding to building floors which are above grade as well as building floors which are below grade. For example, where 2 floors of a building are below grade, brackets 48 can be so used to support floor joists on such below-grade floors, as well as one or more above-grade floors.

While brackets 48 and 188 have been described herein as being used with building panels of the invention, brackets 48 and 188, when properly sized and configured, can be used with conventional e.g. concrete walls such as frost walls and foundation walls so long as upper panel 182 is sized to fit on such conventional wall.

Returning again to FIG. 9, bottom plate 16, as illustrated, can be a rather thin, e.g. about 0.18 inch to about 0.50 inch thick, stiff and rigid resinous pultrusion which has sufficient stiffness and rigidity to spread the vertical load for which the panel is designed, out over substantially the full downwardly-facing surface area of the bottom plate, thus transferring the vertical load to the underlying e.g. aggregate stone fabricated base.

In some embodiments, an e.g. conventional concrete footer 55 is interposed between the natural underlying soil, or clean aggregate stone base, and the bottom plate 16. In such instance, any of a wide variety of conventionally available pliable, crushable, and curable liquid, paste, or the like deformable gasketing or other bridging material 51 of changeable form, or gasketing or other bridging material of defined but crushable form, such as sheet material, is laid down on the footer before the wall panel is placed on the footer. Bridging material 51 is illustrated as a somewhat irregular thick dark line between concrete footer 55 and bottom plate 16 in FIG. 3. The wall panel is installed over the intervening gasketing or other deformable material before the deformable material has cured, whereby the small interstices, spaces, between the footer and the wall panel are filled in by the deformable material.

When the deformable material cures, the deformable material becomes a load-bearing, bridging material, whereby the bridging material transfers corresponding portions of the overlying load across the potentially-existing spaces, which have been filled with the bridging material, thus to provide a continuous load sharing interface between the wall panel and the footer along the full length of the wall panel. Such bridging material can be any material sufficiently deformable to take on the contours of both the lower surface of plate 16 and the upper surface of the footer, and which is curable to create the afore-mentioned structural bridging configuration.

Referring again to FIG. 9, concrete slab floor 38 is shown overlying that portion of bottom plate 16 which extends inwardly into the building from the inner surface 57 of wall panel 14, and inwardly from the channel studs 123. Slab floor 38 abuts the inner surfaces of wall panel 14 and channel studs 123, thus stabilizing the bottom end of the wall panel against inwardly-directed forces which reach the lower end of the wall panel.

While described using differing nomenclature, namely wall surface and inner surface, inner surface 57 and wall surface 25 both represent the same face of wall panel 14 when considered away from studs 23 and 123. Contrary to surface 25, inner surface 57 also includes the respective surface of the wall panel at studs 23, 123.

Inwardly-directed forces which reach the upper end of the wall panel are opposed by conventional attachments between the overlying main floor 40 and top plate 20. Inwardly-directed forces which are imposed on wall panel 14 between the top of the wall panel and the bottom of the wall panel are transferred to the top and bottom of the wall panel, thence to the concrete floor and the overlying main floor or floor system, through the stiffness and rigidity of the wall panel as collectively defined by the interactions of the structure defined by layers 34, 36, 50, foam blocks 32, and studs 23, 123, if used. Other reinforcing structure can be included, added to the wall, as desired in order to achieve the desired level of lateral strength and rigidity in the wall structure.

In residential construction, a typical maximum vertical load experienced by an underlying e.g. foundation wall is about 3000 pounds per lineal foot to about 5000 pounds per lineal foot. The vertical crushing load can be applied to the full width of the top of the wall anywhere along the length of the wall Typical maximum horizontal point load bending moment on such wall is about 1000 pounds per square foot to about 1500 pounds per square foot. The horizontal loading is measured at 39 percent of the height up from the bottom of the otherwise horizontally-unsupported wall.

Referring to FIG. 8, a typical wall panel of the invention, for use in underground applications such as foundation walls, has a nominal thickness "T" of about 3 inches. Studs 123 project about 3.5 inches from inner surface 25 of the wall panel. Inner layer 34, outer layer 36, and weaving layer 50 are all fiberglass reinforced plastic layers about 0.07 inch thick. Studs 123 have walls about 0.07 inch thick. Foam blocks 32 have densities of about 2.0 pcf to about 5 pcf. Such typical wall panel has a vertical crush resistance capacity of about 15000 pounds per lineal foot, and a horizontal point loading bending moment resistance of at least about 2000 pounds per square foot.

Depending on the safety factors desirably built into the building panels, the vertical crush resistance can be as little as about 4000 pounds per lineal foot, optionally at least about 6000 pounds per lineal foot, typically at least about 8000 pounds per lineal foot. At least 10,000 pounds per lineal foot can be specified, as can at least 12,000 pounds per lineal foot.

The bending resistance of the wall panel at the locus of maximum horizontal underground loading is typically at least about 1500 pounds per square foot, and up to about 3000 pounds per square foot. Both the vertical crush resistance and the horizontal point loading bending moment resistance can be designed for greater or lesser magnitudes by specifying, for example and without limitation, density of included foam; thickness of layers 34, 36, 50; wall thickness, spacing, and/or depth "T1" of studs 23, 123, or thickness "T" of the panel, or thickness "T" in combination with depth "T1" the structure.

Above-ground side loads, such as wind loads, are less than the above-recited 1500 pounds per square foot. Accordingly, the bending resistance capabilities of building panels intended for above-ground applications can be less than the above-recited 1500 pounds per square foot.

Panels expected to be used in below-grade applications are designed to satisfy the load requirements experienced in below-grade applications, while panels expected to be used in above-grade applications are designed to satisfy the load requirements experienced in above-grade applications. Such design process includes considering weather and/or ground movement history of the use location, as well as other environmental factors. Thus, building panels of the invention include a wide range of panel structures and properties, so as to provide engineered solutions which can be designed to fit the stress environments expected to be imposed on the specific building panels which are to be used in specific uses. One can, of course, also make building panels of generic design which are designed to tolerate a wide range of expected loadings. For example, a first design specification can be made to satisfy most below-grade uses while a second design specification can be made to satisfy most above-grade uses.

Returning to FIG. 1, as suggested above, conventional steel I-beams can be used in combination with wall panels 14 of the invention. As illustrated in FIG. 1, such I-beams are supported from the underlying soil at conventional spacings by posts 28 which transmit loads from the I-beam to the underlying soil, through a load-spreading pad 30. In conventional structures, the load is transmitted by a conventional steel post, to an underlying footer pad of concrete which is poured on the underlying soil.

Figure 10:
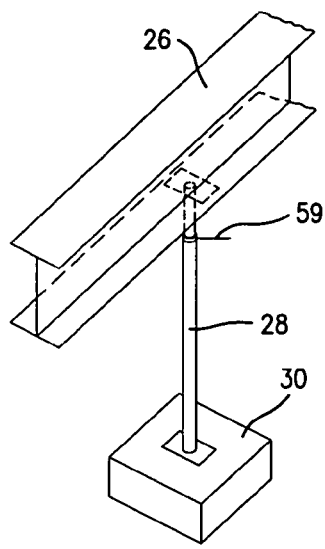
FIG. 10 is a fragmentary pictorial view showing a basement support pad of the invention, supporting a conventional support post which supports an I-beam as in a below-grade basement location.

In the invention, in place of a concrete footer, multiple layers of reinforced polymer composite, such as is used in wall panel 14, are used in fabricating a support pad 30. A typical such support pad 30 is illustrated in FIG. 10, underlying a support post and supporting a structural floor-support beam 26.

Figure 10A:
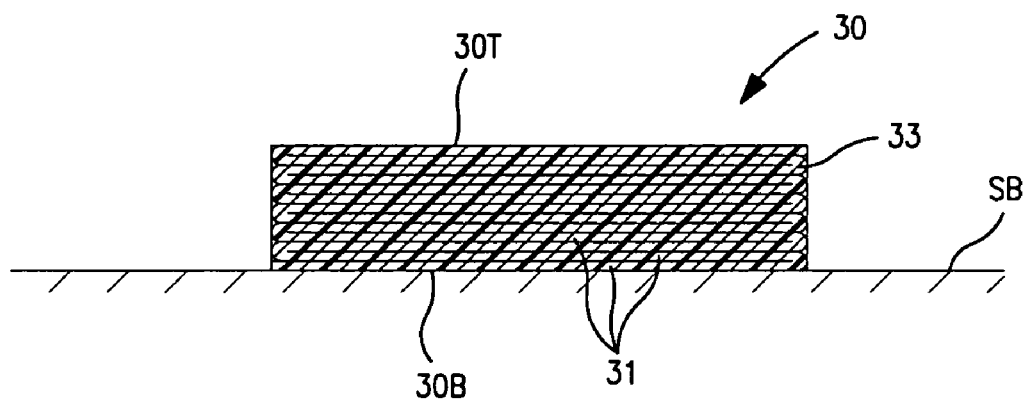
FIG. 10A is a cross-section of a layered support pad illustrated in FIG. 10, shown on an underlying rock or earth support base.

A cross-section of a representative pad 30, on an underlying support base SB is illustrated in FIG. 10A. As illustrated in FIG. 10A, pad 30 has an upwardly-facing top 30T and a downwardly-facing bottom 30B. The surface area of the bottom of the pad is selected to be large enough to spread the overlying load over enough of the natural soil and/or rock underlying support base that the underlying support base can support the overlying load over a generally indefinite period of time without deleterious deformation or flow or other movement of the underlying support base. The pad is constructed of a plurality of generally-extending ones of the fiberglass-reinforced polymer composite layers 31. The layers are, in general, positioned such that at least a substantial portion of a relatively overlying layer overlies a substantial portion of a relatively underlying layer, optionally including geometrically designed intercostals for strength. Typically, the layers are stacked one on top of the other, optionally connected to each other at the edges 33, as by folding one layer into a next-adjoining upper or lower layer, such that the respective stacking of the layers, layer on layer, results in facing, generally horizontally disposed, portions of the respective layers supporting each other, and acting collectively, thus to provide pads having sufficient bending resistance to bear downwardly-directed loads when the pads are in use.

Such layering can be created by folding and stacking a resin-wetted fiberglass layer in a mold, closing the mold and evacuating the air, thus to consolidate the pad, then curing the resin, resulting in the hardened fiber-reinforced polymeric pad. In the alternative, the fiberglass layering can be placed in the mold in dry condition, and the resin can be added while the mold is being evacuated.

Pad 30 is illustrated as having a generally square or round projected area, and as being used for spot support such as in support of a post 28. Pad 30 can have an expanded projected area of any desired projected configuration such as to underlie and support multiple posts in a single area. Further, pad 30 can have an elongate configuration whereby pad 30 can be used as an elongate footer under, and supporting any number of foundation panels 14 when such panels are used in a fabricated foundation wall.

Thus, a typical support pad can have a projected area of about 1 square foot to about 10 square feet when designed to support a point load such as a single post. A pad which is designed to support an e.g. elongate load such as a wall having a length of e.g. 10 feet, 20 feet, 40 feet, or more has an elongate dimension corresponding in magnitude to the length of the wall.

The thickness of the pad is designed to support the magnitude of the anticipated overlying load. Thus, as with the building panels, for each building application, the pad represents an engineered solution based on the anticipated load and load distribution. Magnitude of the load as supported by pad 30 generally corresponds to the load distribution conventionally contemplated for typical single-family residential construction. Thus, the load distribution recited herein for foundation walls can apply such that an elongate pad can support at least 5000 pounds per lineal foot and a round or square pad can support loads of at least about 2000 to about 5000 pounds per square foot, more typically at least 3000-5000 pounds per square foot. Higher loadings can be supported by suitably engineered such pads.

The thickness of a pad, between top 30T and bottom 30B depends in part on the load magnitude and load distribution, and in part on the specific resin as well as the specific structure of the reinforcing fibers and fiber layers, as well as on the nature of the construct of the pad. For light-weight construction, where the pad carries a relatively lighter load, the thickness of the pad can be as little as 1 inch thick. Where the pad bears heavier loads, the pad is thicker, and has the same order of magnitude of thickness that would have been used if the material were steel-reinforced concrete. Thus, pad thickness typically ranges from about 3 inches thick to about 16 inches thick, optionally about 6 inches thick to about 16 inches thick, optionally about 8 inches thick to about 16 inches thick, with all thicknesses between 1 inch and 16 inches being contemplated. Thicknesses less than 3 inches and greater than 16 inches are contemplated where the anticipated vertical load and load distribution, along with the material properties, indicate such thicknesses.

In general, the dimension of thickness is less than either the length or width dimension. As illustrated in e.g. FIG. 1, typically the magnitude of the thickness dimensions is no more than half as great as the magnitude of the lesser of the length dimension or the width dimension.

In any event, the structure shown in FIG. 10A is not limiting as to the layer structuring. For example, the layers of fiberglass can be configured as an elongate roll, where relatively outer layers are wrapped about one or more relatively inner or core layers.

Figure 10B:
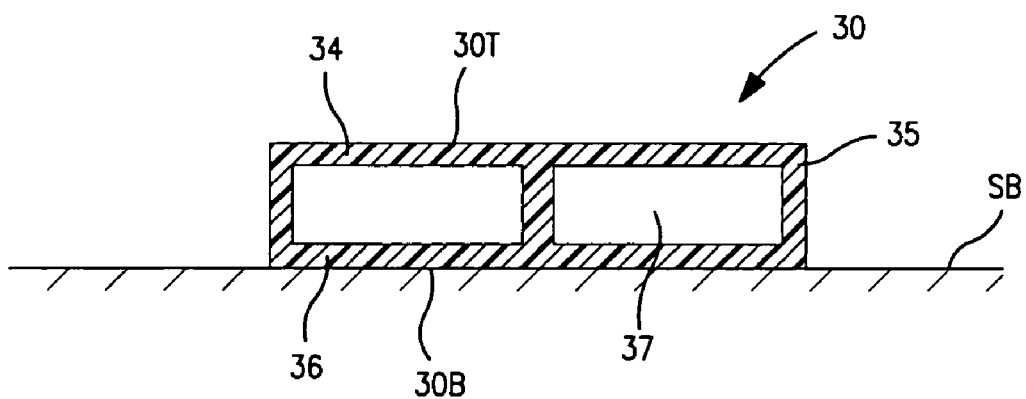
FIG. 10B is a cross-section of a pultruded support pad illustrated in FIG. 10, shown on an underlying rock or earth support base.

In the alternative, as illustrated in FIG. 10B, pad 30 can be a pultruded fiberglass-reinforced polymeric structure such as a solid pultruded plate or a rectangular tube positioned such that a cavity 37 extends generally horizontally through the structure. Such rectangular tube has a generally horizontal top or inner web 34, a generally horizontal bottom or outer web 36, and one or more generally upstanding connecting webs 35 which support the top web from the bottom web. In the embodiment illustrated in FIG. 10B, cavity 37 is hollow. In other embodiments, a honeycomb or other web structure extends the length of the cavity 37, thus providing bridging structure between top web 34 and bottom web 36, which can provide structural support supporting the top web from the bottom web and thereby take on some of the support function of connecting web or webs 35.

The post 28 is generically represented in FIG. 1. While post 28 can be steel, and pad 30 can be concrete where wall panels of the invention are used, the invention contemplates that post 28 can be a hollow fiberglass-reinforced polymer composite structure. Curing resin as in the pad and building panels can be used to mount and bond post 28 to the pad, with conventional shimming as desired.

Such resin-fiber composite post 28 has a generally enclosing structural sidewall. The post sidewall is made of fiberglass-reinforced polymer composite or other fiber reinforced resinous structure. The thickness and rigidity of the post sidewall is designed as known in the art to carry a specified load, thereby to support the weight of an overlying portion of typically an above-grade structure, though below grade structures can be supported as well. The enclosing post sidewall defines an interior chamber disposed inwardly of the enclosing sidewall. The interior chamber is typically empty, but can contain structural or non-structural material as desired.

Where the fiberglass post 28 is used, a fiberglass-reinforced polymer composite cap 58 is typically mounted over the top of the post. Cap 58 has a top wall 60, and one or more downwardly-depending structural skirts 62. Top wall 60 of the cap is sufficiently thick and rigid to receive the load from the overlying beam and transmit the load generally uniformly about the perimeter of the upstanding outer walls of the post, including where the outer walls may be disposed laterally outwardly from the edges of the beam. The structural skirt or skirts are configured such that, when the cap is mounted on the post, with the top wall of the cap bearing down on the top of the post, the inner surface of the structural skirt or skirts is/are in generally surface-to-surface contact with, or close proximity with, the outer surface of the post, such that the skirt structure receives and absorbs typically encountered lateral forces and transfers such lateral forces to the sidewall of the post, thereby preventing the top of the cap from moving laterally relative to the top of the post.

The cap distributes the lateral loads to the post side walls with limited bending of the top wall of the cap, so as to utilize substantially the full load-bearing capacity of the post sidewalls, from at or near the upper edge of the post, along the full height of the post to the underlying pad 30. The cap skirts thus capture lateral forces and transfer such lateral forces to the post.

An alternative to cap 58 is to use a conventional adjustable screw 59 on the top of post 28. Such screw 59 can be used in place of cap 58, or in combination with cap 58, e.g. between cap 58 and overlying beam 26. Where both cap 58 and screw 59 are used, a suitable screw/cap interface is configured in the screw and/or cap to ensure suitable cooperation of the cap and screw with respect to each other.

Figure 11:
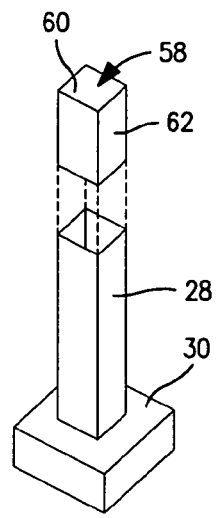
FIG. 11 is a pictorial view of a square resin-fiber composite support post, and resin-fiber composite cap, of the invention, supported by a square resin-fiber composite support pad of the invention.
Figure 12:
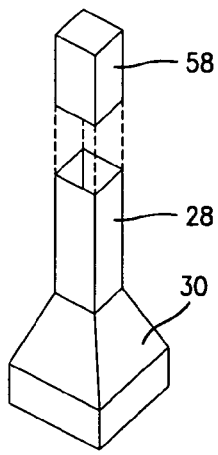
FIG. 12 is a pictorial view of a square resin-fiber composite support post, and resin-fiber composite cap, of the invention, supported by a square resin-fiber composite, upwardly-tapered support pad of the invention.
Figure 13:
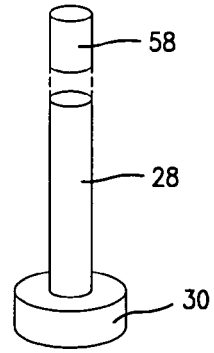
FIG. 13 is a pictorial view of a round resin-fiber composite support post, and resin-fiber composite cap, of the invention, supported by a circular resin-fiber composite support pad of the invention.
Figure 14:
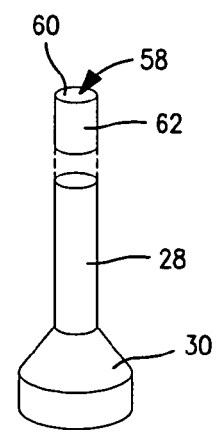
FIG. 14 is a pictorial view of a round resin-fiber composite support post, and resin-fiber composite cap, of the invention, supported by a circular, upwardly-tapered resin-fiber composite support pad of the invention.

FIG. 11 illustrates a square fiberglass-reinforced polymer composite pad 30 of the invention, a square fiberglass-reinforced polymer composite post 28 of the invention, and a square fiberglass-reinforced polymer composite cap 58 of the invention. FIG. 12 illustrates a pad/post/cap combination similar to that of FIG. 11 but where the pad is tapered from the top of a base of the pad upwardly to where the pad meets the post. FIG. 13 illustrates a pad/post/cap combination similar to that of FIG. 11 but where the post, the pad, and the cap are circular. FIG. 14 illustrates a pad/post/cap combination similar to that of FIG. 13 but where the pad is tapered from the top of a base of the pad upwardly to where the pad meets the post.

While the pad/post/cap combinations shown in FIGS. 11-14 can be used on the interior of the building such as in a basement post arrangement as suggested in FIG. 1, a primary purpose of the invention, of avoiding the need to bring a ready-mix concrete truck to the construction site, is advanced by using pad/post/cap combinations such as those illustrated in FIGS. 11-14 in applications outside the foundation of the building, such as to support a deck, a porch, a patio, a light post, or other appurtenance. In such application, the pad and post are set in the ground below the frost line. The post is then cut off typically, but not necessarily, below grade. Conventional structure such as a 4×4 treated wood post is then mounted to the top of cap 58, and the cap is subsequently mounted, e.g. adhesively mounted, to the top of the post. With the e.g. 4×4 post thus extending upwardly, with the cap permanently e.g. adhesively mounted to the post, the hole is filled to grade such that only the conventionally-used wood post remains visible. Thus, typical outside appurtenances to the building can be completed, again without any need to bring ready-mix concrete, or concrete block, to the construction site. This can provide a significant time and cost advantage when only a small amount of concrete would have otherwise been needed, as the trucking cost is fixed, even for a small quantity of ready-mix concrete.

In other embodiments, the fiberglass post 28 can extend above grade, and can support any of a wide variety of suitable overlying structures.

As indicated above, one of the objectives of the invention is to use wall panels and accessory structure in places, and for structural purposes, where concrete would conventionally be used. Use of concrete in foundation walls is common, and the products of the invention are readily adapted to be used in foundation structures.

However, especially in more tropical climates, above-ground outside walls are, in some instances, required to be built with concrete for the purpose of, among other advantages, inhibiting mold growth. Where high wind conditions, such as hurricanes or tornadoes, are common, above-grade outside walls are, in some instances, required to be built with concrete in order to achieve additional lateral strength which can withstand such wind forces.

In such situations, such as in areas frequented by hurricanes or tornadoes, above-ground wall structures of the invention can be used in place of concrete, while achieving the lateral load-bearing properties of concrete and avoiding the e.g. water penetration, and other, limitations inherent in concrete. Accordingly, the wall structures of the invention are contemplated to be useful in above-ground applications as well as below-ground/foundation wall applications.

The Fiber

The reinforcing fiber materials used in products of the invention can be selected from a wide variety of conventionally available fiber products. Glass fiber has been illustrated in the general description of the invention, and is believed to be the most cost effective material. Other fibers which are contemplated as being acceptable include, without limitation, carbon fibers, Kevlar fibers, and metal fibers such as copper and aluminum. Other fibers can be selected to the extent their reinforcing and other properties satisfy the structural demands of the building panel applications contemplated in the invention, and so long as the fibers are not pre-maturely degraded in the use environment contemplated for the respective wall panels.

To that end, use of cellulosic fibers is limited to those compositions where the cellulosic fiber can be suitably protected from the deleterious affect of moisture reaching the fiber and degrading the fiber. Thus, use of cellulosic fiber without moisture protection is not contemplated as part of the invention, except in amounts of less than 10 percent by weight of the overall composition of a given structural element, e.g. panel, bracket, or the like. However, where the fiber is impregnated with a suitable quantity of resin, the resin protects the cellulosic fiber from attack by moisture, and so such composite compositions can be used.

The lengths, widths, and cross-sectional shapes of the fibers are selectable according to the structural demands of the structures in which the building panels or other structures are to be used.

Woven-fiber base sheets, such as woven fiberglass cloth, are contemplated as being efficiently processed into layers for use in building panels of the invention. However, those skilled in the art will recognize that a wide variety of processes, and corresponding ways of handling and processing the fibers, as well as the resin, are available for making the building panels of the invention. The selection of fiber structures can be specified to accommodate all such processes, whereby all fibers which can be employed in all such processes, for example chop, malt, or woven fibrous material, to achieve the desired structural, insulation, and other properties typically desirable in a foundation wall, or an above-grade wall, can be used in building panels and other elements of the invention.

Reinforcing fibers are generally known as dry fibers or pre-impregnated fibers for purposes of the process of fabricating reinforced resinous products with such fibers. The fibers contemplated for use herein are typically dry fibers, though some wet fiber processes are contemplated as being useful in making products of the invention.

The Polymer

The polymer which is used to impregnate and/or carry the fiber can be selected from a wide variety of conventionally available multiple-part reaction-curing resin compositions. Typical resin is a 2-part liquid where two liquid parts are mixed together before the resin is applied to the fiber substrate. Third additional components can be used in the reaction mixture as desired in order to achieve the desired level of reaction curing of the resin. The resin mixture should be sufficiently liquidous to be readily applied and spread about a fiber base sheet/substrate thereby to fill in all of the voids in the substrate. Examples of useful 2-part reaction curing resins include, without limitation, epoxy resins, vinyl ester resins, polyester resins, polyurethane resins, and phenolic resins. Those skilled in the art know that each of the above noted resins represents a large family of reactable materials which can be utilized to make the resultant reaction-cured resin, and are capable of selecting reaction resin combinations for the uses contemplated in the invention. In addition, more than two such resins can be mixed to obtain a desired set of properties in the reaction product or process.

For any set of reaction materials which are used to make the resins illustrated here, any conventional additive package can be included such as, for example and without limitation, catalysts, anti-oxidants, UV inhibitors, fire retardants, and fluidity-control agents, to enhance the process of applying the resin and/or curing the resin, and/or to enhance the properties of the finished product, e.g. weather resistance, fire resistance, hardness, and the like.

Each set of two or more materials which can be mixed and reacted to make the resultant resin product has its own reaction parameters, including desired reaction temperature, catalysts, time required for the curing reaction to take place, and the like. Further, each set of such two or more materials develops its own set of resultant physical and chemical properties as a result of the curing process. Especially the physical properties are influenced by the affect of the included fibers, such that more than two such reactants may be useful in achieving, in the reacted polymer, a desired set of physical properties.

The Polymer/Fiber Composite

In general, dry fiber substrate, woven cloth, or fiber malt, is used as the fiber base for all structural layers such as layers 34, 36, 50; as well as for all other structural elements of the invention such as posts, 28, pads 30, caps 58, channel studs 123, and brackets 48, 140, 148, 150, 160, 170, and 188. Since the objective is to fill in substantially all voids in the fiber substrate with resin, enough resin is added to the fiber substrate to fill all such voids, whereby there should be no air inclusions, or so few air inclusions as to have no material affect on the physical or chemical stability, or the physical properties, of a building panel or other structure built with such resin-impregnated fiber-based layer. Overall, the glass/resin ratio is as high as can be achieved, and not leaving any significant, deleterious voids in the resultant layer once the resin is cured.

In the alternative, layers 34, 36, 50 can be fabricated using pre-impregnated layers of fiberglass, namely fiberglass substrates which have been pre-impregnated with resin before being fabricated into a structural element pre-form, and which can be cured by e.g. application of heat as in a curing oven.

Given the requirement to minimize voids, and using conventional layer-development techniques, the resultant structural layer product, e.g. layer 34, 36, or 50, or other product, is about 30 percent by weight to about 65 percent by weight fiberglass, and correspondingly about 70 percent by weight to about 35 percent by weight resin. Optionally, the resultant layer is about 40 percent by weight to about 60 percent by weight fiber and about 60 percent by weight to about 40 percent by weight resin. A typical resultant layer is about 45 percent by weight to about 55 percent by weight fiberglass and about 55 percent by weight to about 45 percent by weight resin, optionally about 50 percent by weight fiberglass and about 50 percent by weight resin.

According to well-known technology, the number of layers of glass, in combination with the weight of the glass per layer, in general determines the thickness of the resultant layer after the resin-impregnated layer is cured. For example, multiple layers of a 12-17 ounce per square yard layer of woven fiberglass cloth can be impregnated to fill all voids, and to thereby achieve a resultant cured structure which is typically between about 1 millimeter thick and about 2.5 millimeters thick (between about 0.04 inch thick and about 0.10 inch thick). The greater the number of layers of fiberglass which are impregnated, typically the greater the thickness of the resulting impregnated and cured composite reinforced layer.

The top and bottom plates, as well as layers 34, 36, and 50 can be made of such polymer/fiber composite. The bottom plate can be any material which can bear the load imposed on the overlying wall panel. A typical bottom plate is an e.g. about 0.18 inch thick to about 0.50 inch thick fiber-reinforced pultrusion, which is sufficiently stiff and rigid to spread the overlying load to the underlying soil substrate generally uniformly along the length of the panel through an e.g. leveled clean aggregate stone base. The stone may be a crushed stone or an uncrushed aggregate stone.

Top plate 20 can be made of, without limitation, fiberglass-reinforced, or other fiber-reinforced, resinous materials, or other materials such as wood, in the shape conventionally used for a top plate. It is contemplated that a conventional wood-based top plate serves the purpose adequately, and provides for attachment of overlying wood elements such as wood framing, using conventional fasteners and conventional fastening methods.

The Foam

The purpose of the foam, such as in foam blocks 32, is generally two-fold. First, the foam contributes to the structural integrity of the building panel structure by being sufficiently rigid, namely a rigid foam, that the foam contributes significantly to fixing the structural layers 34, 36, and 50 in their designated positions under normal loading of the panel, whether vertical gravitational loading, or lateral loading such as lateral ground loads in below-grade applications, and lateral wind and/or water loads in above-grade applications. Thus, the foam makes a substantial contribution to the dimensional stability of panel 14.

Second, the foam provides substantial thermal insulation to the resulting building panel construct.

In achieving a desirable level of thermal insulation while retaining the foam as a rigid closed-cell material, the foam has a density of about 1 pound per cubic foot (pcf) to about 12 pcf, optionally about 2 pcf to about 8 pcf, optionally about 2.0 pcf to about 5 pcf. Lighter weight foams generally do not provide sufficient rigidity to perform the role of the foam in fixing the structural layers in their designated locations and such lighter-weight foams may be open-cell foams. While heavier weight foams can be used, and typically provide more structural strength, such heavier weight foams provide less than the desired level of thermal insulation properties, and are more costly. In general, the foams used in the invention are closed-cell foams.

Foam blocks 32 can be made from a wide variety of compositions including, without limitation, extruded polystyrene foam, expanded bead polystyrene foam, rigid urethane foam, or polyisocyanurate foam. The foam is moisture resistant, preferably moisture proof, and is chemically and physically compatible with the compositions and structures of layers 34, 36, and 50.

Regarding fixing the respective structural layers in their designated positions, the foam fills all, or substantially all, of the spaces between the respective surfaces of the structural layers 34, 36, and 50, and is in surface-to-surface contact with the respective layers as such layers define the cavities in which the foam is received. In addition, the foam is adhered to the respective structural layers so as to absorb sheer forces between the foam and the respective structural layers.

The foam blocks 32 can be brought into surface-to-surface relationship with one or more of the structural layers 34, 36, 50 after the resin has been applied to the respective fiber substrate which is used to form the layers and before the resin has cured, whereby respective one or more surfaces of the foam blocks, which are in surface-to-surface contact with the respective resin-coated fiber substrate, become wetted with the uncured resin. With the foam in contact with the to-be-cured fiber-reinforced layer, and wetted by the fiber-reinforced layer, the curing of the resin bonds the foam blocks to the structural layer 34, 36, 50 as applies, whereby no separate adhesive is necessarily required to bond the foam blocks to the structural layers.

Throughout this teaching, reference has been made to affixing various elements of the building panels to each other. In some cases, mechanical accessories such as bolts have been mentioned, such as for attaching the top plate to bracket 24. In instances where two elements are affixed to each other, and where both elements contain resin components, especially reaction-cured components, the curing of the resin in any two such structural elements being formed or joined can be used to affix the elements to each other such that no further adhesive need be used. On the other hand, where components are assembled to each other at the construction site, at least in some instances, use of e.g. conventional adhesives and sealants which are known for utility in construction projects, is contemplated.

One example of use of construction adhesive in assembling the foundation wall is affixing the bottom plate to a wall panel 14. Wall panels 14 can be transported to the construction site without top plate or bottom plate, and wherein top plate materials and bottom plate materials can be transported to the construction site separately, although potentially on the same vehicle. Bottom plates and top plates are then affixed to the wall panels at the construction site, as desired. The bottom plate is typically affixed to the bottom of the wall panel with a construction adhesive, with or without the assistance of brackets 24. The top plate can be affixed to the top of the wall panel using brackets 24 and bolts 139, and/or other support as needed, and optionally in addition, adhesive between the top plate and the top of the wall panel.

Brackets 48, 140, 148, 150, 160, and 170 can be adhesively mounted to the building panels. In the alternative, the surfaces of the respective parts, including the respective areas of the building panels, can be coated with a supply of the curing resin before the parts are assembled, and the parts can then be held together for a sufficient time, under satisfactory conditions, which result in the curing of the resin, whereby the curing of the resin develops the necessary level of affixation between the respective parts of the wall.

In the same way, either adhesively or by use of curable resin materials, channel studs 123, support brackets 24, 48, and floor-and-garage apron brackets 188 can be mounted to a wall panel after the wall panel reaches the construction site.

It will be understood that any affixation of bracket 24 to the inner surface of the wall panel must be generally fully developed as to its required operating strength before the top plate or bottom plate, as applies, can be affixed to the wall panel and apply its rated load to bracket 24.

EXAMPLE

In general, wall structures of the invention can be engineered to support any level of compressive load which is contemplated to be applied to the building. For example, and without limitation, using conventional woven fiberglass substrate, a demonstrative foundation building panel, such as the panel illustrated in cross-section in FIG. 8, can be built generally as follows, and having a designed compressive load bearing capacity of about 15000 pounds per lineal foot of the wall panel.

Woven fiberglass is used for the base, e.g. substrate of structural layers 34, 36, and 50, as well as for the base substrate for channel studs 123. The fiberglass substrate can be triax woven fiber substrate having basis weight of about 22 ounces per square yard. Another exemplary fiberglass substrate is a bi/uniax woven fiber substrate having basis weight of about 12 ounces per square yard to about 22 ounces per square yard. Yet another example is a woven roving having basis weight of about 17 ounces per square yard.

The selected fiberglass substrate, for example a 22 ounce woven substrate, is laid out on a horizontally-disposed release material such as a layer of MYLAR® oriented nylon. Other materials may be substituted for the release sheet and become part of the finished wall panel while achieving separation from the processing line as well as to achieve a desired exterior finish on the wall panel. The fiberglass substrate is brushed or otherwise impregnated with a curable 2-part epoxy resin in sufficient quantity and in such process as to fill in substantially all of the voids in the woven fiber substrate, thus to create a first pre-form for outer layer 36 for the wall structure, and wherein the so-prepared pre-form is wet with the epoxy resin which fills substantially all of the voids in the fiberglass substrate.

A plurality of closed-cell foam blocks, about 3 inches thick, 8 inches wide, and extending the full height of the set-up layer 36, are laid on the set-up layer 36, parallel to each other, at spaced locations along the length of the panel. As used herein, height, length, and thickness of a wall panel refers to the panel in its upright use orientation in an upright e.g. foundation wall or above-grade wall. "Width" refers to such height dimension of the construct while the construct is being fabricated in the above-noted horizontal orientation. As the foam blocks are laid on the horizontal pre-form of the first layer, some of the web resin on the pre-form of the first layer transfers to the dry blocks of foam. In the alternative, one or more surfaces of the foam blocks can be pre-wetted with a desired amount of the curable resin. In any event, the foam blocks, on the wet pre-form, bear a certain level of surface liquid in the form of curable resin.

A second wetted weaving layer pre-form, wetted with the same 2-part epoxy resin, is prepared in the same manner as the first outer layer, and is weaved back and forth over the combination of the outer layer pre-form and the foam blocks 32, with the wetted weaving layer weaving back and forth in face-to-face contact with the blocks and the layer 36 pre-form, along the full overall surface of the respective construct, leaving elongate voids in the construct between the respective blocks.

A second set of a plurality of foam blocks 32, optionally pre-wetted with the epoxy resin, is then inserted into the voids between the foam blocks which are already in the structure, thus filling in the entirety of the length and the width of the layer 36 pre-form. Accordingly, the combination of foam blocks 32 and weaving layer 50 pre-form present a generally uniformly flat and continuous top surface of the resulting construct at this stage of assembly of the building panel, and all of the blocks, the layer 36 pre-form, and the layer 50 pre-form, are wet with the epoxy resin.

A third wetted inner layer 34 pre-form is prepared in the same manner as the first outer layer pre-form and the weaving layer pre-form, and is laid on top of, and pressed onto, the construct, such that the third layer pre-form serves as a covering layer covering the entirety of the top surface of the resulting construct. At this stage, the foam blocks are urged toward each other to consolidate the foam blocks and the weaving layer together.

Channel studs 123 can be pressed into, onto the construct at that time if and as desired. Flanges 126 of the channel studs can be pre-coated with the epoxy resin, or can simply be pressed into the wetted surface of the layer 34 pre-form. In general, legs 128 and end panels 130 of the channel studs remain dry, and are not coated with the epoxy resin. A loading bar, loading belt, or other loading structure can optionally be applied across the tops of the channel studs, at end panels 130, pressing the channel studs into the inner layer 34, and correspondingly applying a load in general tending to consolidate the building panel, top to bottom, including channel studs 123, inner layer 34 pre-form, foam blocks 32, weaving layer 50 pre-form, and outer layer 36 pre-form.

The construct is held in the so-assembled and consolidated condition while the resin cures sufficiently to permanently fix the respective elements in the panel construct in their respective locations, thereby to form the resultant building panel 14.

In the resulting panel, the epoxy-resin impregnated 22-ounce fiberglass layers develop cured fiber-reinforced polymeric layers which are about 0.035 inch (0.9 mm) thick.

Figure 25:
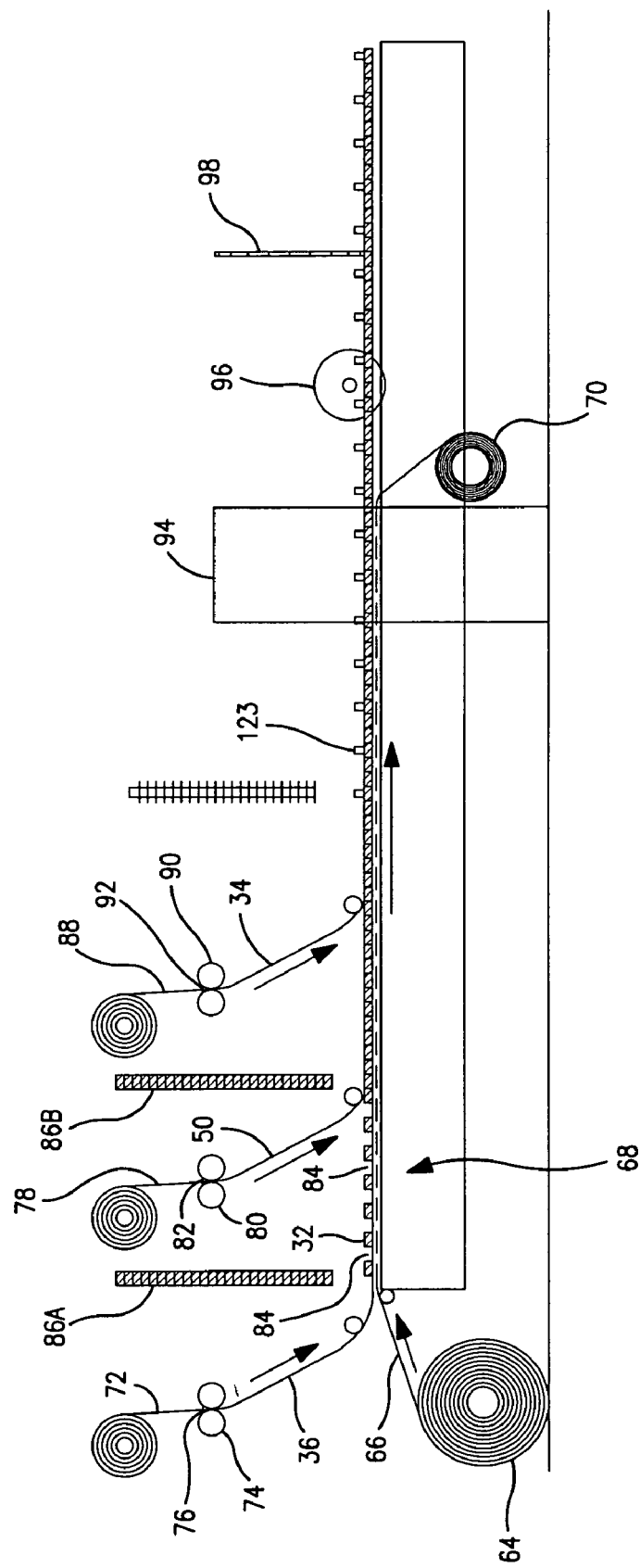
FIG. 25 is a representative elevation view of an exemplary process of the invention which can be used to make building panels of the invention such as those illustrated in FIG. 8.

FIG. 25 illustrates such an exemplary and non-limiting wet laying method by which building panels 14 of the invention can be made in a continuous process, and whereby the so-manufactured building panels can be cut to any desired length at the end of the manufacturing process. As seen in FIG. 25, a first unwind unwinds a roll 64 of a carrier web 66, for example a layer of MYLAR®, and feeds the carrier web to a processing line 68. The carrier web traverses the processing line, carrying various work pieces along the processing line as the building panel is fabricated and hardened. Carrier web 66 is separated from the cured work pieces, work product, at a point after the so-manufactured building panel product has cured sufficiently to be dimensionally stable. After the carrier web is separated from the cured work pieces, the carrier web is wound up on a wind-up roll 70.

A first layer of fiberglass substrate 72 is unwound from a roll of such material and is fed generally downwardly through a pair of nip rolls 74 which carry a puddle 76 of 2-part curable resin, and apply such resin to substrate 72, and squeeze such resin into substrate 72, as the substrate passes through the nip defined between rolls 74, thus to develop a progressively resin-impregnated outer layer 36 pre-form. The wetted pre-form is carried across one or more guiding rolls downwardly and onto carrier web 66, and wherein the carrier web and the progressively-impregnated outer layer 36 pre-form are travelling at approximately the same speed along processing line 68.

Still referring to FIG. 25, a first stack 86A of foam blocks 32 provides a supply of foam blocks. The foam blocks are placed on the outer layer 36 pre-form at spaced locations. The foam blocks extend the full width of the outer layer 36 pre-form. The blocks as illustrated are 8 inches wide and are spaced about 8 inches from each other by voids 84, on the layer 36 pre-form. Foam blocks 32 may or may not be pre-wetted with curable resin, as desired.

A second layer of fiberglass substrate 78 is unwound from a roll of such substrate material and is fed vertically downwardly through a pair of nip rolls 80 which carry a puddle 82 of 2-part curable resin, and apply such resin to substrate 78, and squeeze such resin into substrate 78, as the substrate passes through the nip defined between rolls 80, thus to develop a resin-wetted weaving layer 50 pre-form. The wetted pre-form is carried across one or more guiding rolls downwardly and onto the outer layer 36 pre-form and blocks 32, and wherein the weaving layer pre-form, as it approaches the construct on the carrier web, is travelling at a speed which is faster than the speed of travel of outer layer 36 and foam blocks 32, and which is consistent with weaving the weaving layer into the entirety of the upper surface of the construct, including the upper surface of the outer layer 36 pre-form, the upper surfaces of blocks 32, and the side surfaces of blocks 32 which extend away from and toward the outer layer 36 pre-form.

The weaving layer pre-form thus lies in intimate contact with all previously-exposed surfaces of the underlying construct. The resulting construct has no substantial voids, no substantial air pockets between the weaving layer and the outer layer 36 pre-form, or between the weaving layer and the foam blocks, which cannot be eliminated subsequently in the process. The weaving layer then forms the entirety of the top surface of the resulting intermediate construct. The resulting intermediate construct defines channels extending along the width of the construct, as viewed into the paper in FIG. 25. Restated, the voids 84 between foam blocks 32 at the left side of FIG. 25 remain voids; while the voids have been lined with the weaving layer 50 pre-form.

The voids 84 are then filled with additional foam blocks 32 from a second stack 86B of such foam blocks. The foam blocks may or may not be pre-wetted with curable resin, as desired. After the blocks are in place, the voids 84 have been completely filled by the foam blocks, resulting in a generally flat, and continuous, surface as illustrated in FIG. 25 to the right of the second stack 86B of foam blocks.

A third layer of fiberglass substrate 88 is unwound from a roll of such material and is fed generally downwardly through a pair of nip rolls 90 which carry a puddle 92 of 2-part curable resin, and apply such resin to substrate 88, and squeeze such resin into substrate 88, as the substrate passes through the nip defined between rolls 90, thus to develop a resin-wetted inner layer 34 pre-form. The wetted pre-form is carried across one or more guiding rolls downwardly and onto the top surface of the underlying resin-wetted construct, and wherein the inner layer 34 pre-form and the underlying construct, as carried by the carrier web 66, are travelling at approximately the same speed along processing line 68.

After the inner layer 34 pre-form has been applied to the construct, the resin-welted inner layer pre-form covers the entirety of the width of the top surface of the construct. Channel studs 123 are then optionally applied to the construct, along the width of the construct, at spaced locations along the length of the construct, consistent with the desired spacing of the studs from each other in the finished building panels.

As desired, a weighting or other downwardly-directed force can be applied to the channel studs to assist the channel studs in becoming wetted with the resin which is contained in the inner layer 34 pre-form, and to urge the studs into intimate and bonding contact with the inner layer 34 pre-form. Such load can be applied to each channel stud by a loading structure which is distinct for each stud. In the alternative, a loading structure such as a plate or a belt can be applied to multiple studs, thus bridging the spaces between the respective studs. Such loading structure can take the form of, for example and without limitation, a loading belt. As desired, the load can be applied to the entire surface of the construct in order to further urge resin into remaining voids. As a result of the loading, the number and size of any remaining voids is sufficiently reduced such that any remaining voids are of little or no consequence to the strength of the overall construct.

In the alternative, or in addition, more resin can be applied to the bottom surfaces of flanges 126 of the channel studs, thus to facilitate wetting contact between the stud flanges and the inner layer pre-form.

Once the inner layer pre-form is applied to the construct, and with the channel studs applied according to design, if studs are used, the so-formed construct is passed through a curing oven 94 or other curing process, as needed, thus to cure the curable resin. As the resin cures, it sets up, also known as hardening. The chemical concept is that the reactable moieties, in the curable resin components, react to form long chain polymers, with a substantial increase in molecular weight, which results in the transformation of the reacting materials from the liquid form to what is known generally as a solid plastic; thus generally fixing the dimensions of the reaction products such that the reaction products are dimensionally stable, and making the resultant panel into the stiff and rigid fiber-reinforced product which is desired for building panels 14.

As the reacted, hardened, construct emerges from the curing process, the construct/product is sufficiently rigid, stiff, durable, dimensionally stable as to have no further need for carrier web 66, whereby carrier web 66 is stripped away from the construct/product and wound up on wind-up roll 70.

An additional layer can be added between carrier web 66 and outer layer 36, for example as an appearance layer to enhance the appearance of the outer surface of the resultant building panel. Such layer can be added as e.g. a gel coat, or as a pre-formed layer. As a pre-formed layer, such layer can be used in place of carrier web 66; such additional layer becoming part of the so-manufactured building panel product. In such instance, the additional layer is installed at unwind roll 64 instead of the MYLAR material, and wind-up 70 is no longer needed.

In the alternative, or in addition, and still referring to FIG. 25, a gel coat layer or other appearance layer can be added on top of inner layer 34, optionally on top of channel studs 123, to provide a desired appearance to the inner surface of finished building panel 14.

The product made according to the process illustrated in FIG. 25 can be a continuous-length product. Edge trim saws 96 on opposing edges of processing line 68 trim the edges of the construct to obtain a resultant desired width of the construct. A cut-off saw 98 extends transversely across the processing line. Saw 98 is used to periodically make a transverse cut across the so-produced construct, thus to cut off building panels, from the continuously-produced construct, at desired lengths.

Figure 27:
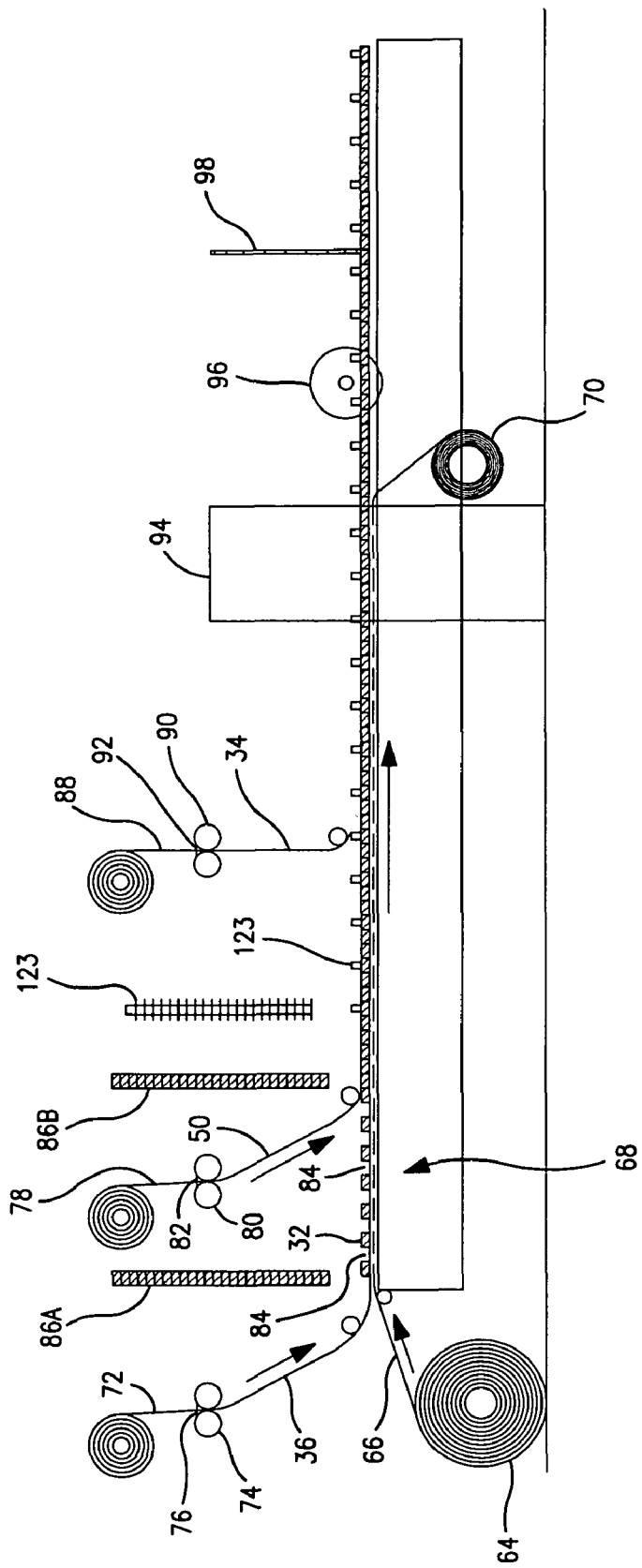
FIG. 27 is a representative elevation view of an exemplary process of the invention which can be used to make building panels of the invention such as those illustrated in FIG. 26.

Still reflecting on the machines and processes illustrated and described with respect to FIGS. 8 and 25, another embodiment of building panels of the invention is illustrated in FIG. 26, and an exemplary process for making such building panel is illustrated in FIG. 27.

Turning now to FIG. 26, outer layer 36 weaving layer 50, and foam blocks 32 are the same materials, the same structures, and in the same relative positioning as in FIG. 8. The primary difference between the embodiment of FIG. 8 and the embodiment of FIG. 26 is that studs 123 are positioned between weaving layer 50, at locations remote from outer layer 36, and inner layer 34. In such structures, studs 123 are held in the assembly by the entrapment of the studs 123 between weaving layer 50 and inner layer 34. Any adhesion between studs 123 and the weaving layer can operate to further hold, and fix, the position of studs 123 in the assembly. Location of studs 123 is illustrated in FIG. 26 as being on weaving layer 50 such that the weaving layer is between a foam block and the inner layer.

FIG. 27 illustrates a method by which building panels 14, as illustrated in FIG. 26, can be made in a continuous process, similar to the process illustrated in FIG. 25. As seen in FIG. 27, a first unwind unwinds a roll 64 of a carrier web 66, for example a layer of MYLAR®, and feeds the carrier web to processing line 68. The carrier web traverses the processing line, carrying various work pieces along the processing line as the building panel is fabricated and hardened, and is separated from the cured work pieces, work product, at a point after the so-manufactured building panel product has cured sufficiently to be dimensionally stable. After the carrier web is separated from the cured work pieces, the carrier web is wound up on a wind-up roll 70.

A first layer of fiberglass substrate 72 is unwound from a roll of such material and is fed generally downwardly through a pair of nip rolls 74 which carry a puddle 76 of 2-part curable resin, and apply such resin to substrate 72, and squeeze such resin into substrate 72, as the substrate passes through the nip defined between rolls 74, thus to develop a progressively resin-impregnated outer layer 36 pre-form. The wetted pre-form is carried across one or more guiding rolls downwardly and onto carrier web 66, and wherein the carrier web and the progressively-impregnated outer layer 36 pre-form are travelling at approximately the same speed along processing line 68.

Still referring to FIG. 27, a first stack 86A of foam blocks 32 provides a supply of foam blocks. The foam blocks are placed on the outer layer 36 pre-form at spaced locations. The foam blocks extend the full width of the outer layer 36 pre-form. The blocks as illustrated are 8 inches wide and are spaced about 8 inches from each other on the layer 36 pre-form, with voids 84 between the respective blocks. Foam blocks 32 may or may not be pre-wetted with curable resin, as desired.

A second layer of fiberglass substrate 78 is unwound from a roll of such substrate material and is fed vertically downwardly through a pair of nip rolls 80 which carry a puddle 82 of 2-part curable resin, and apply such resin to substrate 78, and squeeze such resin into substrate 78, as the substrate passes through the nip defined between rolls 80, thus to develop a resin-wetted weaving layer 50 pre-form. The wetted pre-form is carried across one or more guiding rolls downwardly and onto the outer layer 36 pre-form and blocks 32, and wherein the weaving layer pre-form, as it approaches the construct on the carrier web, is travelling at a speed which is faster than the speed of travel of outer layer 36 and foam blocks 32, and which is consistent with weaving the weaving layer into the entirety of the upper surface of the construct, including the upper surface of the outer layer 36 pre-form, the upper surfaces of blocks 32, and the side surfaces of blocks 32 which extend away from and toward the outer layer 36 pre-form.

The weaving layer pre-form thus lies in intimate contact with all previously-exposed surfaces of the underlying construct. The resulting construct has no substantial voids, no substantial air pockets between the weaving layer and the outer layer 36 pre-form, or between the weaving layer and the foam blocks, which cannot be eliminated subsequently in the process. The weaving layer then forms the entirety of the top surface of the resulting intermediate construct. The resulting intermediate construct defines channels extending along the width of the construct, as viewed into the paper in FIG. 25. Restated, the voids 84 between foam blocks 32 at the left side of FIG. 25 remain voids; while the voids have been lined with the weaving layer 50 pre-form.

The voids 84 are then filled with additional foam blocks 32 from a second stack 86B of such foam blocks. The foam blocks may or may not be pre-welted with curable resin, as desired. After the blocks are in place, the voids 84 have been completely filled by the foam blocks, resulting in a generally flat, and continuous, surface as illustrated in FIG. 27 to the right of the second stack 86B of foam blocks. At this stage, the foam blocks are urged toward each other to consolidate the foam blocks and the weaving layer together.

Channel studs 123 are then applied to the construct, along the width of the construct, at spaced locations along the length of the construct, consistent with the desired spacing of the studs from each other in the finished building panels. In the embodiment illustrated in FIG. 26, studs 123 are positioned on weaving layer 50 at locations where the weaving layer is remote from outer layer 36.

A third layer of fiberglass substrate 88 is unwound from a roll of such material and is fed generally downwardly through a pair of nip rolls 90 which carry a puddle 92 of 2-part curable resin, and apply such resin to substrate 88, and squeeze such resin into substrate 88, as the substrate passes through the nip defined between rolls 90, thus to develop a resin-welted inner layer 34 pre-form. The wetted pre-form is carried across one or more guiding rolls downwardly and onto the top surface of the underlying resin-welted construct. The speed of layer 34 is accelerated relative to the speed of travel of the underlying construct, whereby layer 34 is applied over studs 123 such that the full strength of layer 34, when cured, holds the studs in their designated locations in the completed wall structure.

After the inner layer 34 pre-form has been applied to the construct, the resin-wetted inner layer pre-form covers the entirety of the width of the top surface of the construct, including covering studs 123.

By positioning studs 123 over those portions of the weaving layer which are remote from outer layer 36, the weaving layer and the inner layer reinforce each other adjacent studs 123, whereby the coordinated locations of the weaving layer, the inner layer, and the studs provide cooperative and cumulative bending strength/resistances to external forces which are directed inwardly into the building.

Once the inner layer is cured as at curing station 94, the configuration of the inner layer adjacent the studs 123 permanently takes on generally the same configuration as the studs. Accordingly, the strength characteristics taught above for studs 123 are much less important in embodiments represented by FIG. 27, whereby the structure and/or materials from which studs 123 are made still can, but need not, provide substantial structural strength to the building panel. Rather, such strength is available from inner layer 34. In such structures, studs 123 can be made from, for example and without limitation, blocks of foamed polystyrene, polyurethane, or other foamed polymer, or other relatively lower cost material of choice, so long as the structural strength of the studs is sufficient to support the desired structure and lay of inner layer 34 in its pre-form state and until such time as inner layer 34 has been cured.

Figure 28:
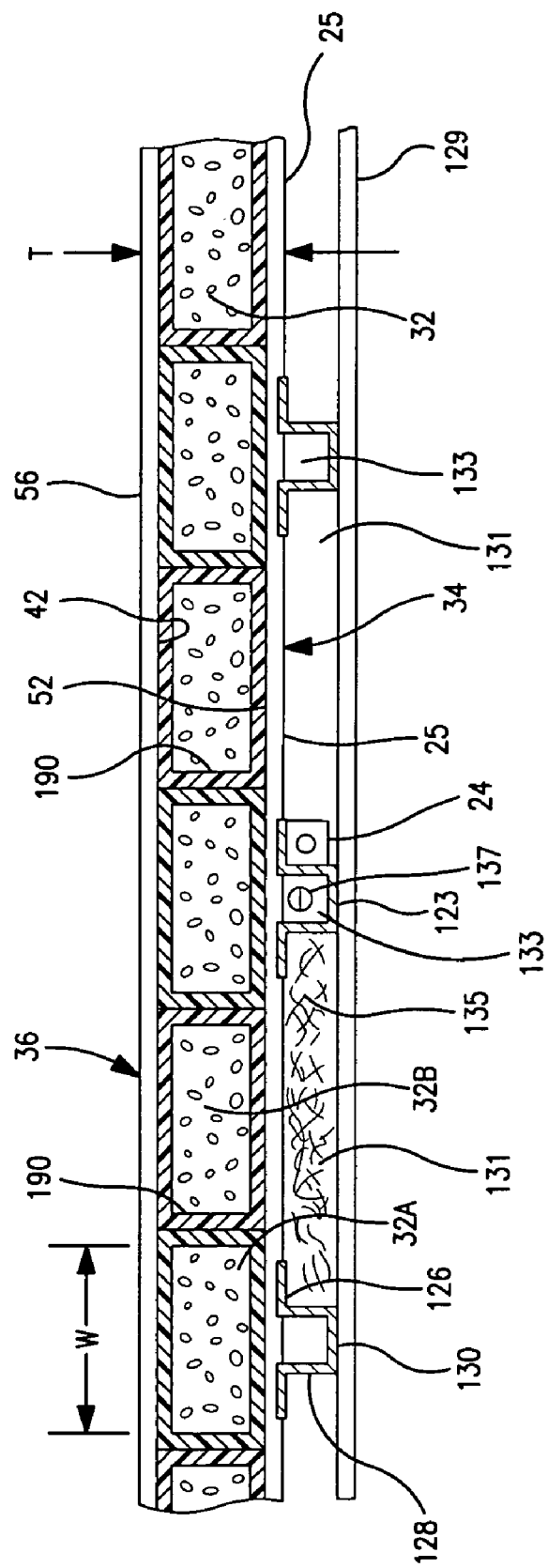
FIG. 28 shows a plan view cross-section of an upstanding building panel of the invention wherein foam blocks are enclosed in pre-wrapped and cured layers of fiberglass/resin composites before being joined to the inner and outer layers.
Figure 29:
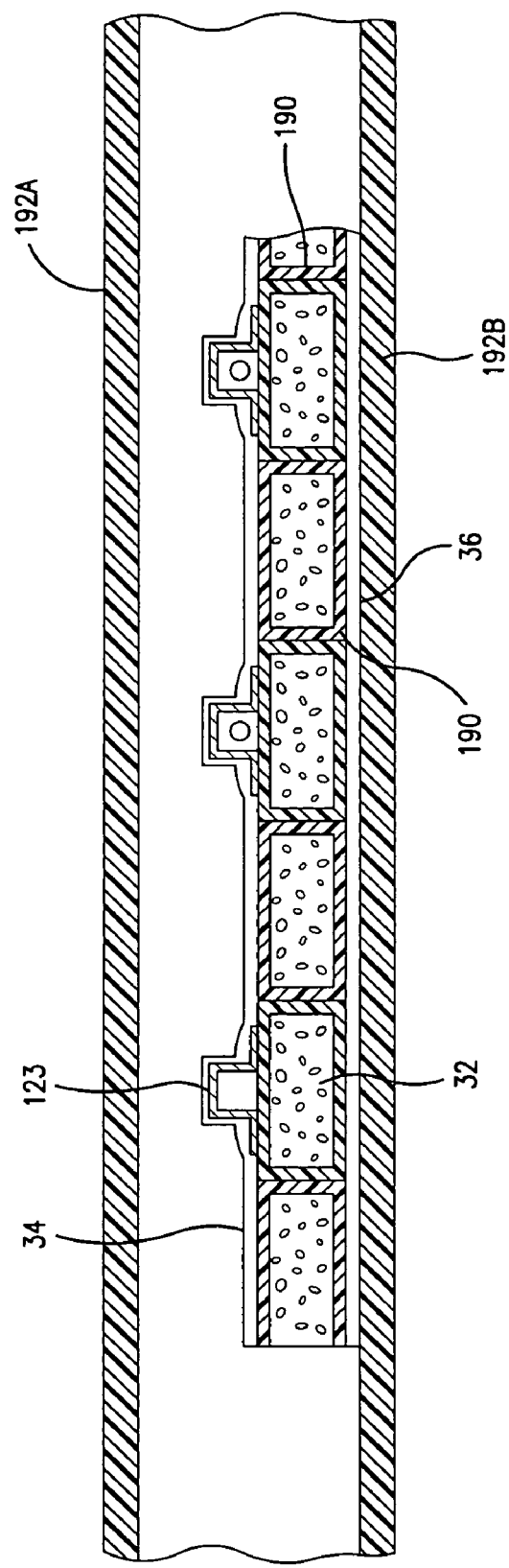
FIG. 29 illustrates a fragmentary end elevation view of a building panel pre-form in a vacuum infusion process being used to fabricate a building panel of the invention using pre-wrapped foam blocks as in FIG. 28 and an overlying inner layer as illustrated in FIG. 26.

Another embodiment of building panels of the invention is illustrated in FIG. 28. In the embodiment of FIG. 28, each foam block 32 is wrapped in one or more layers 190 of resin-impregnated fiberglass which closely and intimately wraps the longitudinally-extending outer surfaces of the block, optionally the entirety of the longitudinally-extending outer surfaces of the block.

The resin may be added to the wrapped fiberglass layers on one or more sides of the foam blocks before the foam blocks are introduced into the process of assembling building panels of the invention. Such pre-added resin in the wrapped fiberglass layers may be cured prior to assembly of the foam blocks into a panel. In the alternative, the resin may be cured later, along with the curing of the resin in the inner and outer layers.

In the alternative, the entirety of the resin used to consolidate the wrapping layers and bond the wrapping layers to the foam can be added to, dispersed in, the fiberglass layers of the foam blocks after the foam blocks have been assembled with some or all of the remaining elements of the panel structure.

The fiberglass in a wrapping layer can be applied as a winding of overlapping strands of fiber in a pattern which extends along the length of a given block of foam. In the alternative, the fiberglass can be a pre-woven matt of fiberglass which is wrapped about the foam block so as to form e.g. a butt joint or an overlapping joint where the ends of the wrap layer meet.

Whether the wrapping layer is applied as a winding of overlapping strands or as a woven fabric, the wrapping layer can represent an open pattern where some of the foam surface is exposed to casual visual observation through openings in the wrapped pattern. In the alternative, the wrapping layer can represent a closed pattern where the fiberglass strands visually obscure substantially all of the underlying surface of the foam block.

Given the presence of the wrapping layers, weaving layer 50 is not used.

An exemplary process for making building panels of FIG. 28 is e.g. a vacuum infusion process, illustrated in FIG. 29. In FIG. 29, upper and lower layers of the vacuum bag are illustrated as 192A and 192B respectively, and where the bag is still open for assembling of elements of the structure being fabricated. As suggested in FIG. 29, one or more layers of fiberglass pre-form, which will become outer layer 36, are laid out on the lower layer 192B of the vacuum bag. Then the foam blocks 32, pre-wrapped in layers 190, are laid side-by-side on the outer layer pre-form. Next, and optionally, pre-formed and cured studs 123 are added on top of the wrapped foam blocks. One or more layers of fiberglass pre-form, which will become the inner layer 34, are laid over the top of the resulting subassembly, along with any desired resin distribution layer. The vacuum bag is then closed, vacuum is drawn and resin is admitted into the bag, whereby the resin penetrates voids in the fiberglass layers, and voids between surfaces of layers 190, and is cured in the bag according to conventional vacuum infusion practice of filling resin into the bag and curing such resin in the bag; whereby layers 34 and 36, wrapped blocks 32, and studs 123, are all joined together as a unitary composite structure.

In some instances, the wrapping layers 190 are not resin-filled before the vacuum-infusion process, whereby the resin which enters the bag during the vacuum infusion processing fills the voids in the wrapping layers as well as the voids in the layer 34 and 36 pre-forms. In other instances, the wrapping layers 190 have already been filled with resin. In some instances, the resin has been cured, in which case the resin introduced in the vacuum infusion process serves to adhere the respective wrapped blocks to each other, as well as to permeate the inner and outer layer pre-forms thereby consolidating all of the respective components into a unitary composite structure. In other cases, the resin has not been cured, in which case the resin introduced in the vacuum infusion process serves both to adhere the blocks to each other and to the inner and outer layers, and to fabricate the blocks and the inner and outer layers into a single unitary structure. In any such structure, the portions of the resin-impregnated wrapping layers which traverse between the inner and outer layers function as structurally reinforcing layers in the resulting building panel.

Figure 30:
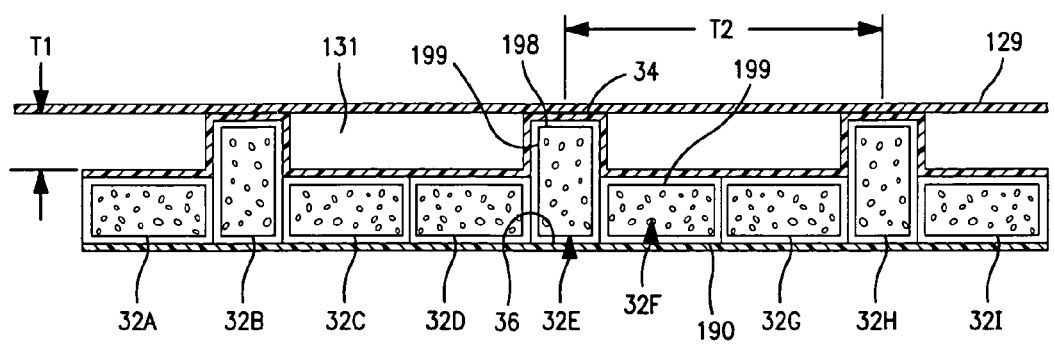
FIG. 30 shows a plan view cross-section of another embodiment of an upstanding building panel of the invention wherein pre-wrapped foam blocks provide the reinforcement structure of the reinforcing member.

FIG. 30 illustrates yet another embodiment of building panels of the invention. In the embodiment illustrated in FIG. 30, the foam blocks 32 are pre-wrapped by fiberglass layers 190, the same as the pre-wrapping discussed above with respect to FIG. 29. Thus, fiberglass layers 190 are pre-wrapped about the foam blocks, and optionally cured, before the foam blocks are assembled into the building panel. Contrary to the FIG. 29 structure, in the structure illustrated in FIG. 30, no channel studs 123 are used to reinforce the building panel. Rather, every third foam block is oriented 90 degrees such that the narrower edges 198 of the respective wrapped foam block elements are oriented toward the inner 34 and outer 36 layers. Thus, in FIG. 30, foam blocks 32B, 32E, and 32H form a second set of foam blocks which are so oriented. The remaining foam blocks, e.g. 32A, 32C, 32D, 32F, 32G, and 32I represent the first set of foam blocks.

Blocks 32B, 32E, and 32H thus perform as structurally-reinforcing members, previously illustrated as studs 23 and 123, and are hereinafter referred to as studs.

In the first set of foam blocks/elements, the relatively wider sides 199 of the foam elements face toward the inner and outer layers. In the second set of foam elements, the relatively wider sides 199 of the foam elements face along the length of the building panel.

In some embodiments, and depending on the specifications requiring that structural strength be contributed by the structurally-reinforcing foam studs 32C, 32F, the density of the foam in the reinforcing foam studs illustrated as 32B, 32E, and 32H can be greater than the density of the foam in the remaining foam blocks, in order to achieve the desired level of structural reinforcement. In other implementations of FIG. 30, the structural requirements of the foam studs 32B, 32E, and 32H are relatively less, such that the foam density in foam studs 32B, 32E, and 32H can be the same as the density in the remaining foam blocks. In yet other implementations, the foam density in foam studs 32B, 32E, and 32H can be less than the density in the remaining foam blocks. Thus, the foam density can be specified as an element in achieving the desired level of strength which is contributed by the rotated foam block studs 32B, 32E, and 32H.

In the alternative, or in combination, such reinforcement strength can be captured according to the thickness and rigidity of the wrapping layers 190 about the respective foam block studs 32B, 32E, and 32H. In some implementations, the wrapping layers 190 about foam block studs 32B, 32E, and 32H are the same as the wrapping layers 190 about the remaining foam blocks. In other implementations, the wrapping layers 190 about foam block studs 32B, 32E, and 32H are thicker or otherwise more rigid than the layers 190 about the remaining foam blocks, in order to achieve greater levels of strength and rigidity in the studs.

In light of the pre-wrapped structure of foam blocks 32, the fiberglass-reinforced wrapping layer 190 can serve the functions of either or both of inner layer or outer layer 36, whereby layers 34 and 36 are optional elements of the building panel of FIG. 30.

In any event, the strength provided in the reinforcing block studs 32B, 32E, and 32H can be manipulated by selectively specifying both the foam density in the respective blocks and the thickness and other characteristics of the fiberglass reinforced wrapping layers 190.

Given the structural orientation of foam blocks 32 in FIG. 30, desirable width and thickness dimensions for the wrapped foam blocks, including the foam block studs, including the wrapping layers 190, are 6.5 inches width and 3.0 inches thickness. Such dimensions provide a commonly-used depth "T1" of space 131 between the studs, of about 3.5 inches, assuming that the thickness of the inner layer 34 is negligible. The illustrated structure, and again assuming negligible thickness of inner layer 34, also provides a commonly-used center-to-center distance "T2" between the foam block studs of 16 inches.

Given the above dimensions, the size of space 131 between a pair of adjacent studs is the same as conventional depth, namely 3.5 inches of conventional wood stud spacings, and a width of 13 inches. Further, the 16 inch center-to-center spacing of the foam block studs provides for conventional attachment of conventional building materials such as 48-inch wide sheeting 129 on the inside of the building panel. Thus, the embodiment of FIG. 30 provides an interface at the inner surface of the building panel to which conventional materials can be mated, joined, using conventional attachment technology and conventional dimensions.

The embodiment of the building panel illustrated in FIG. 30 can be fabricated according to a process similar to that illustrated in FIG. 25. Starting with the process illustrated in FIG. 25, studs 123 are omitted and the weaving layer is omitted. The first stack of foam blocks places 2 blocks side-by-side on the outer layer precursor. The second stack of foam blocks is oriented so as to place the foam blocks on edges 198 rather than on sides 199.

The embodiment of FIG. 30 can also be made by the above-mentioned vacuum infusion process, and wherein wrapping layers 190 may or may not be pre-infused, in whole or in part, and may or may not be pre-cured when placed in the vacuum infusion process.

Pre-wrapped foam blocks 32 in the FIG. 30 embodiments can be replaced by other structurally-reinforcing structures, such as the studs 23 of FIG. 6. Another replacement structure is a pultruded stud having walls about 0.018 inch thick to about 0.50 inch thick. By engineering the thicknesses of the walls of the pultruded stud, the 3-inch width of the reinforcing members can be reduced, such as to 1.5 inches, with corresponding increase in widths of the laid-flat foam blocks, whereby the width of the resulting cavity 131 is 14.5 inches.

Or by wrapping the foam block 32 in additional layers, or thicker layers, of fiberglass-reinforced resin, the strength contribution of the fiberglass wrapping can be increased sufficiently to enable the width of the foam block to be reduced to 1.5 inches, whereupon the width of cavity 131 is again 14.5 inches.

As desired, the width of a stud 23 or a stud 123 can be greater than 3 inches, such as 4 inches, 5 inches, or 6 inches, with corresponding adjustment in the widths of the laid-flat foam blocks to achieve a desired center-to-center spacing of the foam blocks such as 16 inches center-to-center or 24 inches center-to-center.

Figure 31:
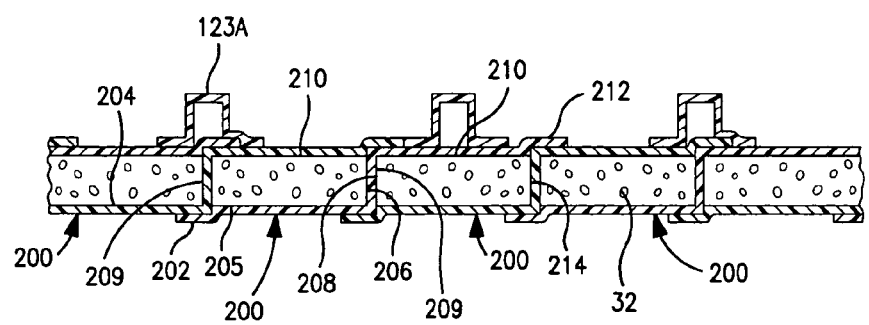
FIG. 31 shows a plan view cross-section of yet another embodiment of an upstanding building panel of the invention.

FIG. 31 illustrates yet another structure for the fiber reinforced polymeric building panels of the invention. In FIG. 31, a series of fiberglass reinforced layer elements 200 collectively function in the capacities earlier described for inner layer 34, outer layer 36, and weaving layer 50. Each layer element 200 extends (i) from a first end 202 thereof adjacent a first outwardly-facing side 204 of a first foam block along the outwardly-facing surface 205 of a second foam block to a second side 206 of the second foam block in place of outer layer 36, (ii) thence extends between that second side 206 of the second block and a first side 208 of a third foam block as a reinforcing member 209, in place of weaving layer 50, to the inwardly-facing sides 210 of the second and third blocks, (iii) thence extends along the inwardly-facing side 210 of the third foam block in place of inner layer 34, to an inwardly-facing side of a fourth foam block and to a second end 212 of the layer 200 adjacent the inwardly-facing side 210 of the fourth foam block.

An adjoining layer element 200 extends along the outwardly-facing side 204 of the second side 214 of the third foam block.

The first 202 and second 212 ends of a given layer element 200 overlap the adjoining layer elements 200 at the reinforcing members 209, whereby each layer element overlies or underlies three of the reinforcing members 209 and reaches proximity to four of the foam blocks.

The depiction of the layers and layer elements in FIG. 31 is exaggerated to show the layering. In actual structures, the overlapped end portions of a given layer element 200 are generally received into the underlying portions of the adjacent layer elements 200, with modest deformation of the underlying foam block, so as to form a relatively flat main inner surface 25 and a relatively flat outer surface 56. Thus, in the FIG. 31 embodiment, each of inner layer 34 and outer layer 36 are constructed from portions of multiple layer elements.

Studs 123, as illustrated, are optionally added as desired in the embodiments of FIG. 31.

Now speaking generically of the invention, fiberglass layers used in the invention, such as and without limitation, layers 34 and 36, can also be made using the well-known chop spray method. In the chop spray method, a layer of fibers is sprinkled or sprayed onto a substrate, and are then covered with a spray of resin. The resin impregnates the sprayed layer of fibers and is cured, thus to develop the respective fiberglass-impregnated layer.

For example, the chop spray method, or any other known method of fabricating fiberglass panels, can be used to fabricate outer layer 36 and inner layer 34. Such inner and outer layers can then be brought together with e.g. the pre-wrapped foam blocks to do the final assembly using either additional resin or suitable construction adhesive. Studs 123 can be added as desired on the outer surface of inner layer using either hardenable resin or construction adhesive.

As an alternative, the inner layer, the outer layer, and the weaving layer can be pre-manufactured as hardened layers of resin-impregnated fiberglass. The pre-manufactured weaving layer is in the configuration shown in e.g. FIG. 8. Foam blocks are optionally added to the cavities on both sides of the weaving layer. The weaving layer, the inner layer, the outer layer, and the foam blocks, if used, are then joined to each other using either additional flowable resin or construction adhesive, or a combination of adhesive and resin, optionally in a vacuum process, optionally a vacuum infusion process.

Figure 32:
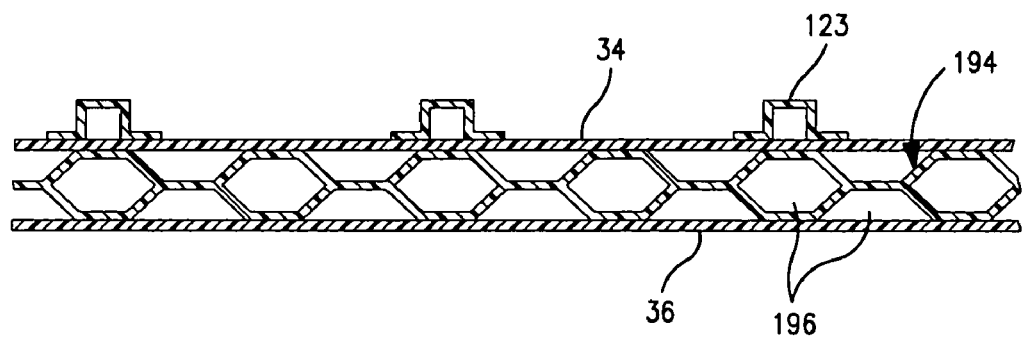
FIG. 32 shows a plan view cross-section of a first embodiment of upstanding uninsulated building panels of the invention.

FIG. 32 shows yet another embodiment of building panels of the invention. Inner layer 34 and outer layer 36 are as discussed earlier with respect to e.g. FIG. 8. Foam blocks 32 are omitted. With the foam blocks omitted, the structurally-reinforcing member, illustrated earlier herein as weaving layer 50, can take on a wide variety of configurations. The spaces between the structurally reinforcing member elements are empty. For example, the structurally-reinforcing member can be a polygonal e.g. honeycomb structure 194. While honeycomb layer 194 can represent a wide variety of structures, the regular hexagonal structure shown is believed to be highly cost effective in terms of strength per unit of mass of the honeycomb structure. The structure surrounding a given cell/cavity 196 can be fabricated using a single layer of e.g. resin-impregnated fiberglass, or multiple layers of resin-impregnated fibrous material. For example, and referring to FIG. 32 specifically, the lower half of the honeycomb layer can be fabricated using a first such layer and the upper half can be fabricated using a second such layer. A given cell 196 can span the full thickness of the space between inner layer 34 and outer layer 36 as illustrated, or can span less than the full thickness such as half of the thickness, or less, whereupon e.g. 2, or 3, or more cells can be used to span the full thickness of the space between the inner and outer layers.

Cells 196 may or may not contain thermally insulating material such as closed cell foam as is used in foam blocks 32 in others of the illustrated embodiments. Where insulating foam is used, an e.g. foam-in-place process can be used to install the foam into the respective cells.

Figure 33:
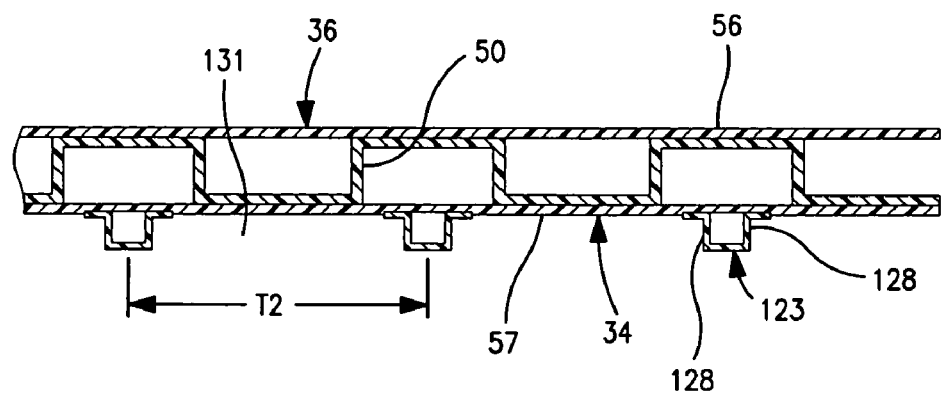
FIG. 33 shows a plan view cross-section of a second embodiment of upstanding uninsulated building panels of the invention.

As a further illumination of the empty-space embodiments represented by FIG. 32, the structurally-reinforcing member can be weaving layer 50 such as illustrated in FIGS. 8 and 26, or a more robust embodiment of such weaving layer 50, without inclusion of the insulating foam, illustrated as FIG. 33.

In the embodiment illustrated in FIG. 33, the width of stud 123, defined between legs 128, is 1.5 inches. Given a center-to-center "T2" distance between studs 123 of 16 inches, the width of space 131 between adjacent ones of the studs is 14.5 inches, which corresponds to the conventional width of commercially available panels of fiberglass batt insulation.

Further, the structurally-reinforcing member can be the wrapping layers 190 illustrated in FIGS. 28, 29, and 30, again with the foam blocks 32 omitted from the structure. Reflecting on both FIGS. 32 and 33, the space between the inner and outer layers can be occupied by materials having a wide variety of other configurations which include, without limitation, circles, ellipses, ovals and other arcuate figures, triangles, and other polygons, as well as a wide variety of corrugate structures.

Figure 34:
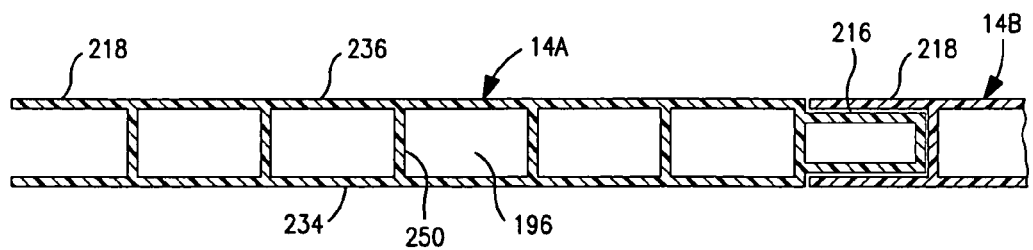
FIG. 34 shows a plan view cross-section of a third embodiment of upstanding uninsulated building panels of the invention.

FIG. 34 shows a cross-section of a building panel of the invention wherein inner layer 234 and outer layer 236, are integral with a structurally-reinforcing bridging member 250. Studs 123 can be used as optional, for example to create a cavity 131 for running utilities or to add insulation, or to further contribute to the strength of the building panel. The building panel as illustrated in FIG. 34 can be made by, for example, a continuous pultrusion process wherein the illustrated cross-section is representative of the product coming out of the pultrusion die. The pultruded product is produced continuously and cut at convenient lengths which represent the height of an upstanding building panel used in e.g. a wall structure. The top and bottom cut ends are covered by top and bottom plates as desired, whether in the manufacturing process or prior to installation at the construction site.

Given that the closed cavities 196 in the structure are empty, all of the strength in the structure is derived from structural elements 234, 236, and 250. Thus, structural elements 234, 236, and 250 are designed as structural members in and of themselves, whereby inner layer 234, outer layer 236, and bridging member 250 have thicknesses relatively greater than the thicknesses of layers 34, 36, and 50 in the embodiments of e.g. s. Thicknesses of layers 234, 236, and 250, in the example illustrated in FIG. 34, can be, for example and without limitation, about 0.04 inch to about 0.5 inch for building panels which are to be used for typical residential or light commercial or light industrial construction.

Cavities 196 can be used as utility runs as desired. In any of the pultruded structures, cavities 196 can be filled with insulating foam or other known insulating materials, as desired, for example and without limitation, by injecting the foam material as a latter stage of the pultrusion process. Any rigidity provided by such insulating material, if any, can be considered in designing especially the thicknesses of elements 234, 236, and 250.

Figure 34A:
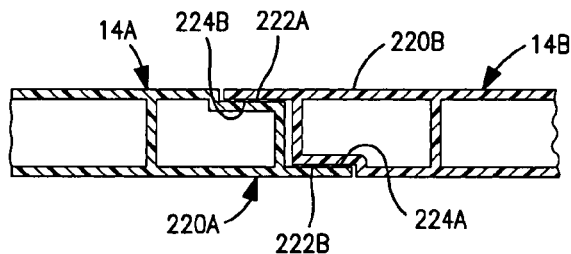
FIG. 34A shows a plan view cross-section of fragmentary portions of first and second upstanding building panels, illustrating edge structures of the two panels.

Exemplary structures of ends of the pultruded building panels, and joinders of adjacent panels, are shown in FIGS. 34 and 34A. FIG. 34 shows a male-female end combination on a building panel 14A. Each panel has a male end 216 and a female end 218. FIG. 34 shows the male end 216 of panel 14A joined to, received into, the female end 218 of a second panel 14B. FIG. 34A shows end joinder structure where both ends 220 of a panel define a first step 222A, 222B and a second step 224A, 224B, each panel having the same end structure at both ends, and all panels having a common end structure. In FIG. 34A, end 220A of panel 14A is joined with end 220B of panel 14B.

Figure 34B:
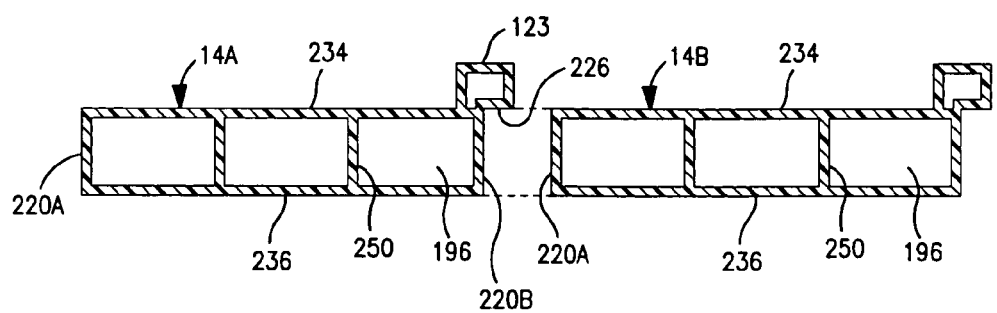
FIG. 34B shows plan view cross-sections of first and second upstanding building panels illustrating edge structures, including integral studs.

FIG. 34B shows first and second pultruded panels 14A, 14B, similar to the panels illustrated in FIGS. 34 and 34A, including bridging members 250. In FIG. 34B, each panel has a plain end 220A and a receiving end 220B. A reinforcing stud 123 is integral with the receiving end 220B. The plain end 220A of second panel 14B abuts against, and is joined to, the receiving end 220B of the first panel 14A in making a wall structure, ceiling structure, or floor structure; and inner layer 234 of the second panel 14B abuts, against and is joined to, the outwardly-facing surface 226 of stud 123 on the adjacent panel 14A.

So long as the panels are not cut, the panels can be joined end-to-end using end structures which have been fabricated as part of the process of initially fabricating the panel. Where an initially-fabricated end structure of a panel is cut off, such as at the construction site, the cut-off end of that panel can be joined to another panel using an "H" bracket 140.

FIG. 35 illustrates a building panel made using a series of laid-flat individually-wrapped foam blocks 32 in combination with spaced hollow pultruded studs 123. An outer layer extends along the bottom of the structure illustrated. An inner layer 34 extends along the top of the structure illustrated, and overlies both the foam blocks and the studs. A given stud 123 extends from a closed end wall 126 at outer layer 36, along legs 128, past the main inner surface 25 of the panel at inner surfaces of blocks 32, and passes further inwardly of blocks 32 and away from outer layer 36, to end panel 130. The end panel 130 of each stud is displaced about 1 inch to about 5.5 inches from inner surface 25, so as to define spaces 131 between the studs. Such stud can be made by applying resin to a fabricated fiberglass layer and curing the resin. In the alternative, such stud can be made by a pultrusion process.

An inner layer of fiberglass-reinforced polymer is applied over both the laid-flat blocks 32 and studs 123.

A hollow space 133 is defined inside each such stud. Hollow space 133 can be filled with thermally-insulating foam as desired. The panel illustrated in FIG. 35 is thus a combination of foam blocks 32 wrapped in fiber-reinforced polymeric layers, and hollow studs 123. Where studs 123 are pultruded studs, the panel represents a combination of pultruded studs and wrapped foam blocks.

Figure 36:
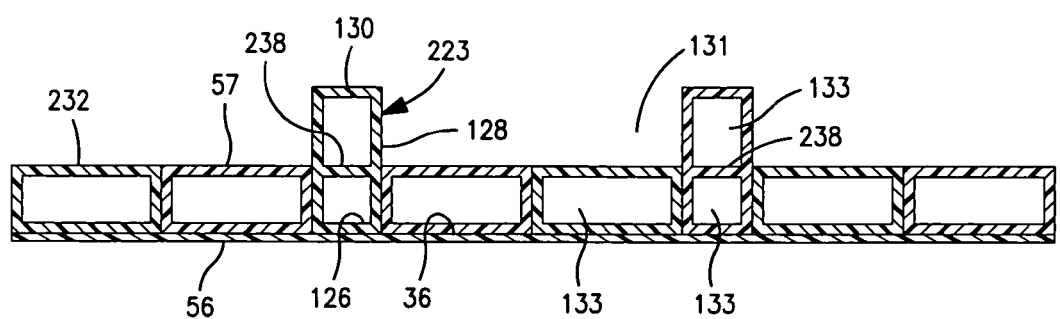
FIG. 36 shows a cross-section of a building panel of the invention assembled from elongate pultrusions, including pultruded studs, all generally rectangular in cross-section.

FIG. 36 illustrates a building panel made using a series of laid-flat individually-fabricated rectangular fiberglass-reinforced polymeric pultruded blocks 232 in combination with spaced hollow pultruded studs 223. Each stud 223 has a closed end wall 126 at outer layer 36, and extends along legs 128, past the main inner surface 25 of the panel at inner surfaces of the laid-flat pultrusions 232 and away from outer layer 36, to end panel 130. The end panel 130 of each stud is displaced about 1 inch to about 5.5 inches from inner surface 25, so as to define spaces 131 between the studs. A pultruded reinforcing web 238 extends across the stud proximate, optionally generally in alignment with, the main portion of the inner surface 25 of the panel.

Both pultruded blocks 232 and pultruded studs 223 are illustrated with hollow spaces 133. In another embodiment, not shown, insulating foam, for example polyurethane foam, is injected into the hollow spaces in one or both of blocks 232 and studs 223, providing enhanced thermal insulation characteristics.

Figure 37:
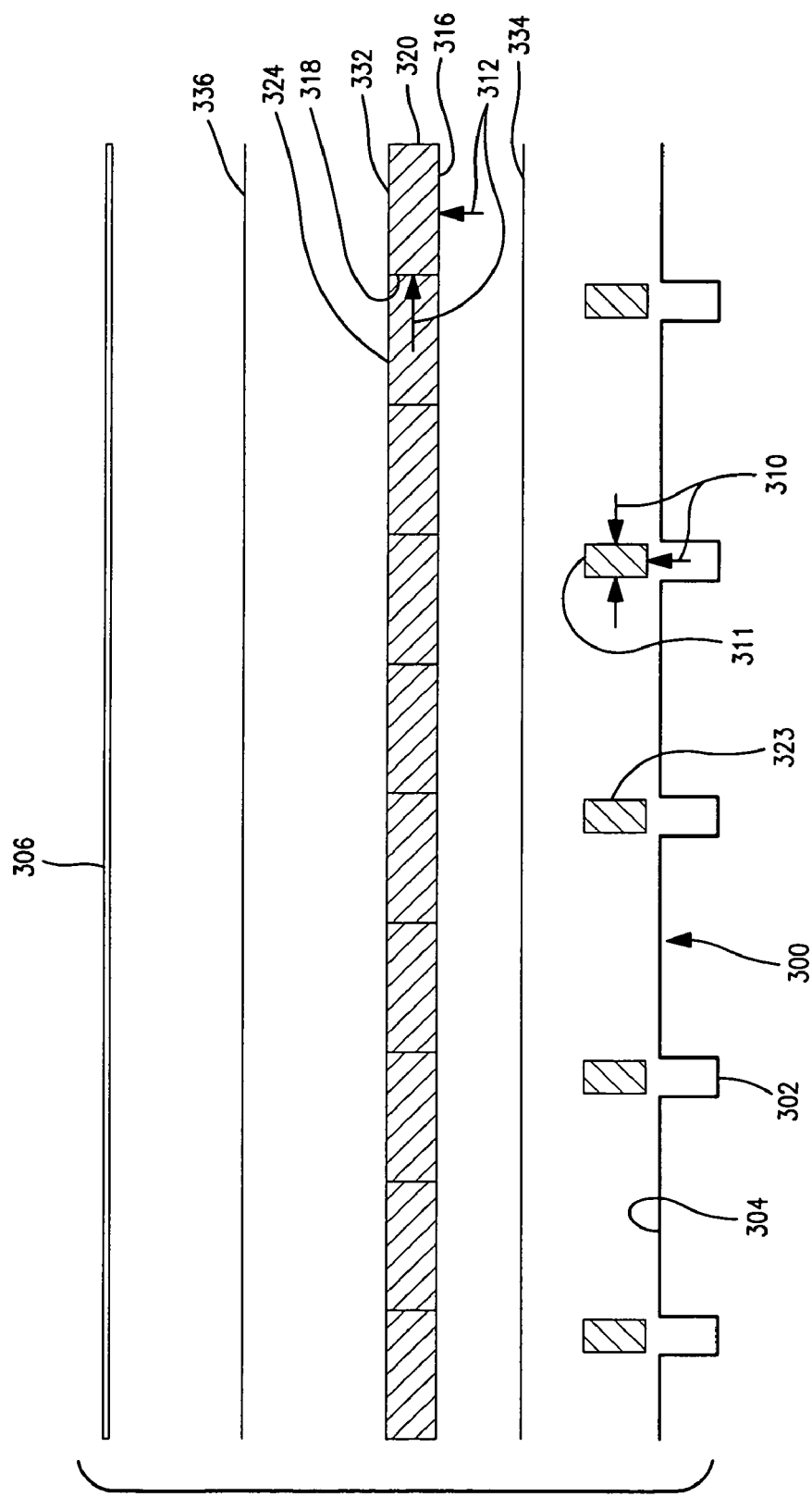
FIG. 37 illustrates a vacuum molding process for making a building panel of the invention having studs extending inwardly from the main inner surface of the building panel.
Figure 38:
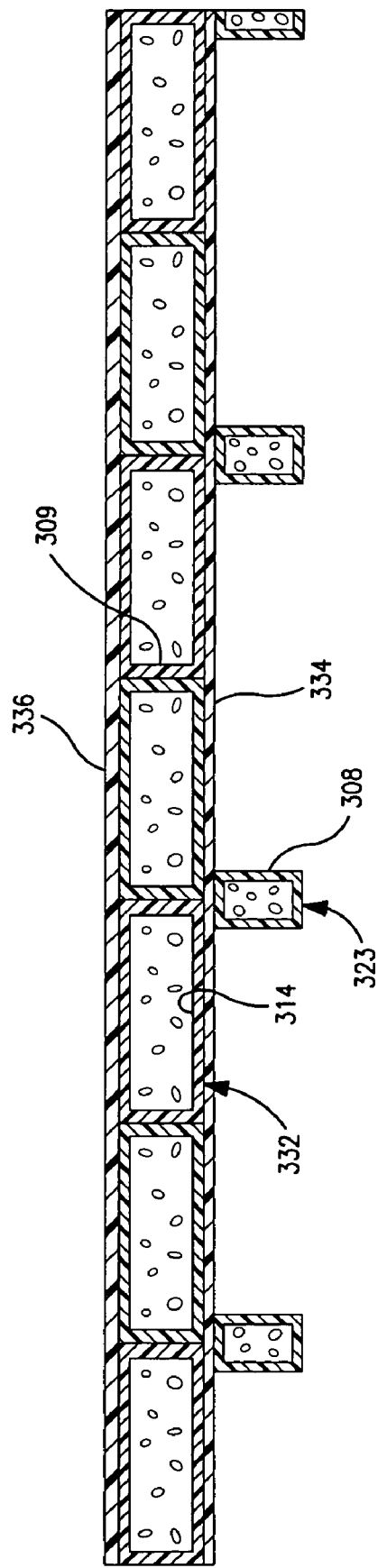
FIG. 38 shows a cross-section of a building panel incorporating studs illustrated in FIG. 16B and using the process of FIG. 37.

FIG. 37 illustrates a vacuum molding process which can be used to make building panels of the invention. FIG. 38 illustrates a building panel made by such vacuum molding process.

Referring to FIGS. 37 and 38, a specific example of a process of making a building panel of the invention is described in some detail. In FIG. 37, the numeral 300 represents a lower female mold element which includes a plurality of elongate female recesses 302 spaced e.g. 16 inches apart center-on-center. Numeral 306 represents the upper mold element.

At the beginning of the process, the upper and lower mold elements, including recesses 302, are optionally coated with mold release material. In the alternative, a mold release agent can be incorporated into the resin. Next, foam stud blocks 323, pre-wrapped with layers 308 of fiberglass, are placed into recesses 302. Foam stud blocks 323 and recesses 302 are so sized and configured that the foam blocks fit snugly in the recesses, and the top surfaces of the foam stud blocks are generally co-planar with the upper surface 304 of the lower mold element.

As part of the process of placing the foam stud blocks into the recesses, each foam stud block is drawn through a resin wetting machine which applies coatings of liquid resin on three of the four elongate surfaces of the foam block. The three surfaces which are coated are the bottom surface and the two side surfaces, as indicated by arrows 310 in FIG. 37. Thus, the three surfaces of stud blocks 323 which are received against surfaces of the lower mold element are coated with liquid resin, leaving the top surfaces 311 of the stud blocks uncoated and dry. Thus, the upper surface of the assemblage at this stage of the assembly process, comprising the upper surface 304 of the lower mold element and the top surfaces 311 of the stud blocks, is generally free from liquid resin.

Next, a dry layer 334 of 22 ounce fiberglass fabric, which will become the inner layer of the so-fabricated building panel, is unrolled from a roll of such material mounted adjacent e.g. the right end of the mold table as illustrated in FIG. 37 and is pulled over the lower mold element, from the right side to the left side. Since the upper surface of the assemblage is generally free from resin, the fabric layer can be easily pulled and dragged over the top surface of the assembly. The layer of dry fabric is laid over the entirety of the length and width of the lower mold element, including over the top surfaces of stud blocks 323.

Next, foam blocks 332, pre-wrapped with layers 314 of fiberglass, are laid flat on top of the dry fabric, edge-to-edge as illustrated in FIG. 37. With the foam blocks so laid in edge-to-edge relationship, and as illustrated in FIG. 38, the fiberglass layer which is wrapped about a first such foam block is in surface-to-surface relationship, at such edges, with the fiberglass layers which are wrapped about any next-adjacent block.

As part of the process of placing the laid-flat foam blocks 332 onto the dry fabric, each foam block 332 is first coated on two, optionally three, of its four elongate surfaces with a coating of liquid resin. The two surfaces which are necessarily coated are the bottom surface 316 and either the left side surface 318 or the right side surface 320, both as illustrated in FIG. 37. FIG. 37 illustrates the bottom surface and the left side surface as being coated, as indicated by arrows 312 in FIG. 37. Optionally, the right side surface can also be coated with resin at the same time.

Thus, by the time all the blocks 332 have been laid onto dry layer 334, a layer of resin has been placed over the entirety of the top surface of layer 334, by the resin on the bottom surfaces of blocks 332. In addition, the resin applied to the one or more side surfaces of the foam blocks readily transfers in part to the facing side surfaces of the adjacent foam blocks. Or if both the right and left side surfaces of foam blocks 332 have been resin-coated, then the coatings on the facing side surfaces merge and cooperate with each other. As part of the process of placing foam blocks 332 on layer 334, and if only one side surface of the blocks 332 is being coated with resin, the otherwise-uncoated side surface of the terminal end ones of the foam blocks is coated with resin on both side surfaces, whereby the outwardly-facing side surface of the last-placed foam block 332 is also coated with resin.

At this stage of the process, foam blocks 332 collectively form a dry upper surface 324 of the assemblage of elements, generally free from liquid resin. Next, another dry layer of the 22 ounce fiberglass fabric, which will become the outer layer 336 of the so-fabricated building panel, is unrolled from the roll of such material mounted adjacent e.g. the right end of the vacuum table and is pulled over the dry laid-flat foam blocks 332, from the right side of mold 300 to the left side of the mold. Since the upper surfaces of foam blocks 332 are generally free from resin, the fabric layer can be easily pulled and dragged over the top surface 324 of the foam blocks, which form the top surface of the assembly at this stage. Layer 336 of dry fabric is laid over the entirety of the assemblage of foam blocks 332, whereby layer 336 becomes the top surface of the assemblage.

Resin is then applied to the top surface of layer 336, such as by a drip coating, a roll coating, a liquid curtain coating, or other known surface-coating process, providing a resin coating over the entirety of the top surface of the assemblage. At this stage of the assembly, all of the bottom and side surfaces of foam blocks 323 and 332 are coated with liquid resin, and the top surfaces are uncoated with resin. In the case of foam blocks 323, inner layer 334 is next adjacent the dry top surface of foam blocks 323, and a layer of resin is located at the top surface of inner layer 334, whereby the dry top surfaces of foam blocks 323 are separated from resin by only inner layer 334.

In the case of foam blocks 332, outer layer 336 is next adjacent the dry top surface 324 of foam blocks 332, and a layer of resin is located at the top surface of outer layer 336, whereby the dry top surfaces of foam blocks 332 are separated from resin by only outer layer 336.

The upper and lower mold elements are then brought together, with a seal therebetween, so as to form a closed and sealed mold, with the respective elements of the building panel in the mold cavity.

The mold cavity is then evacuated, drawing a vacuum which removes substantially all of the air out of the cavity. As the air is withdrawn from the cavity, the resin flows to all areas of the mold where air has been removed, including through layers 334 and 336, thus to fill in all voids left by the evacuating air and to form a continuous resin matrix about and through all of layers 334, 336, and the wrapping layers 308 and 314 of fiberglass which encompass foam blocks 323 and 332.

Thus, resin flows downwardly through layer 334 and into intimate bonding contact with the top surfaces of foam blocks 323. Resin also flows downwardly through layer 336 and into intimate bonding contact with the top surfaces of foam blocks 332. As a result, the resin in the mold flows to all areas which have been evacuated by the removed air, thus creating a continuous matrix of resin throughout the structure in all of the fiberglass layers. However, in instances where the foam in foam blocks 323 and 332 is a closed cell foam, the resin does not penetrate generally beyond the outer surfaces of the foam blocks. Where the foam is an open-cell foam, the resin can penetrate more deeply into the foam blocks as permitted by the permeability of the foam.

Once the mold has been closed and evacuated, the resin is cured in the mold. In the process of curing the resin, the mold may be heated, or not, depending on the thermal requirements associated with the curing of the specific resin being used. Where heat is required, heat is applied. Where heat is not required, the resin is typically cured at ambient temperature.

After curing, the cured fiber-reinforced polymeric building panel product is removed from the mold. The mold is cleaned if and as needed, and the process is repeated to make another building panel.

FIG. 38 illustrates a building panel made according to the process described with respect to FIG. 37. The process of FIG. 37 can be used to make building panels which are cost effective in use of materials at the points of stress, which are readily combined with conventional building materials using conventionally-recognized and standardized building elements spacings. Thus, in the embodiment illustrated, foam blocks 332, including the wrapping layers and resin, are 9 feet long, 8 inches wide, and 3 inches thick between layers 334 and 336. Stud blocks extend 3 inches from layer 334, and are 2 inches wide, and are 9 feet long. Layers 334 and 336 are 9 feet wide and as long as the length of the panel. Layers 308, 314, 334, and 336 are all made of the same 22 ounce fiberglass fabric and are thus all the same thickness when filled with resin. The resulting thickness of each such layer is about 0.035 inch (0.9 mm). In the given structure, outer layer 336 plus the adjacent portion of wrapping layer 314 is thus uniformly 0.070 inch (1.8 mm) thick. Similarly, inner layer 336 plus the adjacent portion of wrapping layer 314 is uniformly 0.070 inch (1.8 mm) thick. Also, the collective thickness of the reinforcing portions 209 of the wrapping layers between each pair of foam blocks 332 is 0.07 inch (1.8 mm). The outer surface of the building panel is stressed by side loading and water pressure. The inner layer is stressed in tension by the side loading. The reinforcing portions are stressed both by side loading and compression loading. Thus, all of the highly stressed areas of the building panel are developed at a common thickness of the fiber reinforced polymeric material, with no overlap of excess material anywhere in any of the outer layer structure, the inner layer structure or the reinforcing members structure, resulting in an efficient use of materials and structure.

In another embodiment, not shown, all of the elements shown in FIG. 37 are assembled in the mold dry, namely without addition of any resin into the mold before the mold is closed. Resin is then infused into the mold after the mold is closed and as the air is being evacuated from the mold. Such process is known as an infusion process, which is also an acceptable process for making building panels of the invention.

Figure 39:
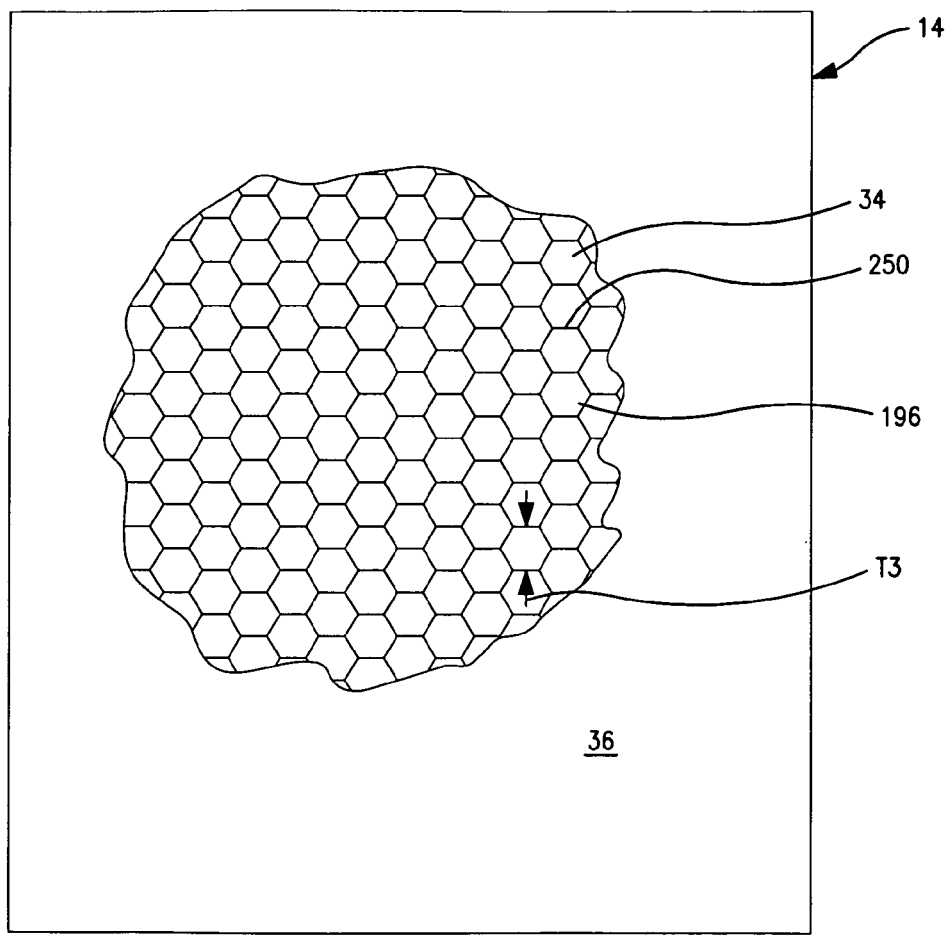
FIG. 39 shows a side elevation view, with parts cut away of a portion of a fourth uninsulated building panel of the invention.

FIG. 39 shows a side elevation view of a portion of a building panel 14 of the invention, as viewed looking toward outer layer 36. The outer layer 36 and inner layer 34 are fiberglass reinforced polymeric layers such as are described with respect to FIGS. 6 and 8. The structurally reinforcing bridging member 250 is configured in the shape of a honeycomb structure wherein each wall of the honeycomb spans the thickness of the building panel between outer layer 36 and inner layer 34. The walls 250 of the honeycomb structure thus serve as straight-line reinforcing members between inner and outer layers 34, 36, and provide strength and rigidity as the structurally-reinforcing members of the building panel.

The dimensions of the honeycomb cells, as well as the thicknesses of the walls 250 of the cells, can be designed for the desired, anticipated, vertical and horizontal loadings. The dimension "T3" across the honeycomb cell is typically between about 0.25 inch and about 2 inches. The thickness of a bridging member 250 is typically about 0.02 inch to about 0.20 inch. Cell size and bridging member thickness have known relationships which can be used by those skilled in the art to design honeycomb building panels having desired structural strength characteristics.

The honeycomb structure illustrated in FIG. 39 is generically representative of a family of building panels which have both upstanding structurally-reinforcing members 50 and transversely-extending structurally-reinforcing members. The transversely-extending structurally-reinforcing members extend between, and are optionally connected to, the upstanding ones of the structurally-reinforcing members. The combination of the upstanding structurally-reinforcing members and the transversely-extending structurally-reinforcing members can define regular or irregular, open or closed, geometric shapes, which optionally extend generally continuously between inner layer 34 and outer layer 36. FIG. 39 illustrates a regular hexagon as an example of regular geometric shapes.

Studs 123 can be used as optional, for example to create a cavity 131 for running utilities or to receive a batt of fiberglass insulation, or to further contribute to the strength of the building panel.

The building panels illustrated in FIGS. 30-34 can employ top plates 20 and bottom plates 16 in the same manner described with respect to the embodiments illustrated in e.g. FIGS. 8 and 9.

Throughout this teaching, fiber-reinforced studs 123 have been illustrated and taught as having an end panel 130, first and second legs 128, and outwardly-extending flanges 126. See, for example, FIG. 8. The invention further contemplates studs 123 structured as closed structures, such as a closed-perimeter rectangular tube, optionally devoid of flanges 126.

The invention further contemplates a stud 123 as a pultruded structure, in both the illustrated flange cross-section and the closed-perimeter cross-section.

Studs 123 can be located over a structurally-reinforcing member 50, 209, 250, as at 123A in FIG. 31, or away from the structurally-reinforcing member as illustrated in FIG. 33.

Among the requirements of the structurally-reinforcing member is that the materials in the structurally-reinforcing member cannot be sensitive to, susceptible to substantial degradation by, water or any inclusions commonly found in water, whether dissolved minerals or organic materials such as life forms which live on or transform the compositions of the fibers. Namely, the materials cannot be susceptible to degradation by water or anything in water, to the extent such degradation jeopardizes the ability of the structure made from such building panels, to provide the compressive strength necessary to support the overlying building loads, and the bending loads imposed by subterranean forces, and above-grade weather forces.

Accordingly, the structurally-reinforcing member typically does not include uncoated corrugated wood fiber structures commonly referred to as corrugated cardboard structures, or any other fibers whose strengths are substantially affected by moisture or moisture vapor, or any inclusions which can be expected to occur in moisture found in or around the soil adjacent a building structure. Further, the fibers cannot be susceptible to insect infestation, or any other degrading factors. Thus, the fibers are inert inorganic materials such as are illustrated elsewhere herein.

In the alternative, susceptible fibers can be used where such fibers are combined with sufficient coating of e.g. a resin to preclude such deleterious elements from reaching the fibers over the expected use life of the building panel; or where one or more layers disposed outwardly of a fiber layer in the panel is capable of preventing enough moisture from getting to the fibers that the fibers can become degraded as a result of exposure to moisture.

In any of the embodiments of the invention, one or more gel coats can be applied to the panel structure at one or both of the inner and outer surfaces.

Whatever the materials used for the reinforcing fiber, the foam, and the resin, all of such elements, including UV inhibitors and fire retardant additives, are chemically and physically compatible with all other elements with which they will be in contact, such that no deleterious chemical or physical reaction takes place in wall systems of the invention.

One of the substantial benefits of wall structures made using the teachings of the invention is that the wall structures are water-proof and moisture proof. For example, in areas where hurricanes are frequent, building codes require concrete structure in above-grade housing walls. Experience has shown that hurricane-force winds drive rain forcefully through such concrete wall structures so as to cause substantial water damage even when the building structure, itself, is not damaged.

By contrast, wall structures of the invention are essentially water proof; and such water proof characteristic is not affected by hurricane-driven rain. Layer 36 is, itself, water proof. While layer 36 is quite tough for water to penetrate, even if outer layer 36 is breached, the foam blocks 32 are water proof in that the individual cells of the foam blocks 32 are closed cells. If the foam layer is also breached, inner layer 34 is also water proof. In addition, where a weaving layer is used, before the breaching force reaches layer 34, it has to pass through weaving layer 50, which is another tough and waterproof layer, whether layer 50 is encountered adjacent layer 36 or adjacent layer 34. In any event, any breaching force has to penetrate multiple waterproof layers, at least two of which are substantially tough layers when considered in light of the types of forces which are typically imposed on buildings by weather or other typical outside loads. The structures which do not include foam are similarly-effective barriers to water penetration.

Regarding the joint between the bottom of the wall panel and the bottom plate, such joint can be filled with curable resin, adhesive, caulk, or other barrier material, thus to positively block any penetration of water at the joint between the wall panel and the bottom plate.

Similarly, vertical joints in the foundation wall using e.g. "H" brackets 146 can be closed to water penetration by applying curable resin, adhesive, caulk, or other water-proofing coatings to the joint. In addition, as mentioned elsewhere herein, adhesives, resins, and the like can be applied to the building panels and/or to the various brackets before the brackets are applied to the respective building panels, thereby to provide further water-proofing characteristics to the finished foundation wall, or above-ground wall.

Building panels of the invention find use in various residential, light commercial and industrial construction applications. The strength and other specifications of a given wall panel are specified in accord with the loads to be imposed during the anticipated use life of the building.

Wall structures of the invention find application in and as, for example and without limitation, the construction of foundation walls; frost walls e.g. in buildings which have no basement; manufactured home base curtain walls; floor systems; ceiling systems, roof systems; exterior above-grade walls; curtain walls as in high rise construction replacing concrete block; and exterior walls in areas that use masonry exteriors, such as in coastal construction. While the specification and drawings have focused on foundation walls, the principles disclosed herein apply in the same way to other uses of panels and accessories of the invention.

A variety of accessories and parts can be used with projects which use walls of the invention, for example and without limitation, posts to support beams/girders, fiber-reinforced piers which optionally include structural top and bottom, post pads, inside corner brackets, outside corner brackets, "H" channel brackets, top plate connectors, garage floor shelves, support brackets, floor-and-garage apron brackets, service door cut outs, garage door cut outs, frost wall transitions, and stud profiles.

In addition, there can be mentioned fiber and resin patch kits suitable for use to patch a damaged building panel, angled wall connectors, full basement wall to garage transition, frost wall returns, attachment of top and bottom plates, along with potential shipping advantages where the top and bottom plates are affixed at the construction site, beam pockets, post pads in the footer to distribute load, and window bucks. There can also be mentioned fasteners to apply exterior product and to provide connections to other parts of the building. Such fasteners can be, for example and without limitation, metal or fiber-reinforced polymer composite. A wide variety of accessories can be affixed to the wall structure using conventionally available adhesives for field applications.

A specific advantage of wall systems of the invention is that such wall systems can be readily sized and configured for use with already-available standard size conventional building products, e.g. construction materials.

Building panels of the invention can be cut, using conventional tools commonly available at a construction site, to fit the needs of the job at hand. For example, a panel can be cut for length. A window opening can be cut out. A door opening can be cut out. Utility perforations of the foundation wall can be cut, such as for furnace fresh air intake or combustion gas exhaust, or the like, or such utilities can be run in cavities 131 between studs 123 and inwardly or inner layer 34.

Advantages of the invention include, without limitation, a composite bottom plate which has potential to provide a wider footprint to the underlying soil than the projected area of the wall panel, for distributing the overlying weight of the building. The bottom plate can be applied on site or off site. The wall structures of the invention are light weight compared to the concrete structures they replace. The wall structures of the invention are waterproof, versatile, mold resistant, termite resistant, and rot resistant. The substantial polymeric component of the compositions of wall structures of the invention provides a desired level of radon barrier in accord with existing building codes whereby the conventionally-used polymeric layer on the outside of the foundation wall is not needed, and can be omitted, along with corresponding savings in material and labor costs.

Typical wall structures of the invention can be installed with manual labor, and do not require bringing any large machines to the construction site for the purpose of installing a footer, a foundation wall, or an above-grade wall, no form truck, no crane to install the building panels.

The invention does contemplate larger wall panels, e.g. thicker, higher, and/or longer, which can weigh at least 250-750 pounds or more, whereupon a light-duty lifting device, such as a light-duty crane, is optionally used to install such wall panels, with corresponding reduction in labor cost. Further, where a wall or roof panel is being erected above the ground floor, a suitable-weight crane facilitates such greater-height installation.

Wall structures of the invention can be installed in all seasons and all weather, so long as the excavation can be dug to a suitable natural support base. Panels of the invention are environmentally friendly. Panels of the invention are consistent with the requirements to qualify as Green buildings and/or as Energy Star buildings whereby buildings built with building panels of the invention may qualify for such ratings. No damp proofing is needed. Once the foundation walls are in place, the interior of the so-enclosed space is ready to be finished. HVAC cavities are available between studs 123. Plumbing and electric can also be run through the walls easily, again between studs 123, optionally inside studs 123.

Additional insulation can be easily installed in the wall cavities between studs 123, thereby to achieve e.g. at least R26 insulation factor. The building panels can be repaired more readily than concrete. Openings can be cut more easily than concrete. Wall changes can be made more easily than concrete. Any typical wall height can be achieved. The building panels can be installed on an aggregate stone footer, whereby no pouring of a concrete footer is required. Thus, the lowest level wall of the building can be completed with no need for any ready-mix concrete at the construction site.

Insulation property gained as part of the wall structure can be about R-15 without additional installation of insulation by using 3 inches of R5 per inch foam insulation blocks 32. Additional insulation can be added in cavity 131 to increase the thermal insulation value of the wall. In the alternative, the thermal insulation value of the wall can be increased by increasing the thickness of the wall between the inner and outer layers, using correspondingly thicker foam blocks 32, and filling all of the space with the foam blocks.

Wall structures of the invention have multiple desirable properties, including being fire resistant where fire retardant ingredients are included in the resin formulation, being a good barrier to ultraviolet rays, providing good sound attenuation, being generally free from insect infestation, being generally not susceptible to infestation by rot-generating organisms, being a good water barrier, and being a good barrier to transmission of radon gas.

Wall structures of the invention are sturdy, durable, and have very favorable expansion and contraction ratings compared to the concrete they replace. The wall structures tolerate a wide range of temperatures such as are encountered in building construction. The building panels of the invention are easy to transport to the construction site. The building panels can be mass-produced and do not have to be project-specific like known e.g. insulated wall systems which are produced off-site, and transported to the construction site as pre-fabricated wall systems. Wall, ceiling, roof, and floor structures of the invention can be installed in locations where it is difficult to get delivery of ready-mix concrete, such as on islands, in weight restricted areas, in high-rise curtain walls, and the like.

Although the invention has been described with respect to various embodiments, it should be realized this invention is also capable of a wide variety of further and other embodiments within the spirit and scope of the appended claims.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A method of manufacturing a precursor to a load bearing structural building panel, comprising:
    (a) depositing a first fibrous layer onto a support, the first fibrous layer having a first side edge, a second side edge, a width defined between the first and second side edges, a length perpendicular to the width, and a top surface;
    (b) placing foam along the length of, and across the width of, the first fibrous layer thereby to develop a construct having a foam layer extending along the length of, and generally overlying the width of, the first layer, the construct having first and second sides, a construct length, and a width between the first and second sides, the foam layer defining a top surface of the construct opposite the first layer;
    (c) depositing pre-fabricated load-bearing studs on the top surface of the construct, the studs extending generally away from the first layer and away from the foam layer, with the foam layer between the studs and the first layer, and thereby defining a plurality of recesses between the studs; and
    (d) depositing a second fibrous layer onto the top surface of the construct, covering the width of the construct, including overlying and contacting each of the load-bearing studs and overlying and contacting the foam layer in the recess, thereby to develop a precursor to the building panel, having a thickness between the first and second layers, and wherein a surface of the second layer, which faces away from the foam layer, defines stud profiles and channel profiles which reflect the studs as deposited and the recesses so defined by the studs and the foam layer.

2. A method as in claim 1, the studs extending the full width of the construct.

3. A method as in claim 1, such load-bearing building panel having first and second sides corresponding to the first and second side edges of the first fibrous layer, such load-bearing building panel having a crush-resistance load capacity, between the first and second sides, and thus along the lengths of the studs, of at least about 4000 pounds per lineal foot length of such panel.

4. A method as in claim 1, further comprising impregnating the first and second fibrous layers with uncured curable polyisocyanurate resin before incorporating the respective layers into the construct and while the resin is still uncured, and curing the construct thereby to make a generally rigid, load-bearing building panel.

5. A method as in claim 4, impregnating of the first and second fibrous layers with resin comprising passing the respective fibrous layer between first and second rollers which together define a nip therebetween, and maintaining a coating pool of the respective liquid resin at the nip such that the respective fibrous layer passes into the pool of liquid resin and passes from the pool of resin directly through the nip, the first and second rollers being arranged in spaced horizontal relationship with respect to each other such that the fibrous layer passes downwardly through the nip, with the pool of resin on opposing sides of the fibrous layer.

6. A method as in claim 4, the foam layer being represented by a plurality of blocks of foam, each extending generally across the width of the first layer, the foam blocks generally abutting each other in edge-to-edge relationships, the foam layer having a first upper surface, the first layer having a second upper surface, further comprising weaving back and forth at spaced locations along the length direction of the first resin-impregnated fibrous layer, and along at least one of the upper surface of the first layer and the upper surface of the foam layer, before depositing the second resin-impregnated fibrous layer onto the top surface of the construct, a fibrous weaving layer which extends from the first side of the construct to the second side of the construct.

7. A method as in claim 4 wherein such load-bearing building panel has a crush resistance load capacity between the first and second sides, and thus along the lengths of the studs, of at least about 6000 pounds per lineal foot length of such panel.

8. A method as in claim 7 wherein the foam is polyisocyanurate foam having a density of about 2 pounds per cubic foot.

9. A method as in claim 8 wherein the foam comprises foam blocks having rectangular cross-sections and wherein a first side of a such foam block cross-section is about 8 inches long and an adjacent second side of such foam block cross-section is about 3 inches long.

10. A method as in claim 9 wherein the foam comprises foam blocks and wherein a first side of a such foam block extends a distance of about 8 inches along the length of the first layer to a second side, the method further comprising developing an intercostals which extends, generally transverse to the thickness of the precursor, from the first fibrous layer to the second fibrous layer along the second side of the foam block, the intercostals being generally aligned with a respective one of the studs.

11. A method as in claim 4 wherein the first fibrous layer is a generally continuous-length layer and the second fibrous layer is a generally continuous-length layer, whereby the cured construct is a developing generally continuous-length building panel precursor construct, further comprising separating a defined-length load-bearing building panel from the generally continuous-length building panel precursor.

12. A method as in claim 11, further comprising transporting the developing continuous-length building panel precursor construct from a first work station to a second work station while continuing to build the developing precursor construct.

13. A method as in claim 1 wherein the recesses comprise channels extending from the first side of the construct to the second side of the construct.

14. A method as in claim 13, a given stud comprising first and second legs (128) spaced from each other and extending away from the top surface of the construct and away from the first fibrous layer, to end panels (130).

15. A method as in claim 14, a given channel profile being bounded on two opposing sides by first and second ones of the stud profiles, and on a third side by the second layer, a fourth side of the channel profile, opposite the third side, being unbounded by any elements of the building panel precursor.

16. A method of manufacturing a load bearing structural building panel, comprising:
 (a) depositing a first generally continuous-length fibrous layer onto a support, the first fibrous layer having a first side edge, a second side edge, a width defined between the first and second side edges, a length perpendicular to the width, and a top surface;
 (b) placing foam along the length of, and across the width of, the first fibrous layer thereby to develop a generally continuous-length construct having a foam layer extending along the length of, and generally overlying the width of, the first layer, the construct having first and second sides corresponding generally to the first and second side edges of the first layer, and a width between the first and second sides, the foam layer having a top surface opposite the first layer;
 (c) depositing pre-fabricated load-bearing studs on the top surface of the construct, at spaced locations along the length of the construct, lengths of the load bearing studs extending generally between the first and second sides of the construct, the studs extending generally away from, the first layer;
 (d) depositing a second generally continuous fibrous layer onto the top surface of the construct, covering the width of the construct, including overlying each of the load-bearing studs, thereby to develop a generally continuous-length uncured precursor to the building panel, the precursor having a length, a width, and a top surface, whereby the second generally continuous layer defines the top, surface of the precursor;
 (e) impregnating the first and second fibrous layers with uncured curable resin before incorporating the respective layers into such construct, and incorporating the respective layers into such panel construct while the resin is still uncured; and
 (f) curing the construct thereby to make a generally rigid, generally continuous, load-bearing building panel precursor; and
 (g) separating a defined-length load-bearing building panel from the generally continuous-length precursor.

17. A method as in claim 16, the foam layer being represented by a plurality of blocks of foam, each extending generally across the width of the first layer, the foam blocks generally abutting each other in edge-to-edge relationships, the foam layer having a first upper surface, the first layer having a second upper surface, further comprising weaving resin-impregnated fibrous structurally reinforcing members back and forth at spaced locations along the length direction of the first resin-impregnated fibrous layer, and along at least one of the upper surface of the first layer and the upper surface of the foam layer, before depositing the second resin-impregnated fibrous layer onto the top surface of the construct.

18. A method as in claim 16, the foam layer extending generally from the first side edge of the first resin-impregnated fibrous layer to the second side edge of the first resin-impregnated fibrous layer.

19. A method as in claim 16, the studs extending the full width of the construct.

20. A method as in claim 16, such load-bearing building panel having first and second sides corresponding to the first and second side edges of the first fibrous layer, such load-bearing building panel having a crush-resistance load capacity, between the first and second sides, and thus along the lengths of the studs, of at least about 4000 pounds per lineal foot length of such panel.

21. A method as in claim 16, the foam layer being represented by a plurality of blocks of foam, each extending generally across the width of the first layer, the foam blocks generally abutting each other in edge-to-edge relationships, the foam layer having a first upper surface, the first layer having a second upper surface, further comprising weaving resin-impregnated fibrous structurally reinforcing members back and forth at spaced locations along the length direction of the first resin-impregnated fibrous layer, and along at least one of the upper surface of the first layer and the upper surface of the foam layer, before depositing the second resin-impregnated fibrous layer onto the top surface of the construct.

\* \* \* \* \*

UNITED STATES PATENT AND TRADEMARK OFFICE
CERTIFICATE OF CORRECTION

| | | |
|---|---|---|
| PATENT NO. | : 8,012,301 B2 | Page 1 of 1 |
| APPLICATION NO. | : 11/901173 | |
| DATED | : September 6, 2011 | |
| INVENTOR(S) | : Glenn P. Schiffmann et al. | |

It is certified that error appears in the above-identified patent and that said Letters Patent is hereby corrected as shown below:

In column 3, line 30 of the granted patent, remove "-" and leave a space, between "of" and "a".

In column 5, line 15 of the granted patent, remove the space between "fiber" and "-reinforced".

In column 20, line 64 of the granted patent, insert a --.-- after "wall".

In column 33, line 9 of the granted patent, insert a --,-- after "outer layer 36".

In column 40, line 12 of the granted patent, remove "s." after "e.g." and replace with "FIGS. 7 and 8.".

In column 49, line 56 of the granted patent, remove "an" after "developing" and replace "extends" with "extend".

Signed and Sealed this
Third Day of January, 2012

David J. Kappos
*Director of the United States Patent and Trademark Office*